United States Patent
Wang et al.

(10) Patent No.: US 12,182,582 B2
(45) Date of Patent: Dec. 31, 2024

(54) OPERATING SYSTEM UPGRADE METHOD, DEVICE, STORAGE MEDIUM, AND COMPUTER PROGRAM PRODUCT

(71) Applicant: HONOR DEVICE CO., LTD., Shenzhen (CN)

(72) Inventors: Yanzhao Wang, Shenzhen (CN); Zenghui Zhang, Shenzhen (CN); Chao Chen, Shenzhen (CN); Yongchao Li, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/029,527

(22) PCT Filed: Jun. 15, 2022

(86) PCT No.: PCT/CN2022/098854
§ 371 (c)(1),
(2) Date: Mar. 30, 2023

(87) PCT Pub. No.: WO2022/262751
PCT Pub. Date: Dec. 22, 2022

(65) Prior Publication Data
US 2024/0012652 A1    Jan. 11, 2024

(30) Foreign Application Priority Data
Jun. 15, 2021   (CN) .................... 202110661865.2

(51) Int. Cl.
*G06F 1/24*         (2006.01)
*G06F 8/65*         (2018.01)
(Continued)

(52) U.S. Cl.
CPC .............. *G06F 9/4406* (2013.01); *G06F 8/65* (2013.01); *G06F 9/44505* (2013.01); *G06F 9/4401* (2013.01)

(58) Field of Classification Search
CPC ...... G06F 9/4406; G06F 8/65; G06F 9/44505; G06F 11/1417; G06F 11/1433; G06F 8/71; G06F 9/44536
(Continued)

(56) References Cited

U.S. PATENT DOCUMENTS

| | | | |
|---|---|---|---|
| 6,351,850 B1 | 2/2002 | Van Gilluwe et al. | |
| 7,356,677 B1 * | 4/2008 | Rafizadeh ............. | G06F 9/4418 713/1 |

(Continued)

FOREIGN PATENT DOCUMENTS

| | | |
|---|---|---|
| CN | 103473067 A | 12/2013 |
| CN | 104301383 A | 1/2015 |

(Continued)

OTHER PUBLICATIONS

Chao Shi et al;"Design and implementation of Android-based differential OTA upgrade system"; Information Technology;Oct. 25, 2017;4 pages.

(Continued)

*Primary Examiner* — Volvick Derose
(74) *Attorney, Agent, or Firm* — WOMBLE BOND DICKINSON (US) LLP

(57) ABSTRACT

Embodiments of this application provides an operating system upgrade method, a device, a storage medium. The method includes: running a first operating system; obtaining a first system upgrade installation package that includes first update data and a second system upgrade installation package that includes second update data; storing the first update data and the second update data in a user data partition;

(Continued)

restarting an electronic device; loading data in a basic partition and a second static partition; loading first dynamic partition data to run a third operating system, where second dynamic partition data corresponds to a result of superposition of third dynamic partition data and the second update data, and the third dynamic partition data corresponds to a result of superposition of data in a dynamic partition and the first update data; and merging the first update data and the second update data into the dynamic partition.

17 Claims, 35 Drawing Sheets

(51) Int. Cl.
*G06F 9/4401* (2018.01)
*G06F 9/445* (2018.01)

(58) Field of Classification Search
USPC .............................................................. 713/2
See application file for complete search history.

(56) References Cited

U.S. PATENT DOCUMENTS

| | | | | |
|---|---|---|---|---|
| 8,635,425 | B1* | 1/2014 | Adogla | G06F 8/63 |
| | | | | 714/710 |
| 8,924,952 | B1* | 12/2014 | Hou | G06F 8/65 |
| | | | | 717/172 |
| 9,928,056 | B1* | 3/2018 | Chittigala | G06F 9/5077 |
| 10,949,191 | B2* | 3/2021 | Chen | G06F 16/188 |
| 2003/0110173 | A1* | 6/2003 | Marsland | G06F 9/5077 |
| 2012/0110274 | A1* | 5/2012 | Rosales | G06F 9/485 |
| | | | | 711/E12.013 |
| 2015/0169329 | A1 | 6/2015 | Barrat et al. | |
| 2016/0092202 | A1 | 3/2016 | Filali-Adib et al. | |
| 2016/0092203 | A1* | 3/2016 | Filali-Adib | G06F 8/656 |
| | | | | 717/171 |
| 2016/0306649 | A1* | 10/2016 | Gunti | G06F 9/4406 |
| 2016/0371095 | A1* | 12/2016 | Zhou | G06F 9/4451 |
| 2016/0378553 | A1* | 12/2016 | Xie | G06F 9/5016 |
| | | | | 718/104 |
| 2017/0286092 | A1* | 10/2017 | Zhu | G06F 8/654 |
| 2020/0341746 | A1* | 10/2020 | Mehra | G06F 8/658 |
| 2021/0165575 | A1 | 6/2021 | Hutcheson, Jr. et al. | |
| 2022/0100490 | A1* | 3/2022 | Hwang | G06F 15/16 |
| 2024/0214184 | A1* | 6/2024 | Vittoz | G06F 21/57 |

FOREIGN PATENT DOCUMENTS

| | | |
|---|---|---|
| CN | 104918114 A | 9/2015 |
| CN | 105260200 A | 1/2016 |
| CN | 107273160 A | 10/2017 |
| CN | 107967141 A | 4/2018 |
| CN | 109032846 A | 12/2018 |
| CN | 109885325 A | 6/2019 |
| CN | 110175039 A | 8/2019 |
| CN | 110321148 A | 10/2019 |
| CN | 110543321 A | 12/2019 |
| CN | 111694608 A | 9/2020 |
| CN | 112416406 A | 2/2021 |
| CN | 112817625 A | 5/2021 |
| CN | 113805914 A | 12/2021 |
| WO | 2016183951 A1 | 11/2016 |
| WO | 2017067448 A1 | 4/2017 |
| WO | 2019207729 A1 | 10/2019 |

OTHER PUBLICATIONS

Wei Wang;"Design and application of bootloader based on embedded linux"; Southwest Jiaotong University Master Degree Thesis;Sep. 30, 2006;82pages.

Ekansh Katihar et al;"Operating system upgrade in high availability environment"; «2013 21st International Conference on Software, Telecommunications and Computer Networks—(SoftCOM 2013)» ; Dec. 31, 2013;5pages.

Yu-jie Zhang;"Design and Implementation of Upgraging Technology for Smart Phone Based on Android Oprating System";Electronic Quality; Jan. 20, 2017;4pages.

Anonymous;"Implement Dynamic Partitions:Android Open Source Project"; Retrieved from the internet,URL:https://source.android.com/docs/core/ota/dynamic_partitions/implement; Sep. 3, 2019; 15 pages.

Pyjetson;"Virtual AB System"; Apr. 20, 2021;Retrieved from the internet,URL:http://www.cnblogs.com/pyjetson/p/14682474.html.

\* cited by examiner

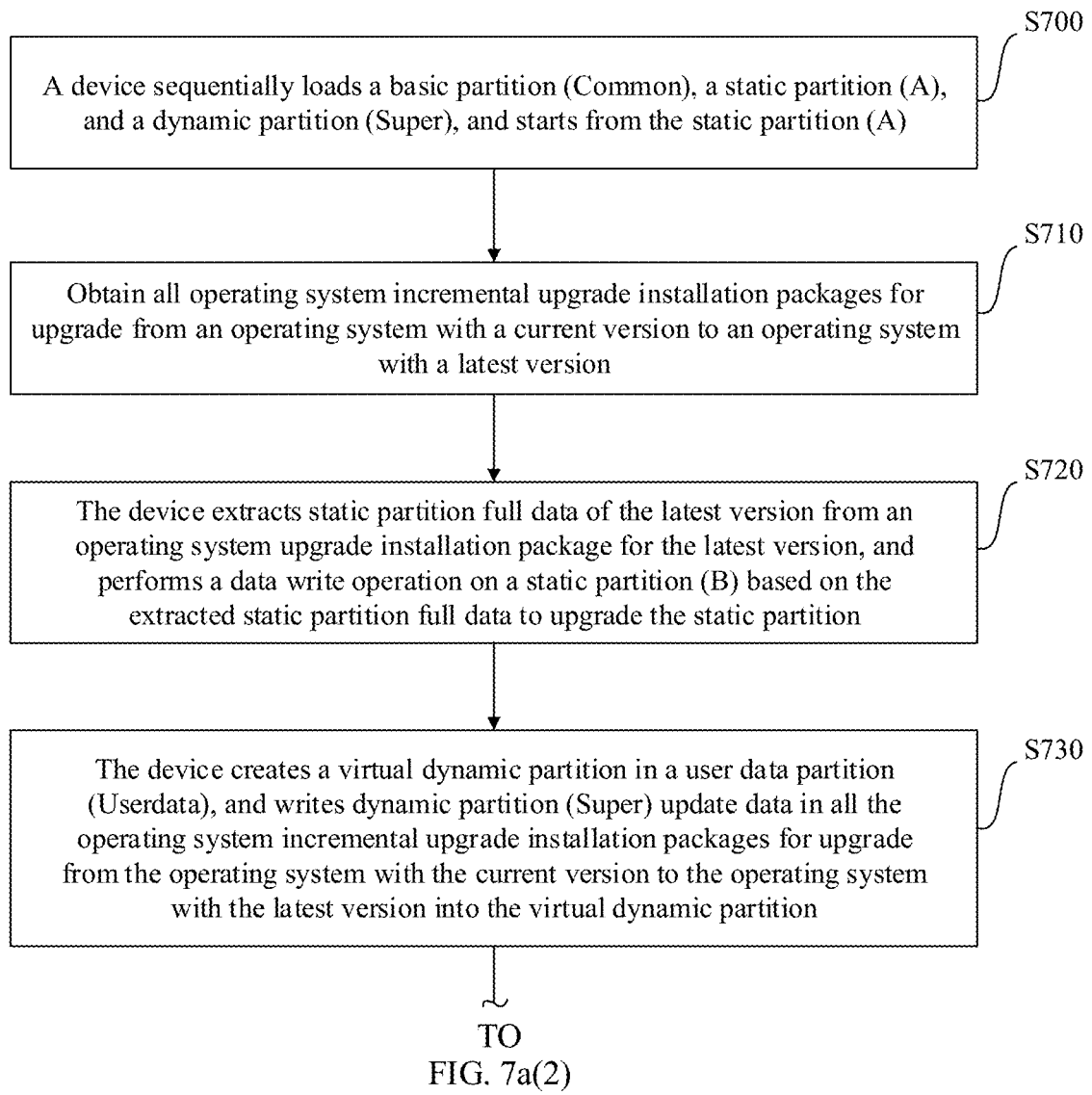
FIG. 7a(1)

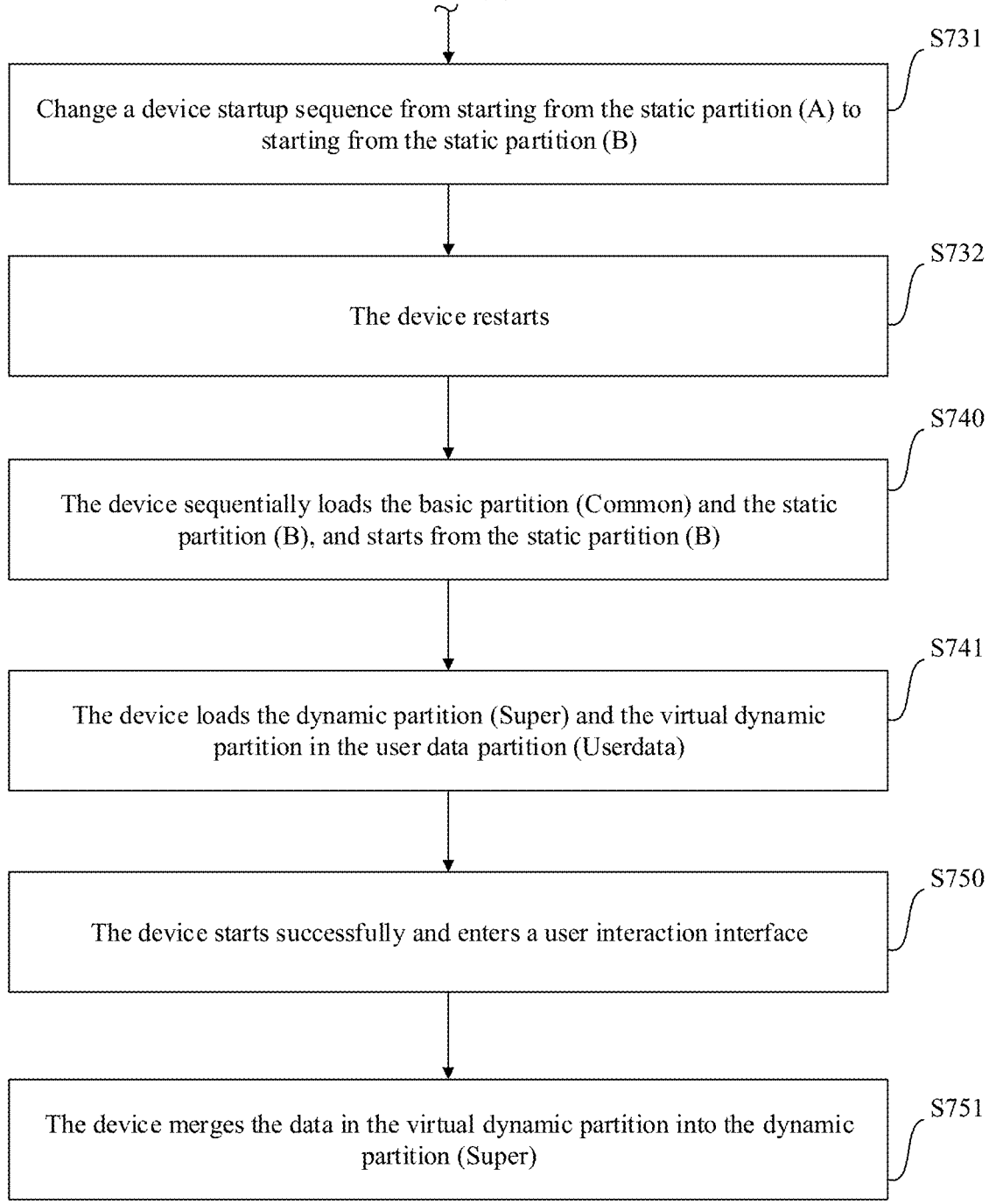
FIG. 7a(2)

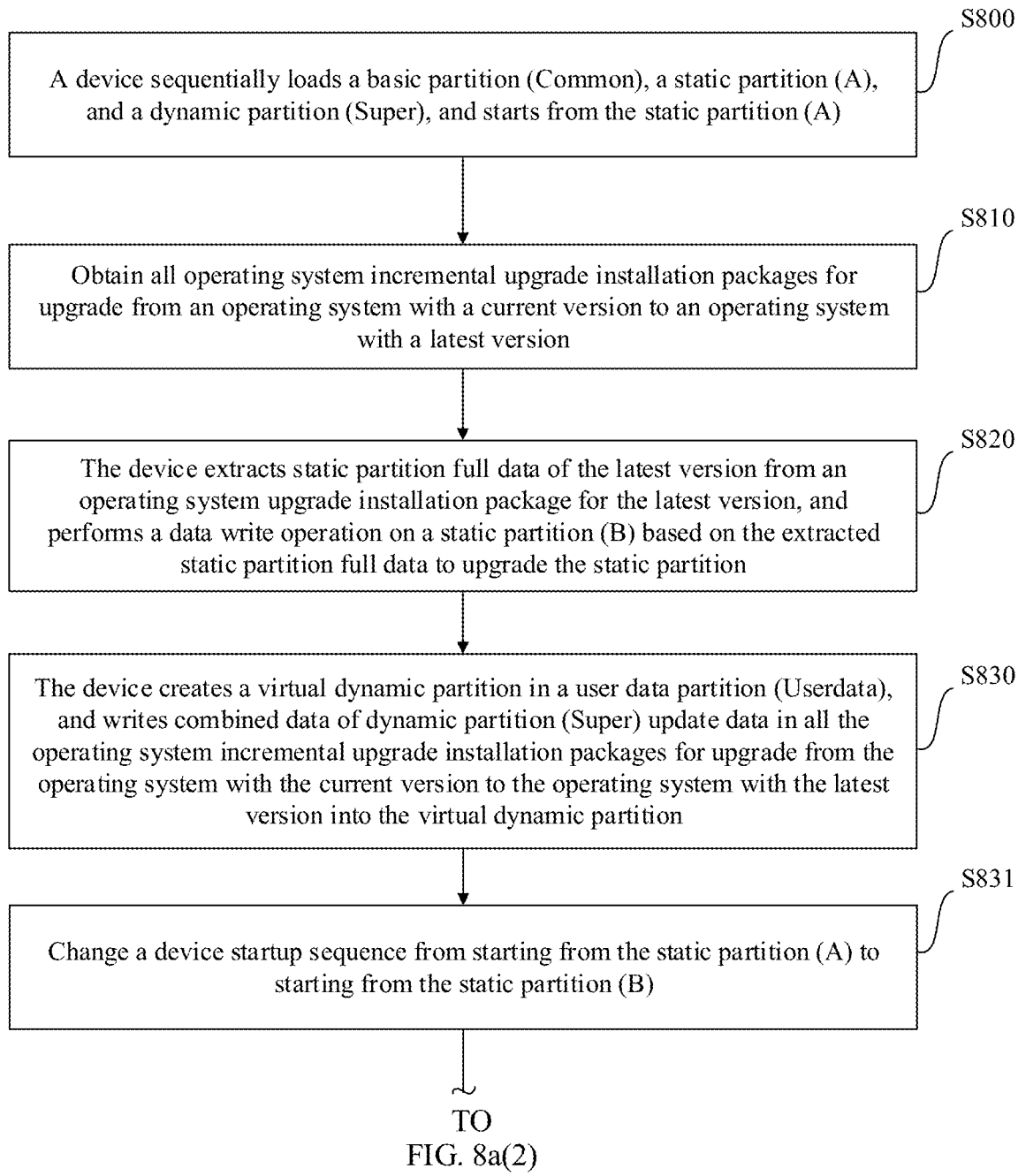
FIG. 8a(1)

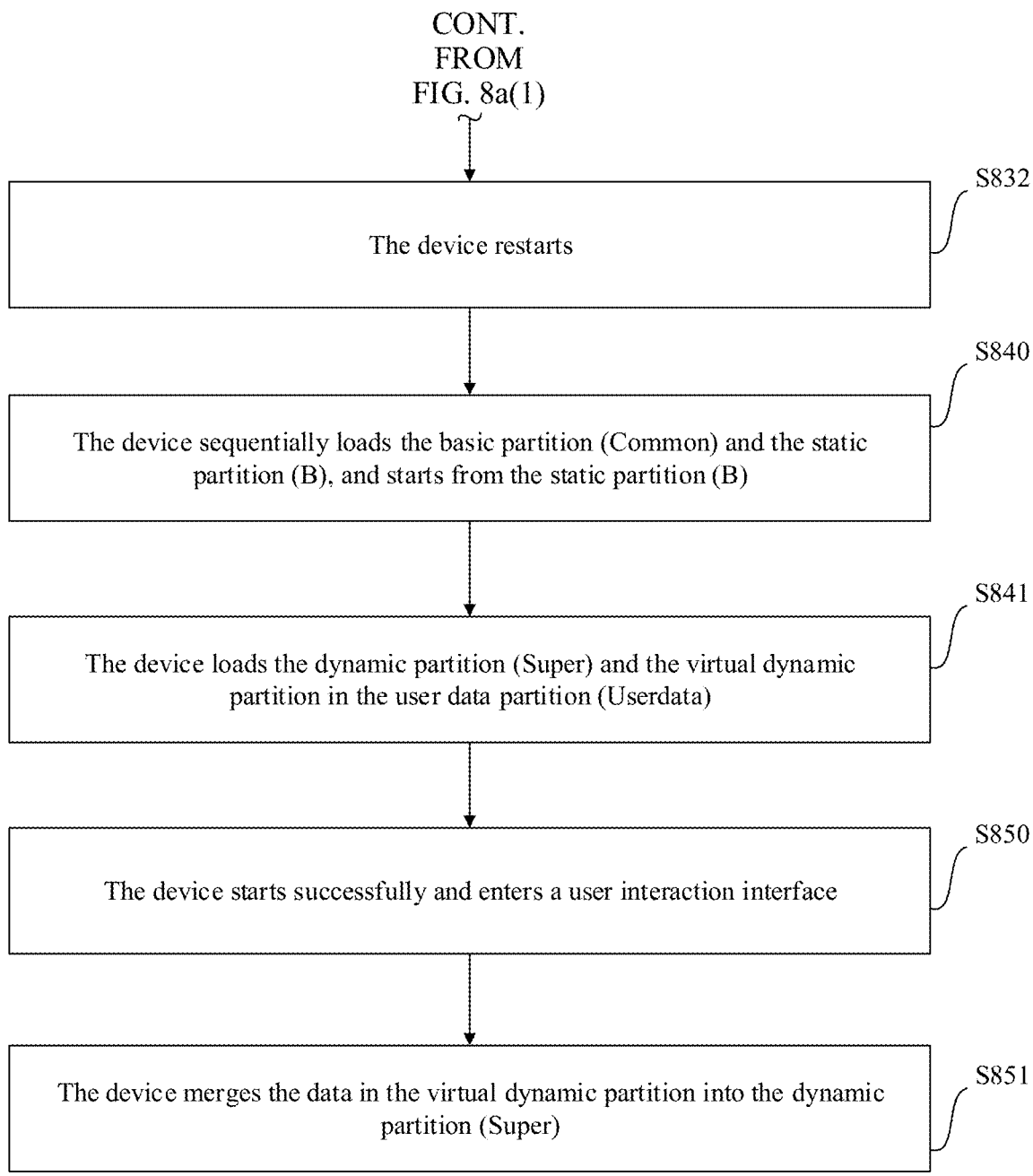
FIG. 8a(2)

| Operating system version 1.1 | Operating system version 1.2 | Operating system version 1.3 |
|---|---|---|
| Bootloader (version 0.1) | Bootloader (version 0.1) | Bootloader (version 0.1) |
| boot (version 0.1) | boot (version 0.1) | boot (version 0.1) |
| vendor_boot (version 0.1) | vendor_boot (version 0.1) | vendor_boot (version 0.2) |
| dtbo (version 0.1) | dtbo (version 0.2) | dtbo (version 0.3) |
| vbmeta (version 0.1) | vbmeta (version 0.2) | vbmeta (version 0.2) |

FIG. 9

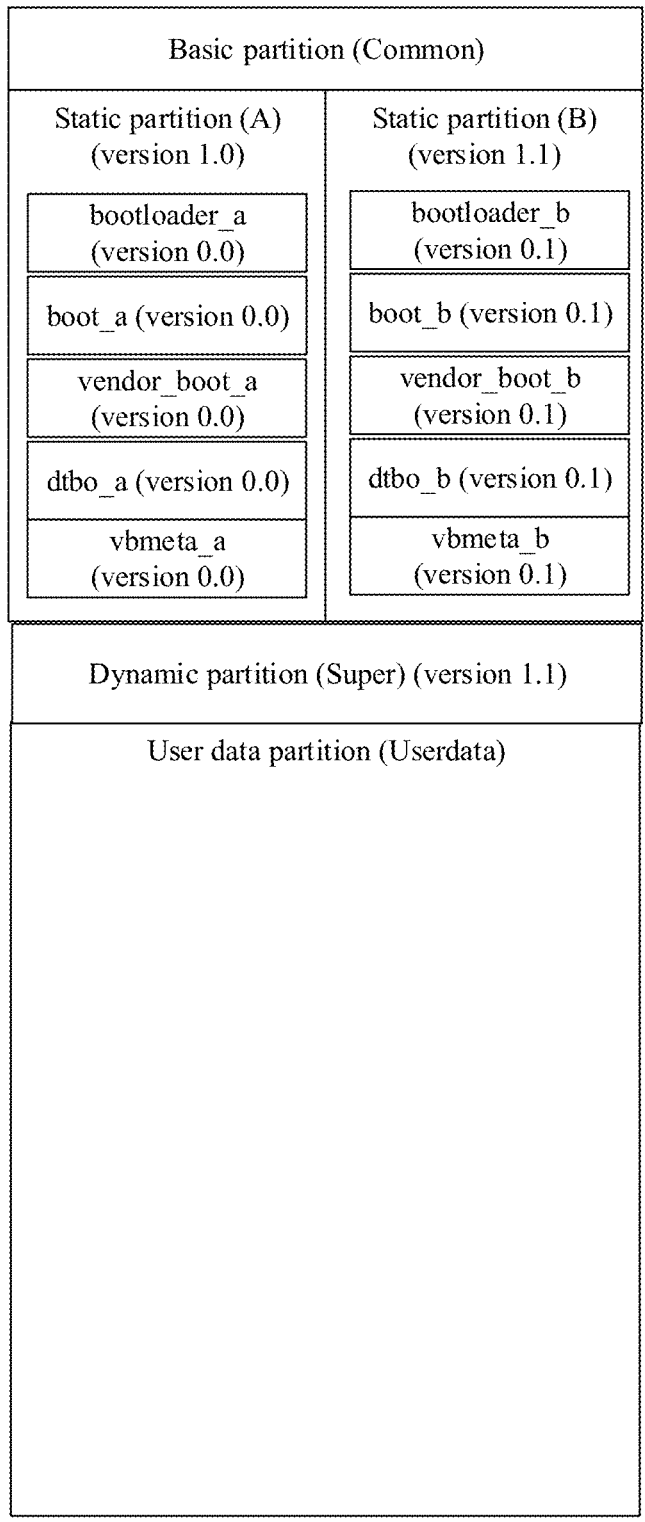
FIG. 12a(1)

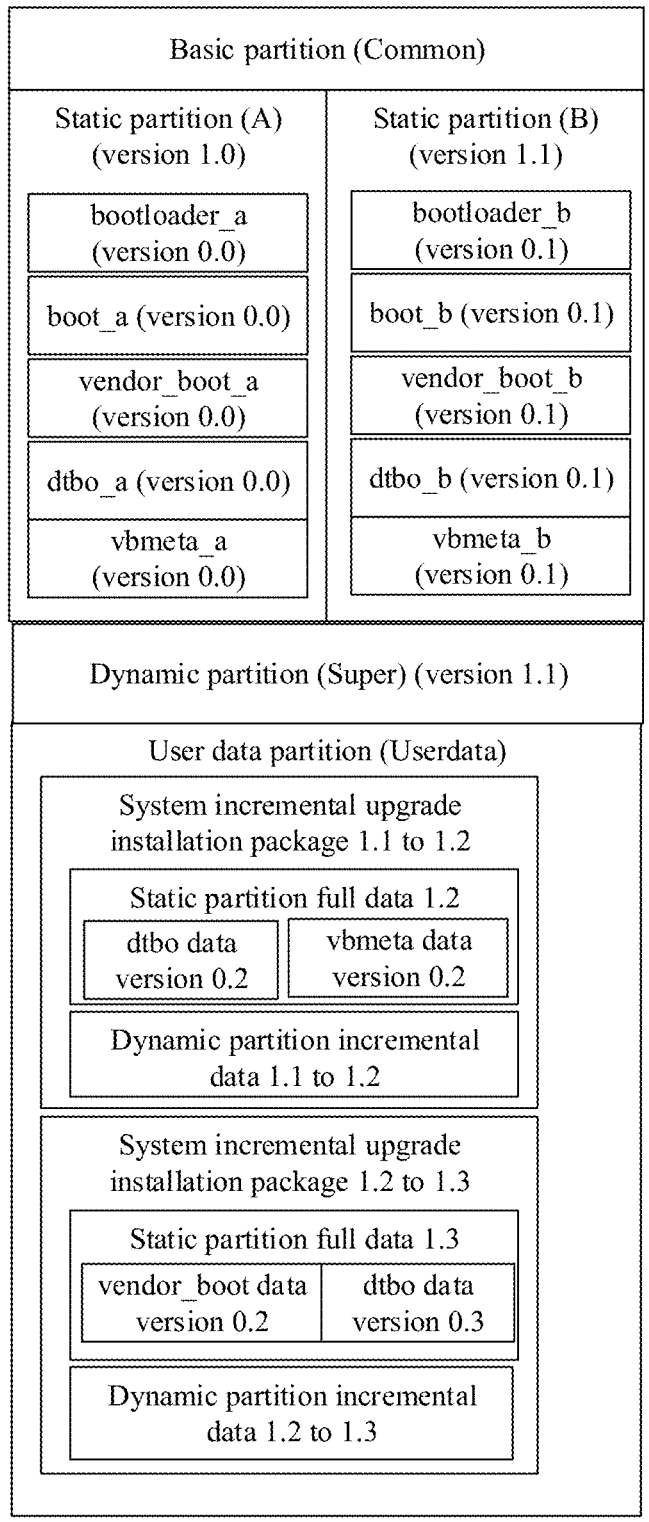
FIG. 12a(2)

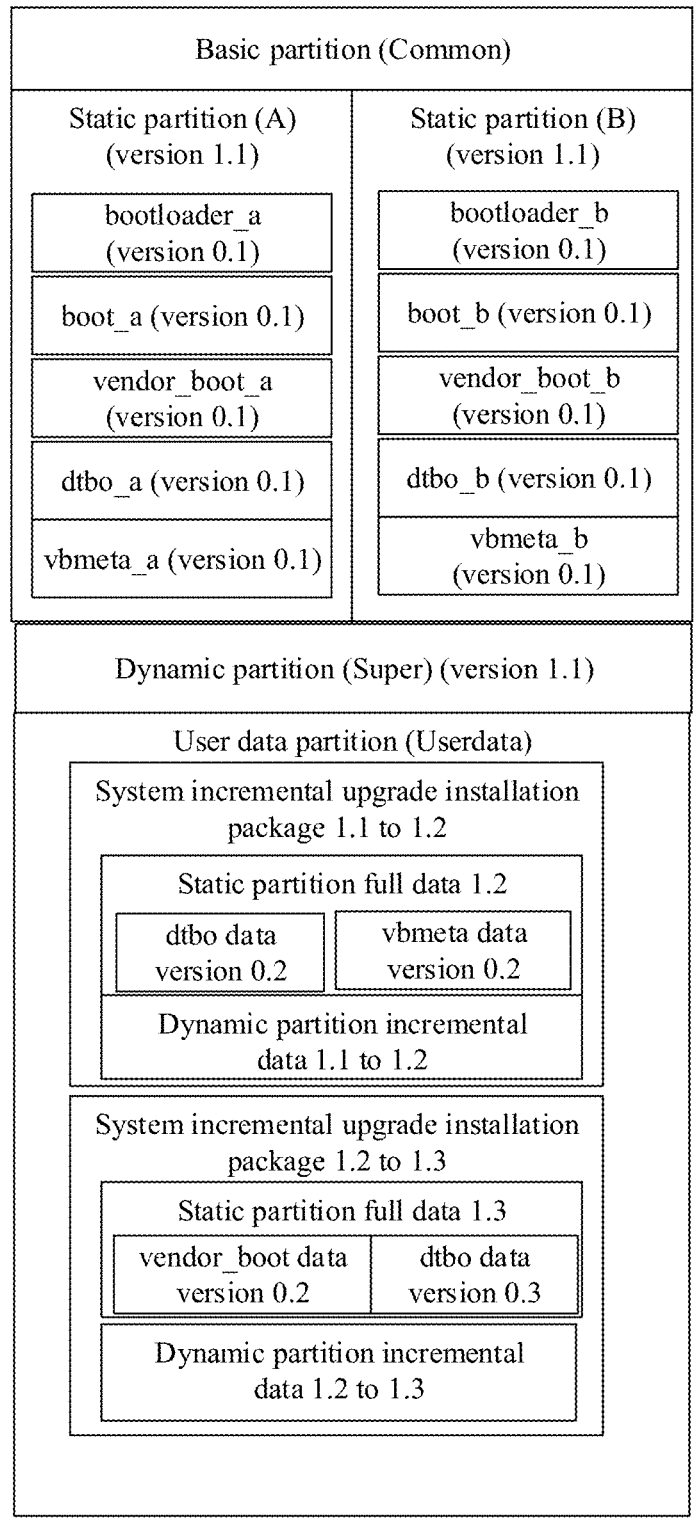
FIG. 12a(3)

OPERATING SYSTEM UPGRADE METHOD, DEVICE, STORAGE MEDIUM, AND COMPUTER PROGRAM PRODUCT

CROSS-REFERENCE TO RELATED APPLICATIONS

This application is a national stage of International Application No. PCT/CN2022/098854, filed on Jun. 15, 2022, which claims priority to Chinese Patent Application No. 202110661865.2, filed on Jun. 15, 2021. The disclosures of both of the aforementioned applications are hereby incorporated by reference in their entireties.

TECHNICAL FIELD

This application relates to the field of computer technologies, and specifically, to an operating system upgrade method, a device, a storage medium, and a computer program product.

BACKGROUND

In an application scenario in the conventional technology, a user terminal can be used by a user only after an operating system is installed on the user terminal. For example, a mobile phone can be used by a user only after a mobile phone operating system (such as an iOS system or an Android system) is installed on the mobile phone.

After the operating system is installed on the terminal device, when there is an upgraded version for the operating system, the operating system installed on the terminal device needs to be upgraded. Usually, the version of the operating system is upgraded a plurality of times periodically or aperiodically, for example, upgraded from a version 1.1 to a version 1.2, upgraded from a version 1.2 to a version 1.3, or upgraded from a version 1.3 to a version 1.4.

To ensure that the operating system on the device has the latest version, the operating system installed on the terminal device needs to be updated when an operating system with a new version is released, so that the operating system on the terminal device is upgraded to the latest version.

However, in an actual application scenario, not all users synchronously upgrade operating systems on devices of the users when a version of an operating system is released. Therefore, after an operating system with a specific version is released, a plurality of different version upgrade requirements exist. For example, after an operating system with a version 1.2 is released, some users do not upgrade operating systems with a version 1.1 on devices of the users to the version 1.2. Then, an operating system with a version 1.3 is released. In this case, there is a requirement for upgrade from the operating system with the version 1.1 to the version 1.2 and a requirement for upgrade from the operating system with the version 1.2 to the version 1.3. Therefore, an operating system upgrade method for different version upgrade requirements is required.

SUMMARY

In view of this, this application provides an operating system upgrade method, a device, a storage medium, and a computer program product, to help resolve a problem of upgrading operating systems with different old versions to an operating system with a latest version in the conventional technology.

According to a first aspect, an embodiment of this application provides an operating system upgrade method, applied to an electronic device. The electronic device includes a processor and a memory, the memory includes a basic partition, a first static partition, a second static partition, a dynamic partition, and a user data partition, and the method includes:
    loading data in the basic partition, the first static partition, and the dynamic partition to run a first operating system;
    obtaining a first system upgrade installation package and a second system upgrade installation package, where the first system upgrade installation package includes first update data for updating data in the dynamic partition, the first system upgrade installation package is used to upgrade the first operating system to a second operating system, the second system upgrade installation package includes second update data for updating the data in the dynamic partition, and the second system upgrade installation package is used to upgrade the second operating system to a third operating system;
    creating a virtual dynamic partition in the user data partition, and storing the first update data and the second update data in the virtual dynamic partition;
    modifying a startup sequence of the electronic device from starting from the first static partition to starting from the second static partition;
    restarting the electronic device, and determining that a current startup sequence is starting from the second static partition;
    loading data in the basic partition;
    loading data in the second static partition;
    loading first dynamic partition data to run the third operating system, where the first dynamic partition data is all or a part of second dynamic partition data, the second dynamic partition data corresponds to a result of superposition of third dynamic partition data and the second update data, and the third dynamic partition data corresponds to a result of superposition of the data in the dynamic partition and the first update data;
    merging the first update data into the dynamic partition; and
    merging the second update data into the dynamic partition.

In an implementation of the first aspect,
the creating a virtual dynamic partition in the user data partition, and storing the first update data and the second update data in the virtual dynamic partition includes: storing the first update data and the second update data in the user data partition in a form of COW files; and
the loading first dynamic partition data to run the third operating system includes: loading the data in the dynamic partition, a COW file of the first update data, and a COW file of the second update data based on a snapshot technology.

In an implementation of the first aspect, the first system upgrade installation package further includes first static partition full data, and the second system upgrade installation package further includes second static partition full data.

Before the restarting the electronic device, and determining that a current startup sequence is starting from the second static partition, the method further includes: overwriting the second static partition full data into the second static partition.

In an implementation of the first aspect, before the loading data in the second static partition, the method further includes: synchronizing data in the first static partition to the second static partition.

In an implementation of the first aspect, the first system upgrade installation package further includes first static partition update data, and the second system upgrade installation package further includes second static partition update data.

Before the restarting the electronic device, and determining that a current startup sequence is starting from the second static partition, the method further includes: upgrading the data in the second static partition from static partition data of the first operating system to static partition data of the second operating system based on the first static partition update data; and upgrading the data in the second static partition from the static partition data of the second operating system to static partition data of the third operating system based on the second static partition update data.

Before the data in the second static partition is upgraded from the static partition data of the first operating system to the static partition data of the second operating system based on the first static partition update data, the data in the first static partition is synchronized to the second static partition.

In an implementation of the first aspect, the synchronizing data in the first static partition to the second static partition includes:
  reading data in each sub-partition of the first static partition; and
  overwriting the data in each sub-partition of the first static partition into a corresponding sub-partition of the second static partition.

In an implementation of the first aspect, the synchronizing data in the first static partition to the second static partition includes:
  calculating a hash value of data in a third sub-partition, where the third sub-partition is a sub-partition of the first static partition;
  calculating a hash value of data in a fourth sub-partition, where the fourth sub-partition is a sub-partition of the second static partition, and the fourth sub-partition corresponds to the third sub-partition; and
  overwriting the data in the third sub-partition into the fourth sub-partition when the hash value of the data in the third sub-partition is inconsistent with the hash value of the data in the fourth sub-partition.

In an implementation of the first aspect, before the obtaining a first system upgrade installation package and a second system upgrade installation package, the method further includes:
  loading data in the basic partition, the second static partition, and the dynamic partition to run a fourth operating system;
  obtaining a third system upgrade installation package, where the third system upgrade installation package includes static partition upgrade data, and the third system upgrade installation package is used to upgrade the fourth operating system to the first operating system;
  upgrading the data in the first static partition based on the static partition upgrade data in the third system upgrade installation package;
  modifying the startup sequence of the electronic device from starting from the second static partition to starting from the first static partition;
  restarting the electronic device, and determining that a current startup sequence is starting from the first static partition;
  loading the data in the basic partition;
  loading the data in the first static partition; and
  loading fourth dynamic partition data to run the first operating system, where
  after the electronic device is restarted and it is determined that the current startup sequence is starting from the first static partition, the data in the first static partition is synchronized to the second static partition.

According to a second aspect, this application provides an operating system upgrade method, applied to an electronic device. The electronic device includes a processor and a memory, the memory includes a basic partition, a first static partition, a second static partition, a dynamic partition, and a user data partition, and the method includes:
  loading data in the basic partition, the first static partition, and the dynamic partition to run a first operating system;
  obtaining a first system upgrade installation package and a second system upgrade installation package, where the first system upgrade installation package includes first update data for updating data in the dynamic partition, the first system upgrade installation package is used to upgrade the first operating system to a second operating system, the second system upgrade installation package includes second update data for updating the data in the dynamic partition, and the second system upgrade installation package is used to upgrade the second operating system to a third operating system;
  creating a virtual dynamic partition in the user data partition, and storing third update data in the virtual dynamic partition, where the third update data is combined data of the first update data and the second update data, and for data in the first update data and data in the second update data that point to a same file, the data in the second update data is retained in the third update data;
  modifying a startup sequence of the electronic device from starting from the first static partition to starting from the second static partition;
  restarting the electronic device, and determining that a current startup sequence is starting from the second static partition;
  loading data in the basic partition;
  loading data in the second static partition;
  loading first dynamic partition data to run the third operating system, where the first dynamic partition data is all or a part of second dynamic partition data, and the second dynamic partition data corresponds to a result of superposition of the data in the dynamic partition and the third update data; and
  merging the third update data into the dynamic partition.

According to a third aspect, this application provides an electronic device. The electronic device includes a processor and a memory, the memory includes a basic partition, a first static partition, a second static partition, a dynamic partition, and a user data partition, and the processor is configured to execute software code stored in the memory, to enable the electronic device to perform the method procedure according to the first aspect.

According to a fourth aspect, this application provides an electronic device. The electronic device includes a processor and a memory, the memory includes a basic partition, a first static partition, a second static partition, a dynamic partition, and a user data partition, and the processor is configured to execute software code stored in the memory, to enable the electronic device to perform the method procedure according to the second aspect.

According to a fifth aspect, this application provides a computer-readable storage medium. The computer-readable storage medium stores a computer program, and when the computer program is run on a computer, the computer is enabled to perform the method according to the first aspect or the second aspect.

According to a sixth aspect, this application provides a computer program product. The computer program product includes a computer program, and when the computer program is run on a computer, the computer is enabled to perform the method according to the first aspect or the second aspect.

According to the foregoing technical solutions provided in embodiments of this application, at least the following technical effects may be implemented.

According to the method in embodiments of this application, cross-version operating system upgrade can be implemented. This resolves a problem of upgrading systems with different old versions to an operating system with a latest version in an operating system upgrade scenario. According to the method in embodiments of this application, a quantity of versions of operating system upgrade packages that need to be released when an operating system with a new version is released can be effectively reduced, and workload of releasing operating system upgrade packages can be greatly reduced.

BRIEF DESCRIPTION OF DRAWINGS

To describe the technical solutions in embodiments of this application more clearly, the following briefly describes the accompanying drawings for describing the embodiments. It is clear that, the accompanying drawings in the following description show merely some embodiments of this application, and a person of ordinary skill in the art may still derive other drawings from these accompanying drawings without creative efforts.

FIG. 7a(1) and FIG. 7a(2) are a flowchart of operating system upgrade according to an embodiment of this application;

FIG. 8a(1) and FIG. 8a(2) are a flowchart of operating system upgrade according to an embodiment of this application;

FIG. 9 is a schematic diagram of a static partition data change according to an embodiment of this application;

FIG. 12a(1) to FIG. 12a(3) are a schematic diagram of a data storage change according to an embodiment of this application;

DESCRIPTION OF EMBODIMENTS

To better understand the technical solutions of this application, the following describes embodiments of this application in detail with reference to the accompanying drawings.

It should be noted that the described embodiments are merely some but not all of embodiments of this application. Based on embodiments of this application, all other embodiments obtained by a person of ordinary skill in the art without creative efforts fall within the protection scope of this application.

Terms used in embodiments of this application are merely for the purpose of describing specific embodiments, but are not intended to limit this application. Terms "a", "the", and "this" in singular forms in embodiments of this application and the appended claims are also intended to include plural forms, unless otherwise stated in the context clearly.

It should be understood that the term "and/or" used in this specification is merely an association relationship for describing associated objects, and indicates that there may be three relationships. For example, A and/or B may indicate the following three cases: Only A exists, both A and B exist, and only B exists. In addition, the character "/" in this specification usually indicates an "or" relationship between the associated objects.

For operating system upgrade, a feasible solution is to update all operating system data and reinstall an operating system by using a full upgrade solution. In this way, an original operating system version does not need to be considered, but only all the operating system data needs to be replaced with operating system data with a latest version.

For example, after an operating system installation package with a latest version is obtained, a running state of a current operating system is exited, a recovery (Recovery) mode is entered, and all operating system data on a device is overwritten in the recovery (Recover) mode, to reinstall the operating system.

Figure 1:
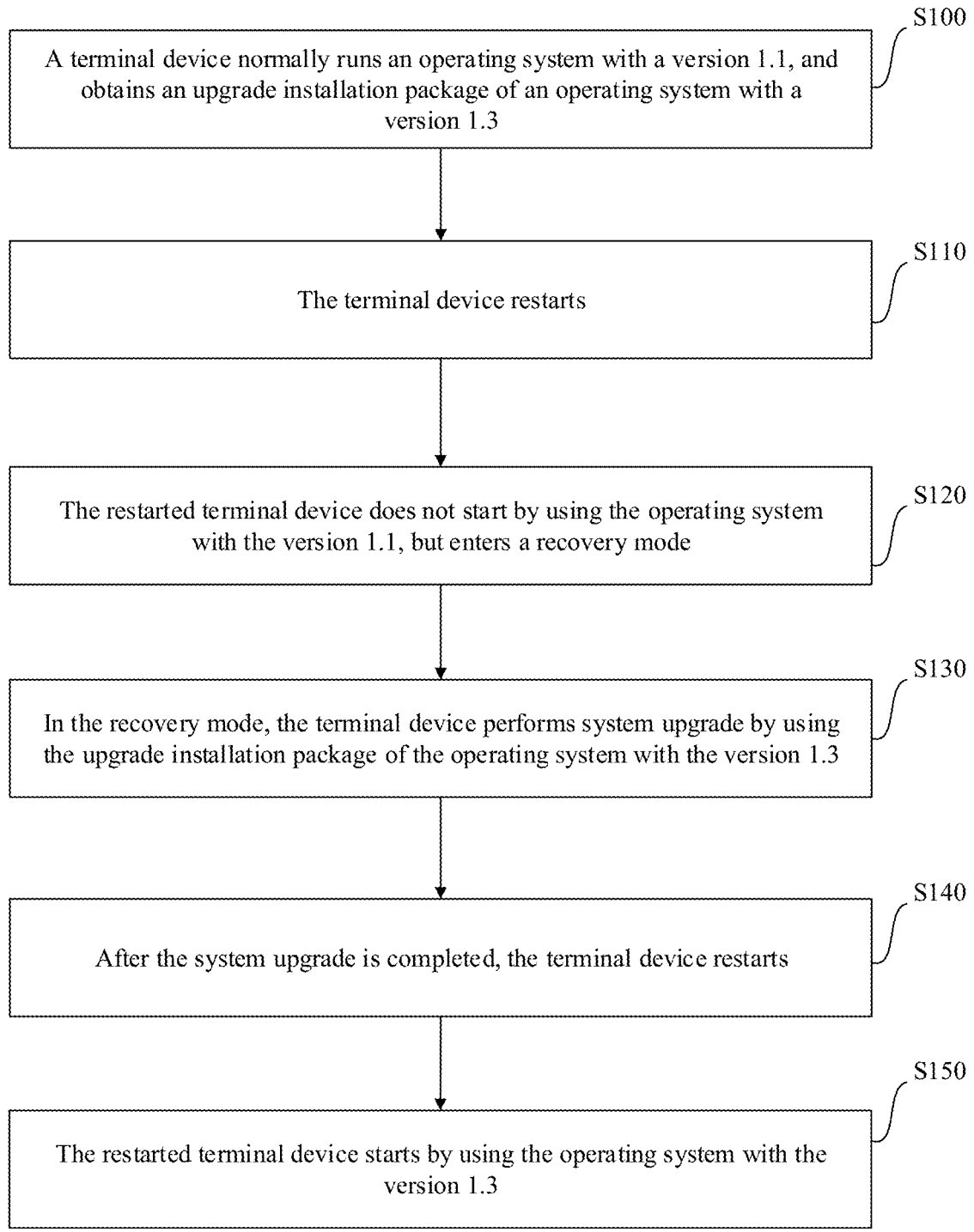
FIG. 1 is a flowchart of operating system upgrade according to an embodiment of this application.

FIG. 1 is a flowchart of operating system upgrade according to an embodiment of this application. It is assumed that a version of an operating system currently run on a terminal device is 1.1 and needs to be upgraded to a version 1.3. The terminal device upgrades the operating system according to a procedure shown in FIG. 1.

S100: The terminal device normally runs the operating system with the version 1.1, and obtains an upgrade installation package of an operating system with the version 1.3.

For example, in a feasible implementation, the device periodically initiates a package search request to a package search server, where the package search request includes a version number (for example, version 1.1) of an operating system currently run on the device; the package search server retrieves, based on the operating system version number in the package search request, whether there is currently an operating system installation package with an updated version number (for example, version 1.3); when there is an operating system installation package with an updated version, the package search server feeds back a download address of the operating system installation package with the latest version (for example, an operating system installation package with the version 1.3) to the device; and the device downloads the operating system installation package based on the download address of the operating system upgrade installation package.

S110: The terminal device restarts.

S120: The restarted terminal device does not start by using the operating system with the version 1.1, but enters a recovery mode.

S130: In the recovery mode, the terminal device reinstalls the operating system on the terminal device by using the operating system installation package with the version 1.3.

Specifically, the terminal device extracts operating system data with the version 1.3 from the operating system installation package with the version 1.3, and overwrites original operating system data (operating system data with the version 1.3) on the terminal device by using the operating system data with the version 1.3. In S130, when the terminal device overwrites the original operating system data on the terminal device by using the operating system data with the version 1.3, a version of the original operating system data on the terminal device does not need to be considered. For example, the version of the original operating system data on the terminal device may be 1.0, 1.1, or 1.2. After data overwriting is performed by using the operating system data with the version 1.3, all operating system data on the terminal device is the operating system data with the version 1.3.

S140: After the system upgrade is completed, the terminal device restarts.

S150: The restarted terminal device starts by using the operating system with the version 1.3.

In the solution shown in FIG. 1, the terminal device can perform system upgrade only after the terminal device restarts and enters the recovery mode. After the terminal device enters the recovery mode, most functions of the terminal device cannot be used. To be specific, in a process of upgrading the operating system of the terminal device, a user can only wait for the terminal device to update and upgrade a system file, but cannot normally use the terminal device. This greatly reduces user experience. Therefore, in a feasible operating system upgrade solution, the operating system is not upgraded in the recovery mode, but an A/B upgrade solution is used to perform senseless upgrade during normal running of the terminal device.

Figure 2:
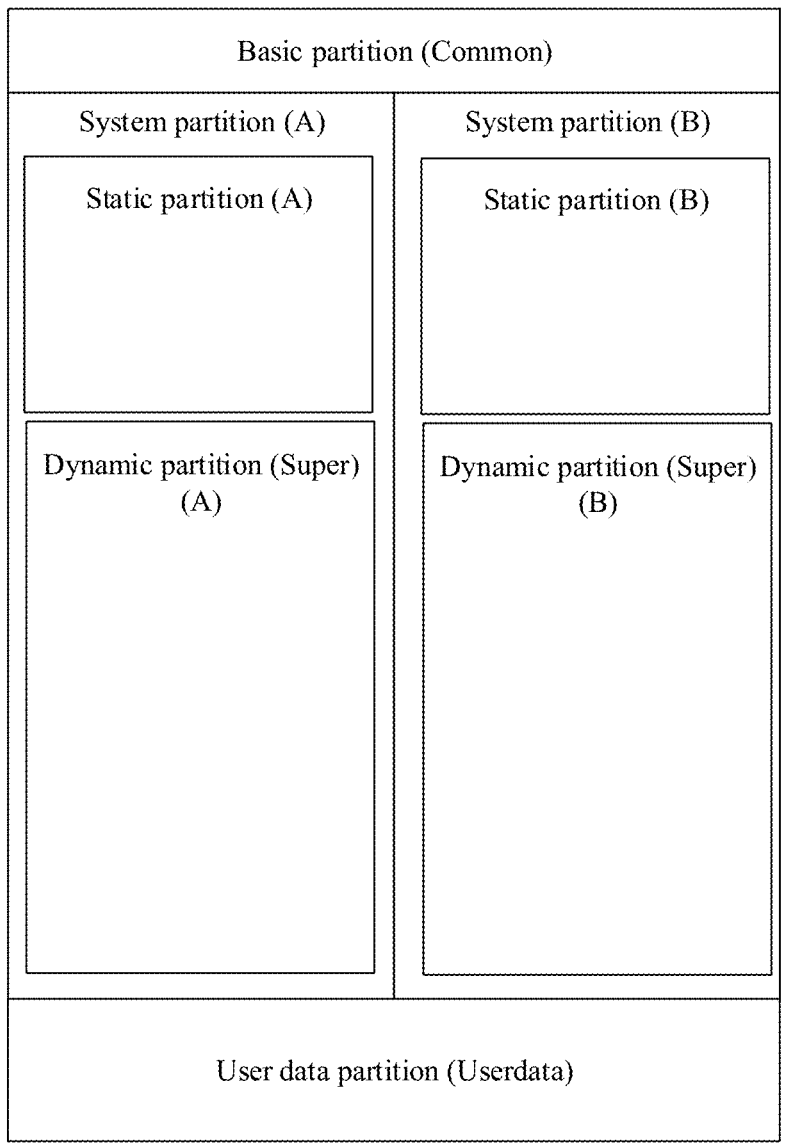
FIG. 2 is a schematic diagram of a data storage structure according to an embodiment of this application.

FIG. 2 is a schematic diagram of a data storage structure according to an embodiment of this application. As shown in FIG. 2, a data storage area on a terminal device is divided into four parts: a basic partition (Common), a system partition (A), a system partition (B), and a user data partition (Userdata). The user data partition (Userdata) is used to store personal data of a user, for example, an app installed by the user, and a picture, a document, and a video stored by the user. Data stored in a basic part is system data that is not related to operating system upgrade, for example, a basic partition (Common) in Android system data. The system partition (A) and the system partition (B) are independent of each other, and each store complete operating system data. For example, the system partition (A) and the system partition (B) each include a static partition (bootloader, boot, vendor_boot, dtbo, vbmeta) and a dynamic partition (Super) super. As shown in FIG. 2, the system partition (A) includes a static partition (A) and a dynamic partition (Super) (A), and the system partition (B) includes a static partition (B) and a dynamic partition (Super) (B).

Figure 3:
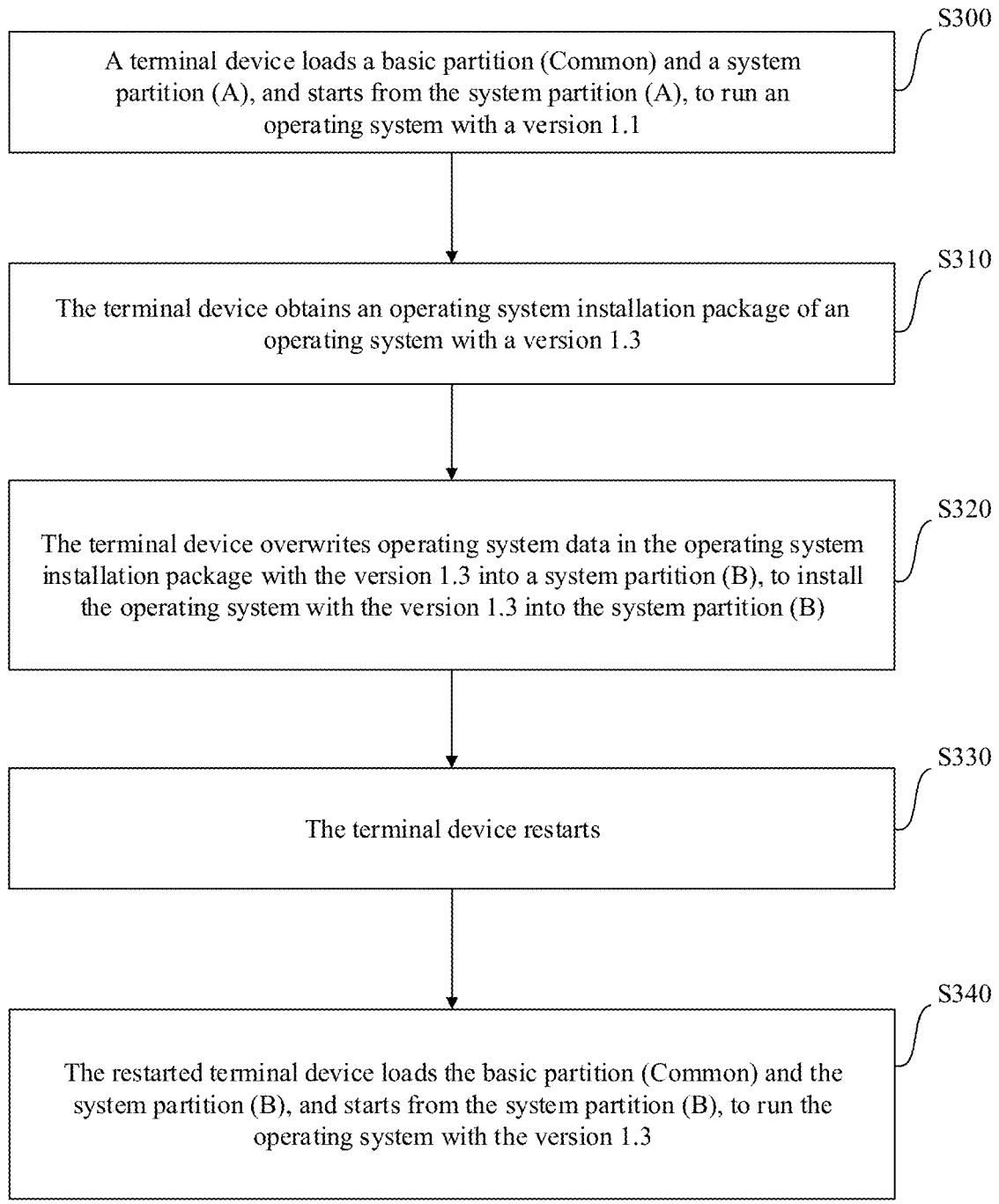
FIG. 3 is a flowchart of operating system upgrade according to an embodiment of this application.

FIG. 3 is a flowchart of operating system upgrade for the storage structure of the terminal device in the embodiment shown in FIG. 2. It is assumed that an operating system version corresponding to the operating system data stored in the system partition (A) is 1.1. The terminal device starts from the system partition (A), to run an operating system with the version 1.1. It is assumed that upgrade to an operating system with a version 1.3 needs to be performed currently. The terminal device upgrades the operating system according to a procedure shown in FIG. 3.

S300: The terminal device loads the basic partition (Common) and the system partition (A), and starts from the system partition (A), to run the operating system with the version 1.1.

S310: The terminal device obtains an operating system installation package of the operating system with the version 1.3.

S320: The terminal device overwrites operating system data in the operating system installation package with the version 1.3 into the system partition (B), to install the operating system with the version 1.3 into the system partition (B).

In S320, the write operation on the operating system data is performed for the system partition (B), and does not affect data in the system partition (A). Therefore, in an entire operating system upgrade process, a user can normally use the terminal device.

S330: The terminal device restarts.

After S320, because the data in the system partition (A) does not change, the terminal device does not need to restart immediately (S330 does not need to be performed immediately), and the user may autonomously select a restart occasion. In this way, the operating system upgrade process does not affect use of the terminal device by the user. This greatly improves user experience.

S340: The restarted terminal device loads the basic partition (Common) and the system partition (B), and starts from the system partition (B), to run the operating system with the version 1.3 and complete operating system upgrade.

Based on the solution shown in FIG. 2 and FIG. 3, although senseless upgrade can be performed during normal running of the terminal device, when the terminal device is normally used, in a non-upgrade state, only one of the system partition (A) and the system partition (B) is used, and the other partition is idle. As a result, data storage space utilization is low, and data storage space that can be freely used by the user is greatly reduced. Therefore, in a feasible operating system upgrade solution, a virtual partition-based A/B upgrade solution is used.

Figure 4:
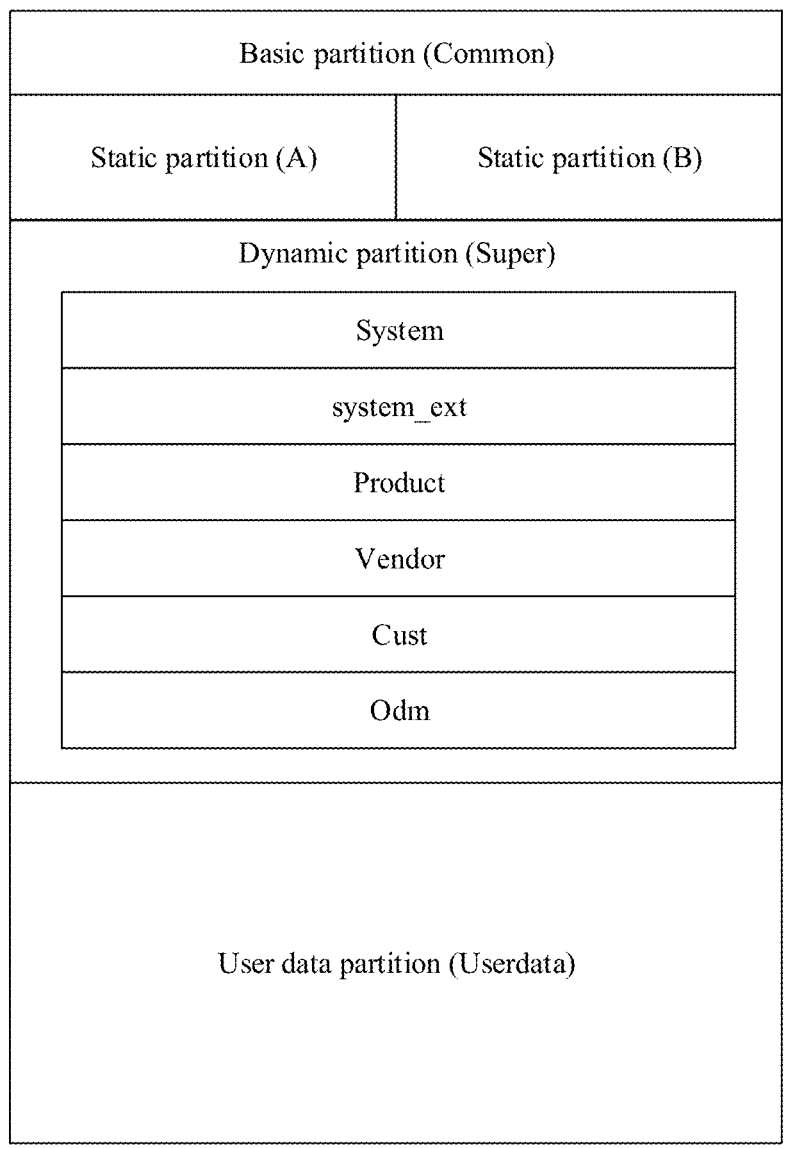
FIG. 4 is a schematic diagram of a data storage structure according to an embodiment of this application.

An Android system is used as an example. FIG. 4 is a schematic diagram of a data storage structure according to an embodiment of this application. As shown in FIG. 4, a data storage area of the Android system includes a basic partition (Common), a static partition (A), a static partition (B), a dynamic partition (Super), and a user data partition (Userdata).

The user data partition (Userdata) is used to store personal data of a user, for example, an app installed by the user, and a picture, a document, and a video stored by the user. Data stored in a basic part is system data that is not related to operating system upgrade. A structure of the static partition (A) corresponds to a structure of the static partition (B), and sub-partition names are distinguished from each other by using suffixes_a and _b. For example, the static partition (A) includes bootloader_a, boot_a, vendor_boot_a, dtbo_a, and vbmeta_a, and the static partition (B) includes bootloader_b, boot_b, vendor_boot_b, dtbo_b, and vbmeta_b. The dynamic partition (Super) includes a plurality of sub-partitions (System, system_ext, vendor, product, Cust, Odm).

When the device starts, the device starts from a static partition. For example, the device starts from the static partition (A), and sequentially loads the basic partition (Common), the static partition (A), and the dynamic partition (Super); or the device starts from the static partition (B), and sequentially loads the basic partition (Common), the static partition (B), and the dynamic partition (Super).

Figure 5A:
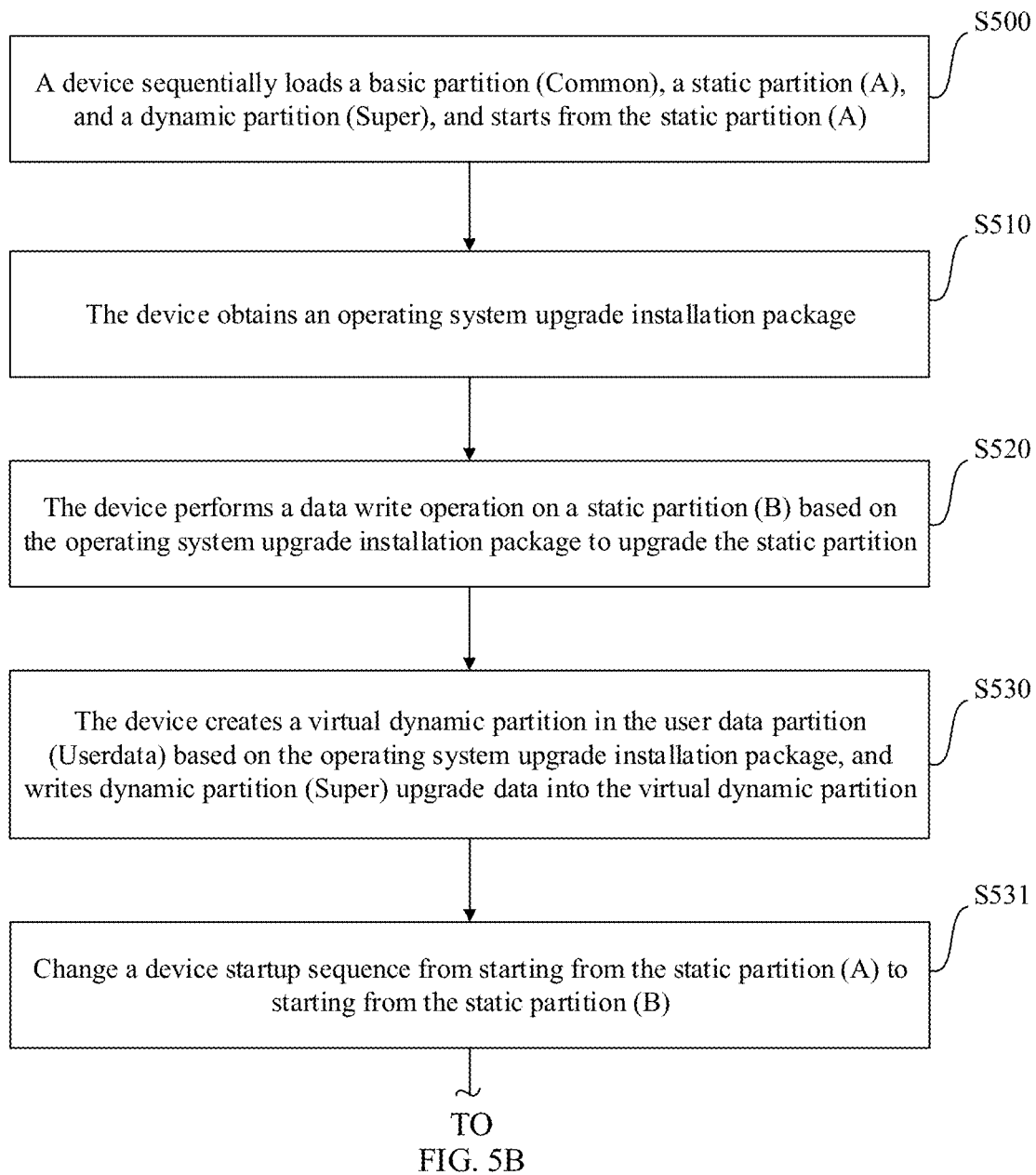
FIG. 5A and FIG. 5B are a flowchart of operating system upgrade according to an embodiment of this application.
Figure 5B:
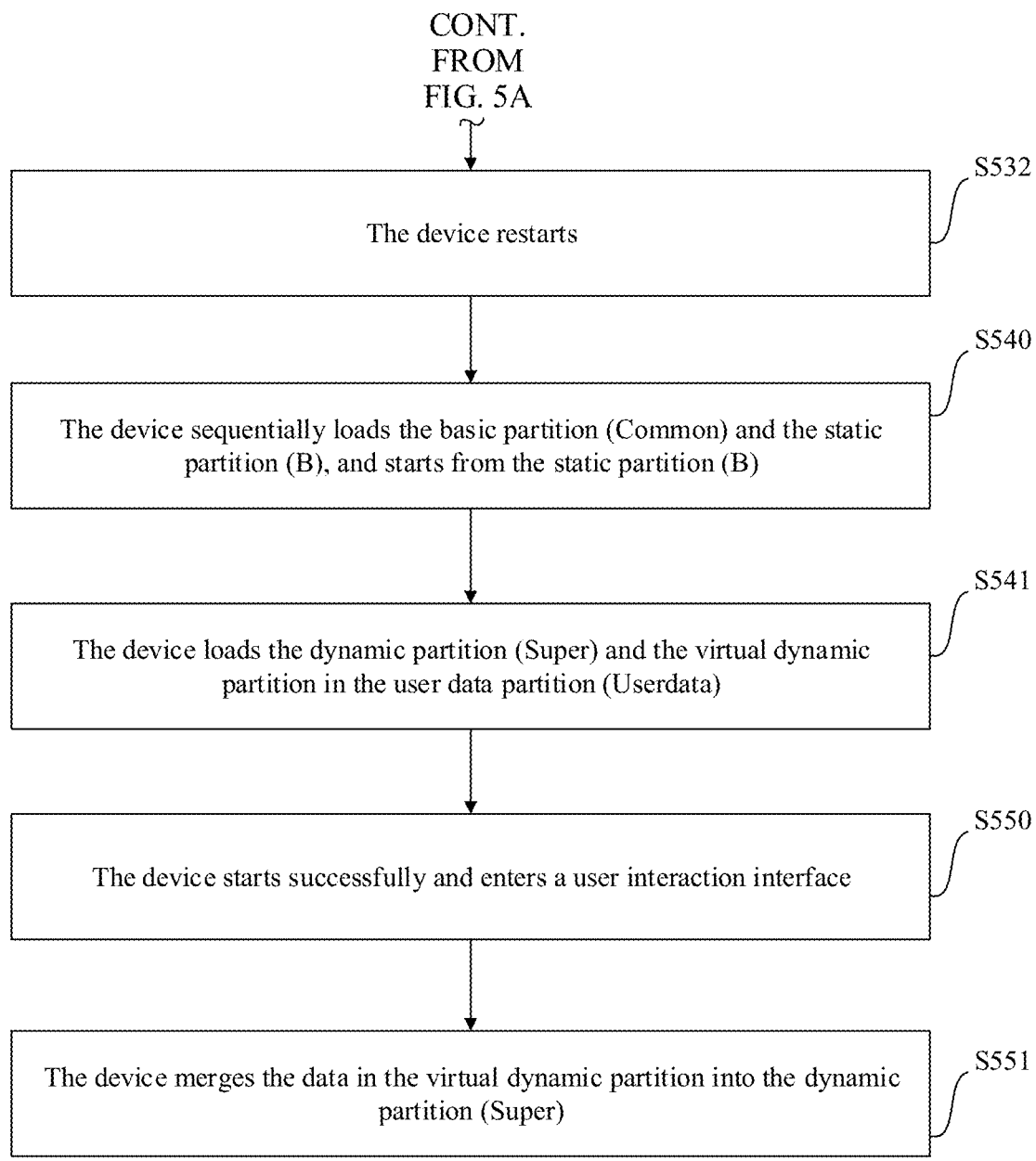

FIG. 5A and FIG. 5B are a flowchart of operating system upgrade for the data storage structure of the operating system in the embodiment shown in FIG. 4. When the device currently starts from the static partition (A), the device upgrades the operating system according to a procedure shown in FIG. 5A and FIG. 5B.

S500: The device sequentially loads the basic partition (Common), the static partition (A), and the dynamic partition (Super), and starts from the static partition (A).

S510: The device obtains an operating system upgrade installation package.

For example, in a feasible implementation, the device periodically initiates a package search request to a package search server, where the package search request includes a version number (for example, version 1.1) of an operating system currently run on the device; the package search server retrieves, based on the operating system version number in the package search request, whether there is currently an operating system installation package with an updated version number (for example, version 1.3); when there is an operating system installation package with an updated version, the package search server feeds back a download address of the operating system upgrade installation package (for example, a system incremental upgrade installation package for upgrade from the version 1.1 to the version 1.3) to the device; and the device downloads the operating system upgrade installation package based on the download address of the operating system upgrade installation package.

S520: The device performs a data write operation on the static partition (B) based on the operating system upgrade installation package to upgrade the static partition.

For example, the system incremental upgrade installation package for upgrade from the version 1.1 to the version 1.3 includes full data of a static partition with the version 1.3, and the device overwrites the data of the static partition with the version 1.3 into the static partition (B).

S530: The device creates a virtual dynamic partition in the user data partition (Userdata) based on the operating system upgrade installation package, and writes dynamic partition (Super) upgrade data into the virtual dynamic partition. For example, the operating system upgrade installation package includes data of a dynamic partition with the version 1.3, and the device writes the data of the dynamic partition (Super) with the version 1.3 into the virtual dynamic partition.

Further, in a virtual A/B upgrade solution, an incremental upgrade manner is used for the dynamic partition (Super). During upgrade, the virtual dynamic partition in the user data partition (Userdata) stores not all files of a dynamic partition (Super) with an upgraded new version, but an upgrade result that is of data to be upgraded in the dynamic partition (Super) with an old version and that is obtained after upgrade. In other words, the virtual dynamic partition in the user data partition (Userdata) stores update data of the dynamic partition.

A system sub-partition is used as an example. It is assumed that in the version 1.1, data in the system sub-partition may be divided into two parts: system1 and system2. During upgrade from the version 1.1 to the version 1.3, the data system2 does not change, and the data system1 is upgraded to system3. In this case, in S530, the device creates the virtual dynamic partition in the user data partition (Userdata), and writes the data system3 into the virtual dynamic partition.

For example, the system incremental upgrade installation package for upgrade from the version 1.1 to the version 1.3 includes dynamic partition (Super) update data for upgrade from the version 1.1 to the version 1.3, and the dynamic partition (Super) update data includes the data system3.

Further, in the virtual A/B upgrade solution, incremental upgrade of the dynamic partition (Super) is implemented based on a snapshot (snapshot) technology. Specifically, in the virtual dynamic partition in the user data partition (Userdata), a copy-on-write (Copy-On-Write, COW) file is used to store the dynamic partition (Super) upgrade data.

Specifically, the dynamic partition (Super) upgrade data stored in the user data partition (Userdata) includes a plurality of COW files, each COW file is corresponding to one sub-partition of the dynamic partition (Super), and a name of the COW file is corresponding to the sub-partition of the dynamic partition (Super).

In the operating system upgrade installation package obtained in S510, the COW file in the dynamic partition (Super) upgrade data is compressed and stored in a form of binary code. In the operating system upgrade installation package, each COW file is named based on the sub-partition of the dynamic partition (Super) corresponding to the COW file. For example, a COW file corresponding to the system sub-partition is named system-cow-img.img.0000.

In S530, the device unpacks the operating system upgrade installation package to obtain all COW files, and adds an A/B partition tag to each COW file. Specifically, when the device currently starts from the static partition (A), it may be understood that a dynamic partition (Super) currently loaded by the device to run the operating system is a dynamic partition (A). When the operating system is upgraded, the virtual dynamic partition created in the user data partition (Userdata) is for a dynamic partition (B). Therefore, a name tag _b corresponding to the dynamic partition (B) is added to a COW file. For example, _b is added to system-cow-img.img.0000 to generate system_b-cow-img.img.0000.

Further, in S530, an update folder is created in the user data partition (Userdata), and a renamed COW file is stored in the update folder. For example, in an application scenario, after the COW file is written into the user data partition (Userdata), the update folder in the user data partition (Userdata) includes the following files:
system_b-cow-img.img.0000;
system_ext_b-cow-img.img.0000;
vendor_b-cow-img.img.0000;
product_b-cow-img.img.0000;
cust_b-cow-img.img.0000;
odm_b-cow-img.img.0000.

Specifically, the COW file includes a COW file map (snapshot map) of the COW file and upgrade data.

The COW file map (snapshot) corresponds to a file map of a sub-partition of a dynamic partition (Super) corresponding to the COW file. The file map of the sub-partition of the dynamic partition (Super) is used to describe all files in a sub-partition of a dynamic partition (Super) of an operating system with a current version (version before current upgrade, for example, version 1.1) and a storage address of each file.

The upgrade data in the COW file is an updated file in sub-partition data of a new version compared with sub-partition data of the current version. The COW file map of the COW file is used to describe a correspondence between the updated file and a file in a sub-partition with the current version and a storage address of the updated file.

Based on the file map of the sub-partition of the dynamic partition (Super) and the COW file map of the COW file, the upgrade data in the COW file may be used to replace the corresponding file in the sub-partition of the dynamic partition (Super), to upgrade data in the dynamic partition (Super). Specifically, when the file map of the sub-partition of the dynamic partition (Super) needs to be obtained, a snapshot operation may be performed on the data in the sub-partition of the dynamic partition (Super) based on a snapshot, to generate the file map of the sub-partition of the dynamic partition (Super). Alternatively, when the operating system upgrade installation package is created, the file map of the sub-partition of the dynamic partition (Super) may be generated in advance, and the file map is added to the COW file.

The system sub-partition is used as an example. It is assumed that data is stored in the system sub-partition according to the following paths:
/system/app/A0.XXX;
/system/app/A1.XXX;
/system/app/A2.XXX;
/system/B0.XXX;
/system/B1.XXX;
/system/user/C0.XXX;
/system/user/C1.XXX;
/system/user/C2.XXX;
/system/user/C3.XXX.

A file map of the system sub-partition may be:
/system/app/A0.XXX: 024010~024013;
/system/app/A1.XXX: 024014~024017;
/system/app/A2.XXX: 024018~024020;
/system/B0.XXX: 024021~024026;
/system/B1.XXX: 024027~024028;
/system/user/C0.XXX: 024029~024032;
/system/user/C1.XXX: 024033~024035;
/system/user/C2.XXX: 024036~024040;
/system/user/C3.XXX: 024041~024044.

A value following a file name (for example, 024010~024013 in /system/app/A0.XXX: 024010~024013) is a physical storage address (block address) of the file in the system sub-partition of the dynamic partition (Super).

It is assumed that data /system/app/A2.XXX and data /system/user/C2.XXX need to be updated in current operating system upgrade.

It may be considered that:
/system/app/A2.XXX and /system/user/C2.XXX are a system1 part of the data in the system sub-partition; and
/system/app/A0.XXX, /system/app/A1.XXX, /system/B0.XXX, /system/B1.XXX, /system/user/C0.XXX, /system/user/C1.XXX, and /system/user/C3.XXX are a system2 part of the data in the system sub-partition.

In this case, the COW file (system_b-cow-img.img.0000) corresponding to the system sub-partition includes the latest /system/app/A2.XXX and /system/user/C2.XXX. It may be considered that the latest /system/app/A2.XXX and /system/user/C2.XXX are system3. An upgrade objective is to use system3 to update system1.

When a size of update data in the COW file is consistent with a size of to-be-updated original data, and a storage location of the update data in the COW file in the sub-partition after data update is consistent with a storage location of the to-be-updated original data in the sub-partition, the COW file map of the COW file (system_b-cow-img.img.0000) may be:
/system/app/A2.XXX:
Map1 (address of the to-be-updated data in the original super partition): start address (address start): 024018 (offset relative to a system start address); offset size (size): 2 (that is, data of an address segment 024018~024020);
Map2 (address of the update data stored in the cow file): start address (address start): 045033 (offset relative to a start address stored in the cow file); offset size (size): 2 (that is, data of an address segment 045033~045035);
/system/user/C2.XXX:
Map1 (address of the to-be-updated data in the original super partition): start address (address start): 024036 (offset relative to a system start address); offset size (size): 4 (that is, data of an address segment 024036~024040);
Map2 (address of the update data stored in the cow file): start address (address start): 045036 (offset relative to a start address stored in the cow file); offset size (size): 4 (that is, data of an address segment 045036~045040).

When a size of update data in the COW file is inconsistent with a size of to-be-updated original data, the COW file map of the COW file (system_b-cow-img.img.0000) may be:
/system/app/A2.XXX:
Map1.1 (address of the to-be-updated data in the original super partition): start address (address start): 024018 (offset relative to a system start address); offset size (size): 2 (that is, data of an address segment 024018~024020);
Map2.1 (address of the update data that is stored in the cow file and that needs to cover the Map1.1 address): start address (address start): 045033 (offset relative to a start address stored in the cow file); offset size (size): 2 (that is, data of an address segment 045033~045035);

Map1.2 (to-be-written address, in the original super partition, of an excess part of the update data in the cow file relative to the size of the to-be-updated data): start address (address start): 025018 (offset relative to a system start address); offset size (size): 1 (that is, data of an address segment 025018~025020);

Map2.2 (address of the update data that is stored in the cow file and that needs to cover the Map1.2 address): start address (address start): 046033 (offset relative to a start address stored in the cow file); offset size (size): 2 (that is, data of an address segment 046033~046035).

In the following description of the specification, for ease of description, only an application scenario in which the size of the update data in the COW file is consistent with the size of the to-be-updated original data, and the storage location of the update data in the COW file in the sub-partition after data update is consistent with the storage location of the to-be-updated original data in the sub-partition is used as an example for description.

In the foregoing example, address segments (045033~045035 and 045036~045040) are respectively physical storage addresses (block addresses) of the latest /system/app/A2.XXX and /system/user/C2.XXX in the COW file (system_b-cow-img.img.0000) in the user data partition (Userdata).

In this way, if A2.XXX on the address 045033~045035 is used to replace A2.XXX on the address 024018~024020, and C2.XXX on the address 045036~045040 is used to replace C2.XXX on the address 024036~024040, data upgrade of the system sub-partition of the dynamic partition (Super) can be completed.

Further, in S530, after the COW file is written into the user data partition (Userdata), overall verification further needs to be performed on the dynamic partition (Super) and the COW file, to verify validity of the dynamic partition (Super) and the COW file, and verify whether a combination result of the dynamic partition (Super) data and the COW file of the current version is dynamic partition (Super) data of a new version.

Specifically, upgrade from the version 1.1 to a version 1.3 is used as an example. A hash value of a combination result of data that does not need to be upgraded (data that does not change from the version 1.1 to the version 1.3) in the dynamic partition (Super) and upgrade data (data that needs to be upgraded from the version 1.1 to the version 1.3) in the COW file is calculated, and whether the hash value is consistent with a hash value of complete data in the dynamic partition (Super) with the version 1.3 is determined. If the hash values are consistent, it indicates that the COW file is valid. If the hash values are not consistent, it indicates that the COW file is invalid, the upgrade fails, the upgrade process is interrupted, and an error is reported. The hash value of the complete data in the dynamic partition (Super) with the version 1.3 is stored in the operating system upgrade installation package.

Specifically, in a verification process, the dynamic partition (Super) and the COW file are combined based on a snapshot. In an implementation process based on the snapshot, combination of the dynamic partition (Super) and the COW file is not physical combination, but combining the overall file map of the sub-partition of the COW file and the COW file map of the COW file, to generate a file map of sub-partition data of a new version.

For example, the file map of the system sub-partition is combined with the COW file map. The file map of the system sub-partition is:

/system/app/A0.XXX: 024010~024013;
/system/app/A1.XXX: 024014~024017;
/system/app/A2.XXX: 024018~024020;
/system/B0.XXX: 024021~024026;
/system/B1.XXX: 024027~024028;
/system/user/C0.XXX: 024029~024032;
/system/user/C1.XXX: 024033~024035;
/system/user/C2.XXX: 024036~024040;
/system/user/C3.XXX: 024041~024044.

The COW file map is:
/system/app/A2.XXX:
  Map1: address start: 024018; size: 2 (that is, data of an address segment 024018~024020);
  Map2: address start: 045033; size: 2 (that is, data of an address segment 045033~045035);
/system/user/C2.XXX:
  Map1: address start: 024036; size: 4 (that is, data of an address segment 024036~024040);
  Map2: address start: 045036; size: 4 (that is, data of an address segment 045036~045040).

In this case, a new-version file map of the system sub-partition is obtained:

/system/app/A0.XXX: 024010~024013 (pointing to A0.XXX in /system/app in the dynamic partition (Super));
/system/app/A1.XXX: 024014~024017 (pointing to A1.XXX in /system/app in the dynamic partition (Super));
/system/app/A2.XXX: 045033~045035 (pointing to A2.XXX in /Update/system_b-cow-img.img.0000 in the user data partition (Userdata));
/system/B0.XXX: 024021~024026 (pointing to B0.XXX in /system in the dynamic partition (Super));
/system/B1.XXX: 024027~024028 (pointing to B1.XXX in /system in the dynamic partition (Super));
/system/user/C0.XXX: 024029~024032 (pointing to C0.XXX in /system/user in the dynamic partition (Super));
/system/user/C1.XXX: 024033~024035 (pointing to C1.XXX in /system/user in the dynamic partition (Super));
/system/user/C2.XXX: 045036~045040 (pointing to C2.XXX in /Update/system_b-cow-img.img.0000 in the user data partition (Userdata));
/system/user/C3.XXX: 024041~024044 (pointing to C3.XXX in /system/user in the dynamic partition (Super)).

In the file map of the system sub-partition with the new version, a storage address of /system/app/A2.XXX does not point to /system/app/A2.XXX in the dynamic partition (Super) in a memory, but points to A2.XXX in system_b-cow-img.img.0000 in the user data partition (Userdata) in the memory; and a storage address of /system/user/C2.XXX does not point to /system/user/C2.XXX in the dynamic partition (Super) in the memory, but points to C2.XXX in system_b-cow-img.img.0000 in the user data partition (Userdata) in the memory.

In a verification process, new-version file maps of all sub-partitions of the dynamic partition (Super) are obtained in the foregoing combination manner (if a corresponding COW file of a sub-partition is not written into the user data partition (Userdata), a file map of the sub-partition is directly used as a new-version file map). The new-version file maps of all the sub-partitions are combined to generate a new-version file system of the dynamic partition (Super).

Data is read based on the new-version file system of the dynamic partition (Super), to read all files included in the new-version file system of the dynamic partition (Super) and calculate a hash value.

When the COW file is valid, merging status information in a metadata partition (/metadata) in the basic partition (Common) is changed from "merged (merged)" to "wait for merge (wait for merge)". The merging status information is used to indicate whether there is currently a COW file that needs to be merged into the dynamic partition (Super). Specifically, the merging status information includes an overall identifier for the dynamic partition (Super) and a sub-partition identifier for each sub-partition. When the overall identifier is "merged (merged)", it indicates that a merging operation needs to be performed on none of all the sub-partitions of the dynamic partition (Super). When the overall identifier is "wait for merge (wait for merge)", it indicates that a merging operation needs to be performed on one or more sub-partitions of the dynamic partition (Super). When the sub-partition identifier is "merged (merged)", it indicates that a merging operation does not need to be performed on the sub-partition. When the sub-partition identifier is "wait for merge (wait for merge)", it indicates that a merging operation needs to be performed on the sub-partition.

S531: Change a device startup sequence from starting from the static partition (A) to starting from the static partition (B).

For example, a startup sequence identifier in a master boot record (Master Boot Record, MBR) is rewritten, to rewrite the startup sequence identifier from A to B. After the device is powered on, when the device learns that the startup sequence identifier is A, the device starts from the static partition (A), and loads the static partition (A) during startup; or when the device learns that the startup sequence identifier is B, the device starts from the static partition (B), and loads the static partition (B) during startup.

S532: The device restarts. The current operating system is exited, the device is powered off, and the device is powered on again.

S540: The device sequentially loads the basic partition (Common) and the static partition (B).

S541: The device loads the dynamic partition (Super) and the virtual dynamic partition in the user data partition (Userdata).

Specifically, the device reads the merging status information in the metadata (/metadata), determines, based on the merging status information, whether a COW file needs to be retrieved from a specified path in the user data partition (Userdata), and combines and loads the dynamic partition (Super) and the COW file based on a snapshot.

Further, in S541, the device does not load all COW files in the dynamic partition (Super) and the user data partition (Userdata), but loads a corresponding file based on an operating system running requirement. Specifically, in S541, the device determines, based on the operating system running requirement, a file that needs to be loaded, extracts the corresponding file from COW files in the dynamic partition (Super) or the virtual dynamic partition based on a snapshot, and loads the file.

Specifically, in S541, when the corresponding COW file exists in a sub-partition of the dynamic partition (Super), a new-version file map of each sub-partition of the dynamic partition (Super) is first generated based on the snapshot. For a process of generating the new-version file map, refer to S530. The device determines, based on the operating system running requirement, the file that needs to be loaded, and loads the file based on the new-version file map of the sub-partition of the dynamic partition (Super).

For example, the operating system running requirement is loading all data in a directory user in the system sub-partition (/system/user). The device reads the merging status information in the metadata (/metadata), and the sub-partition identifier of the system sub-partition in the merging status information is "wait for merge (wait for merge)". Therefore, the device searches for a COW file in /Update in the user data partition (Userdata), and after finding the COW file system_b-cow-img.img.0000 in Update, generates the new-version file map of the system sub-partition based on the snapshot and the file map of the COW file in system_b-cow-img.img.0000. Data is loaded based on storage addresses of all files in /system/user in the new-version file map of the system sub-partition, for example, based on the following in the new-version file map of the system sub-partition:

/system/user/C0.XXX: 024029~024032;
/system/user/C1.XXX: 024033~024035;
/system/user/C2.XXX: 045036~045040;
/system/user/C3.XXX: 024041~024044.

C0.XXX at the address 024029~024032, C1.XXX at the address 024033~024035, C2.XXX at the address 045036~045040, and C3.XXX at the address 024041~024044 are loaded.

Further, when all data in the directory user in the system sub-partition (/system/user) is loaded, and the sub-partition identifier of the system sub-partition in the merging status information is "merged (merged)", the device does not search for a COW file in /Update in the user data partition (Userdata), but directly loads all the data in the directory user in the system sub-partition (/system/user).

Further, when all data in the directory user in the system sub-partition (/system/user) is loaded, and the sub-partition identifier of the system sub-partition in the merging status information is "wait for merge (wait for merge)", if the device does not find the COW file corresponding to the system sub-partition in /Update in the user data partition (Userdata), it indicates that a data write error (COW file write error or merging status information write error) occurs in the upgrade process. In this case, the device rolls back the system and reports the error.

Further, in S541, before the file is loaded, the device further needs to verify the to-be-loaded file. Different from S530, in S541, overall verification is not performed on the dynamic partition (Super) and the COW file, but only the file that needs to be loaded is verified. For example, verification is performed based on dmverity (dm-verity is a target (target) of a dm (device mapper), is a virtual block device, and is specially used for file system verification). If the verification succeeds, the file is loaded. If the verification fails, the device is restarted, and the system is rolled back or the file is loaded again.

S550: The device starts successfully and enters a user interaction interface.

S551: The device merges the data in the virtual dynamic partition into the dynamic partition (Super).

In the description of the specification of this application, the merging operation means that in the operating system upgrade process, a dynamic partition (Super) upgrade file (COW file) stored in the virtual dynamic partition in the user data partition (Userdata) is written into the dynamic partition (Super), to complete data upgrade of a file in the dynamic partition (Super), so that the device does not need to load both the dynamic partition (Super) and the virtual dynamic partition during next startup, but needs to load only the dynamic partition (Super) to complete device startup.

Specifically, the device performs power-on broadcast after successful startup, and starts an upgrade process after power-on broadcast. The upgrade process reads the merging status information in the metadata (/metadata) in the basic partition (Common). If the merging status information is "merged (merged)", the device enters a normal running mode.

If the merging status information is "wait for merge (wait for merge)", the upgrade process merges the COW file in the user data partition (Userdata) into the dynamic partition (Super).

Specifically, the upgrade process writes the upgrade data in the COW file in the user data partition (Userdata) into a corresponding address in the dynamic partition (Super), so that all data in the dynamic partition (Super) is data of an upgraded new version.

For example, data at the address 045033~045035 is written into the address 024014~024017 based on /system/app/A2.XXX: 024018~024020 in the file map of the system sub-partition and /system/app/A2.XXX: 045033~045035 in the COW file map. Data at the address 045036~045040 is written into the address 024036~024040 based on /system/user/C2.XXX: 024036~024040 in the file map of the system sub-partition and /system/user/C2.XXX: 045036~045040 in the COW file map.

Then, the upgrade process deletes the COW file in the user data partition (Userdata), and returns storage space to the user data partition (Userdata). In addition, the merging status information in the metadata (/metadata) in the basic partition (Common) is changed from "wait for merge (wait for merge)" to "merged (merged)".

In S520, a data operation of static partition upgrade is for operating system data in the static partition (B), and does not affect operating system data in the currently started static partition (A). In addition, in S530, a data operation of dynamic partition upgrade is completed in the virtual dynamic partition created in the user data partition (Userdata), and does not affect the currently loaded dynamic partition (Super). Therefore, in the entire operating system upgrade process, the user can normally use the device. In addition, after S531 is completed, the device does not need to restart immediately, but the user may autonomously select a restart occasion. In this way, the operating system upgrade process does not affect a normal mobile phone operation of the user. This greatly improves user experience. Further, for the dynamic partition (Super), the virtual dynamic partition is created in the user data partition (Userdata) only when upgrade needs to be performed. Therefore, data storage space utilization is effectively improved.

Further, in the upgrade procedure shown in FIG. 5A and FIG. 5B, for the static partition, a full upgrade manner is used, that is, the operating system upgrade installation package includes complete data of the static partition. In S520, the complete data of the static partition in the operating system upgrade installation package is overwritten into the static partition (B) (all data in the static partition (B) is updated).

For the dynamic partitioning (Super), an incremental upgrade manner is used.

In this embodiment of this application, incremental upgrade refers to updating a part of data of an old version to obtain an operating system with a new version. For example, the data of the old version includes four parts: S1, S2, S3, and S4. After upgrade to the new version, the data of the old version includes four parts: S1, S5, S3, and S6. Compared with the data of the old version, in the data of the new version, S2 is updated to S5, and S4 is updated to S6, and neither of S1 and S4 changes. Therefore, during incremental upgrade, the upgrade package needs to include only S5, S6, a correspondence between S5 and S2, and a correspondence between S6 and S4, but does not need to include complete new-version data. This effectively controls a data amount of the upgrade package.

Differences between operating system data of different versions are different. Therefore, based on implementation logic of incremental upgrade, an upgrade package that uses incremental upgrade can be used for only upgrade for an operating system with a fixed version. Specifically, if the operating system with the version 1.1 is upgraded to the version 1.3, in S510, the operating system upgrade installation package obtained by the device is for upgrade from the version 1.1 to the version 1.3. Specifically, the operating system upgrade installation package includes dynamic partition (Super) update data for upgrade from the version 1.1 to the version 1.3. If the operating system with the version 1.2 is upgraded to the version 1.3, in S510, the operating system upgrade installation package obtained by the device is for upgrade from the version 1.2 to the version 1.3. Specifically, the operating system upgrade installation package includes dynamic partition (Super) update data for upgrade from the version 1.2 to the version 1.3. If data in the dynamic partition (Super) is also updated when the operating system is upgraded from the version 1.1 to the version 1.2, the dynamic partition (Super) update data for upgrade from the version 1.1 to the version 1.3 is different from the dynamic partition (Super) update data for upgrade from the version 1.2 to the version 1.3.

Figure 6:
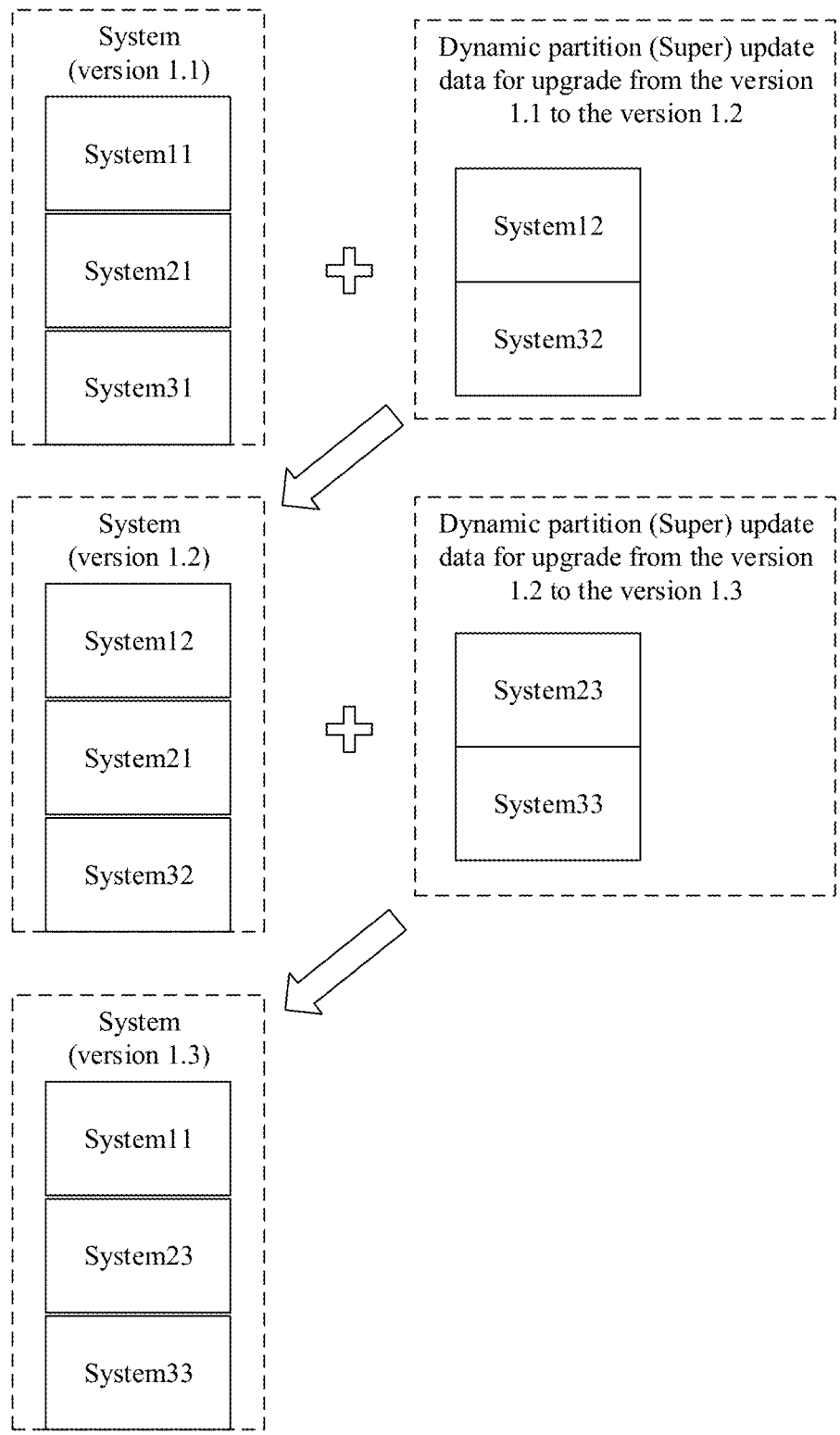
FIG. 6 is a schematic diagram of a data structure change in operating system upgrade according to an embodiment of this application.

The system sub-partition is used as an example. FIG. 6 is a schematic diagram of a data structure change in operating system upgrade according to an embodiment of this application. As shown in FIG. 6, it is assumed that in the version 1.1, data in the system sub-partition can be divided into three parts: system11, system21, and system31. During upgrade from the version 1.1 to the version 1.2, the data system2 does not change, the data system11 is upgraded to system12, and the data system31 is upgraded to system32. In this case, in the version 1.2, the data in the system sub-partition may be divided into three parts: system12, system21, and system32. The operating system upgrade installation package for upgrade from the version 1.1 to the version 1.2 includes the dynamic partition (Super) update data system12 and system32. During upgrade from the version 1.2 to the version 1.3, the data system12 does not change, the data system21 is upgraded to system23, and the data system32 is upgraded to system33. In this case, in the version 1.3, the data in the system sub-partition may be divided into three parts: system12, system23, and system33. The operating system upgrade installation package for upgrade from the version 1.2 to the version 1.3 includes the dynamic partition (Super) update data system23 and system33. If the version 1.2 is skipped and the version 1.1 is directly upgraded to the version 1.3, all of system11, system21, and system31 need to be upgraded, and the operating system upgrade installation package for upgrade from the version 1.1 to the version 1.3 includes the dynamic partition (Super) update data system12, system23, and system33.

In this case, if an initial version of the operating system is 1.1, when the operating system with the version 1.2 is released, to meet all version upgrade requirements, a system incremental upgrade installation package for upgrade from the version 1.1 to the version 1.2 needs to be released. When the operating system with the version 1.3 is released, to meet all version upgrade requirements, a system incremental upgrade installation package for upgrade from the version 1.1 to the version 1.3 and a system incremental upgrade installation package for upgrade from the version 1.2 to the version 1.3 need to be released. When an operating system with a version 1.4 is released, to meet all version upgrade requirements, a system incremental upgrade installation package for upgrade from the version 1.1 to the version 1.4, a system incremental upgrade installation package for upgrade from the version 1.2 to the version 1.4, and a system incremental upgrade installation package for upgrade from the version 1.3 to the version 1.4 need to be released. As a version is updated, a quantity of system incremental upgrade installation packages that need to be released during each version update continuously increases. This continuously increases workload of upgrade package release and data storage pressure of an upgrade package server.

For the foregoing problem, an embodiment of this application provides an operating system upgrade method. Based on the operating system upgrade method in this embodiment of this application, when an operating system with a new version is released, a system incremental upgrade installation package does not need to be separately released for each previous operating system version, but a system incremental upgrade installation package needs to be released for only the last operating system version. The system incremental upgrade installation package contains full data of a static partition and update data of a dynamic partition.

According to the method in this embodiment of this application, cross-version operating system upgrade can be implemented. This resolves a problem of upgrading systems with different old versions to an operating system with a latest version in an operating system upgrade scenario. According to the method in this embodiment of this application, a quantity of versions of operating system upgrade packages that need to be released when an operating system with a new version is released can be effectively reduced, and workload of releasing operating system upgrade packages can be greatly reduced.

FIG. 7a(1) and FIG. 7a(2) are a flowchart of operating system upgrade for the data storage structure of the operating system in the embodiment shown in FIG. 4. When the device currently starts from the static partition (A), the device upgrades the operating system according to a procedure shown in FIG. 7a(1) and FIG. 7a(2).

S700: The device sequentially loads the basic partition (Common), the static partition (A), and the dynamic partition (Super), and starts from the static partition (A).

Figure 7B:
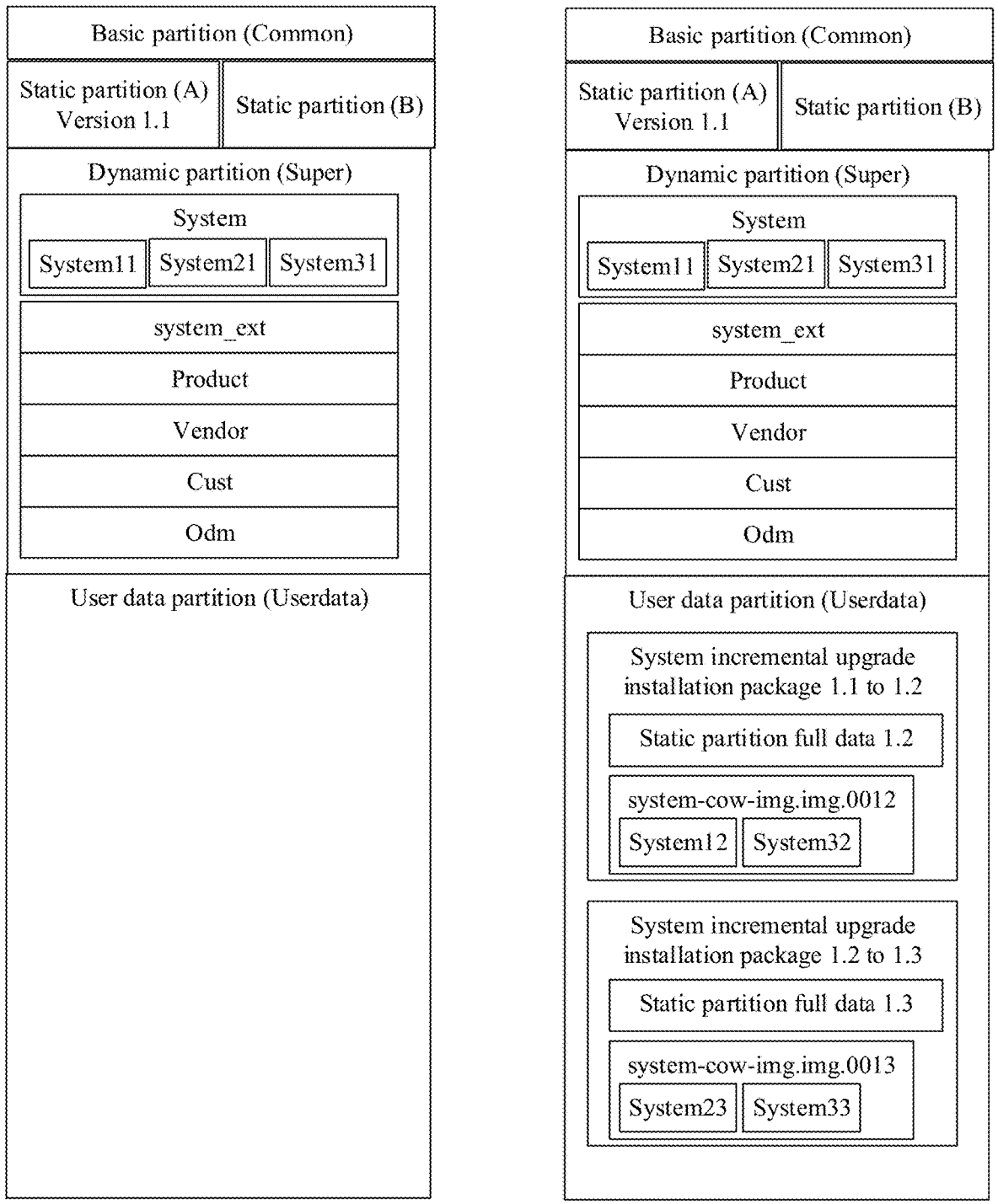
FIG. 7b is a schematic diagram of a data storage structure according to an embodiment of this application.

Using the system sub-partition shown in FIG. 6 as an example, data in a started operating system data storage structure is shown in the left part in FIG. 7b.

S710: The device obtains all system incremental upgrade installation packages for upgrade from an operating system with a current version to an operating system with a latest version.

For example, in a feasible implementation, the device periodically initiates a package search request to a package search server, where the package search request includes a version number (for example, version 1.1) of an operating system currently run on the device; the package search server retrieves, based on the operating system version number in the package search request, whether an operating system installation package with an updated version number (for example, version 1.3) has been released currently; when there is an operating system with an updated version, the package search server feeds back all system incremental upgrade installation packages between the version number of the operating system currently run by the device and the latest version number (for example, a system incremental upgrade installation package for upgrade from the version 1.1 to the version 1.2 and a system incremental upgrade installation package for upgrade from the version 1.2 to the version 1.3) to the device; and the device downloads the system incremental upgrade installation package based on a download address of the operating system upgrade installation package, and stores the system incremental upgrade installation package in the user data partition (Userdata). The version 1.1 represents a first operating system, the version 1.2 represents a second operating system, and the version 1.3 represents a third operating system.

Specifically, a system sub-partition is used as an example. The system incremental upgrade installation package (first system upgrade installation package) for upgrade from the version 1.1 to the version 1.2 includes static partition full data of the version 1.2 and dynamic partition (Super) update data (first update data) for upgrade from the version 1.1 to the version 1.2 (for example, system12 and system32 shown in FIG. 6). The system incremental upgrade installation package (second system upgrade installation package) for upgrade from the version 1.2 to the version 1.3 includes static partition full data of the version 1.3 and dynamic partition (Super) update data (second update data) for upgrade from the version 1.2 to the version 1.3 (for example, system23 and system33 shown in FIG. 6).

After S710, data in the operating system data storage structure is shown in the right part in FIG. 7b.

S720: The device extracts static partition full data of the latest version from the operating system upgrade installation package for the latest version, and performs a data write operation on the static partition (B) based on the extracted static partition full data to upgrade the static partition.

For example, the device extracts static partition full data of the version 1.3 from the system incremental upgrade installation package for upgrade from the version 1.2 to the version 1.3, and the device overwrites the static partition full data of the version 1.3 into the static partition (B).

S730: The device creates a virtual dynamic partition in the user data partition (Userdata), and writes dynamic partition (Super) update data in all system incremental upgrade installation packages for upgrade from the operating system with the current version to the operating system with the latest version into the virtual dynamic partition.

For example, the device writes the dynamic partition (Super) update data for upgrade from the version 1.1 to the version 1.2 and the dynamic partition (Super) update data for upgrade from the version 1.2 to the version 1.3 into the virtual dynamic partition.

Specifically, in S730, file directories Update1 and Update2 are created in the user data partition (Userdata). The COW file system-cow-img.img.0012 in the system incremental upgrade installation package for upgrade from the version 1.1 to the version 1.2 is changed to system_b-cow-img.img.0012 (0012 represents the version 1.2), and is stored in /Update1. The COW file system-cow-img.img.0013 in the system incremental upgrade installation package for upgrade from the version 1.2 to the version 1.3 is changed to system_b-cow-img.img.0013 (0013 represents the version 1.2), and is stored in /Update2. For naming of the COW file and a file structure of the COW file, refer to the description in S530.

Overall verification is performed on the dynamic partition (Super), a COW1 file, and a COW2 file, to verify validity of the dynamic partition (Super), the COW1 file, and the COW2 file, and verify whether a combination result of dynamic partition (Super) data of the current version, the COW1 file, and the COW2 file is dynamic partition (Super) data of a new version. Specifically, data that is in the current dynamic partition (Super) data of the device and that does not change after upgrade to the version 1.2 is combined with the dynamic partition (Super) update data for upgrade from the version 1.1 to the version 1.2 according to the dynamic partition (Super) update data for upgrade from the version 1.1 to the version 1.2 in the COW1 file, to form dynamic partition (Super) data of the version 1.2; and data that is in the dynamic partition (Super) data of the version 1.2 and that does not change after upgrade to the version 1.3 is combined with the dynamic partition (Super) update data for upgrade from the version 1.2 to the version 1.3 according to the dynamic partition (Super) update data for upgrade from the version 1.2 to the version 1.3 in the COW2 file, to form dynamic partition (Super) data of the version 1.3. A hash value of the dynamic partition (Super) data of the version 1.3 is calculated, and whether the hash value is consistent with a hash value of complete dynamic partition (Super) data of the version 1.3 in the system incremental upgrade installation package is determined. If the hash values are consistent, it indicates that the COW file is valid. If the hash values are inconsistent, it indicates that the COW file is invalid, the upgrade fails, the upgrade process is interrupted, and an error is reported. The hash value of the complete dynamic partition (Super) data of the version 1.3 is stored in the system incremental upgrade installation package for upgrade from the version 1.2 to the version 1.3. A hash value of complete dynamic partition (Super) data of the version 1.2 is stored in the system incremental upgrade installation package for upgrade from the version 1.1 to the version 1.2.

For example, the dynamic partition (Super) and the COW file in /Update1 are combined based on a snapshot to generate a file system of the dynamic partition (Super) with the version 1.2; and a file system of the dynamic partition (Super) with the version 1.3 is generated based on the file system of the dynamic partition (Super) with the version 1.2 and the COW file in /Update2. A file is read and a hash value is calculated based on the file system of the dynamic partition (Super) with the version 1.3. Specifically, for file system generation, refer to S530.

For example, it is assumed that a file map of a system sub-partition with the version 1.1 is:
/system/app/A0.XXX: 024010~24013;
/system/app/A1.XXX: 024014~24017;
/system/app/A2.XXX: 024018~24020;
/system/B0.XXX: 024021~024026;
/system/B1.XXX: 024027~024028;
/system/user/C0.XXX: 024029~024032;
/system/user/C1.XXX: 024033~024035;
/system/user/C2.XXX: 024036~024040;
/system/user/C3.XXX: 024041~024044.
It may be considered that:
a file to which /system/app/A2.XXX: 024018~024020 points is system31 shown in FIG. 6;
a file to which /system/user/C1.XXX: 024033~024035 points is system11 shown in FIG. 6; and
a file to which /system/user/C2.XXX: 024036~024040 points is system21 shown in FIG. 6.
A COW file map of the COW file (system_b-cow-img.img.0012) for upgrade from the version 1.1 to the version 1.2 in /Update1 is:

/system/app/A2.XXX:
Map1: address start: 024018; size: 2 (that is, data of an address segment 024018~024020);
Map2: address start: 045033; size: 2 (that is, data of an address segment 045003~045005);
/system/user/C1.XXX:
Map1: address start: 024033; size: 2 (that is, data of an address segment 024033~024035);
Map2: address start: 045006; size: 2 (that is, data of an address segment 045006~045008).
It may be considered that:
a file to which /system/app/A2.XXX: 045003~045005 points is system32 shown in FIG. 6; and
a file to which /system/user/C1.XXX: 045006~045008 points is system12 shown in FIG. 6.
A COW file map of the COW file (system_b-cow-img.img.0013) for upgrade from the version 1.2 to the version 1.3 in /Update2 is:
/system/app/A2.XXX:
Map1: address start: 024018; size: 2 (that is, data of an address segment 024018~024020);
Map2: address start: 045033; size: 2 (that is, data of an address segment 045033~045035);
/system/user/C2.XXX:
Map1: address start: 024036; size: 4 (that is, data of an address segment 024036~024040);
Map2: address start: 045036; size: 4 (that is, data of an address segment 04503~6045040).
It may be considered that:
a file to which /system/app/A2.XXX: 045033~045035 points is system33 shown in FIG. 6; and
a file to which /system/user/C2.XXX: 045036~045040 points is system23 shown in FIG. 6.
The file map of the system sub-partition with the version 1.1 and system_b-cow-img.img.0012 are combined based on a snapshot, and an obtained file map of the system sub-partition with the version 1.2 is:
/system/app/A0.XXX: 024010~024013;
/system/app/A1.XXX: 024014~024017;
/system/app/A2.XXX: 045003~045005;
(pointing to A2.XXX in /Update1/system_b-cow-img.img.0012 in the user data partition (Userdata));
/system/B0.XXX: 024021~024026;
/system/B1.XXX: 024027~024028;
/system/user/C0.XXX: 024029~024032;
/system/user/C1.XXX: 045006~045008;
(pointing to C1.XXX in /Update1/system_b-cow-img.img.0012 in the user data partition (Userdata));
/system/user/C2.XXX: 024036~024040;
/system/user/C3.XXX: 024041~024044.
The file map of the system sub-partition with the version 1.1 and system_b-cow-img.img.0012 are combined based on a snapshot, and an obtained file map of the system sub-partition with the version 1.2 is:
/system/app/A0.XXX: 024010~024013;
/system/app/A1.XXX: 024014~024017;
/system/app/A2.XXX: 045033~045035;
(pointing to A2.XXX in /Update2/system_b-cow-img.img.0013 in the user data partition (Userdata));
/system/B0.XXX: 024021~024026;
/system/B1.XXX: 024027~024028;
/system/user/C0.XXX: 024029~024032;
/system/user/C1.XXX: 045006~045008;
(pointing to C1.XXX in /Update1/system_b-cow-img.img.0012 in the user data partition (Userdata));
/system/user/C2.XXX: 045036~045040;

(pointing to C2.XXX in /Update2/system_b-cow-img.img.0013 in the user data partition (Userdata));
/system/user/C3.XXX: 024041~024044.

When the COW file is valid, merging status information in metadata (/metadata) in the basic partition (Common) is changed from "merged (merged)" to "wait for merge (wait for merge) (Update1, Update2)". The merging status information is used to indicate whether there is currently a COW file that needs to be merged into the dynamic partition (Super) and indicate a version corresponding to a non-merged COW file. Specifically, the merging status information includes an overall identifier for the dynamic partition (Super) and a sub-partition identifier for each sub-partition. When the overall identifier is "merged (merged)", it indicates that a merging operation needs to be performed on none of all the sub-partitions of the dynamic partition (Super). When the overall identifier is "wait for merge (wait for merge) (Update1, Update2)", it indicates that a merging operation needs to be performed on one or more sub-partitions of the dynamic partition (Super). In addition, the merging operation has two versions, respectively corresponding to file directories Update1 and Update2 of the user data partition (Userdata). When the sub-partition identifier is "merged (merged)", it indicates that a merging operation does not need to be performed on the sub-partition. When the sub-partition identifier is "wait for merge (wait for merge) (Update1)", it indicates that a merging operation needs to be performed on the sub-partition in the directory Update1. When the sub-partition identifier is "wait for merge (wait for merge) (Update2)", it indicates that a merging operation needs to be performed on the sub-partition in the directory Update2. When the sub-partition identifier is "wait for merge (wait for merge) (Update1, Update2)", it indicates that a merging operation needs to be performed on the sub-partition in the directories Update1 and Update2.

Further, after S730, all system incremental upgrade installation packages in the user data partition (Userdata) are deleted. Alternatively, all system incremental upgrade installation packages in the user data partition (Userdata) are deleted after a subsequent step.

Figure 7C:
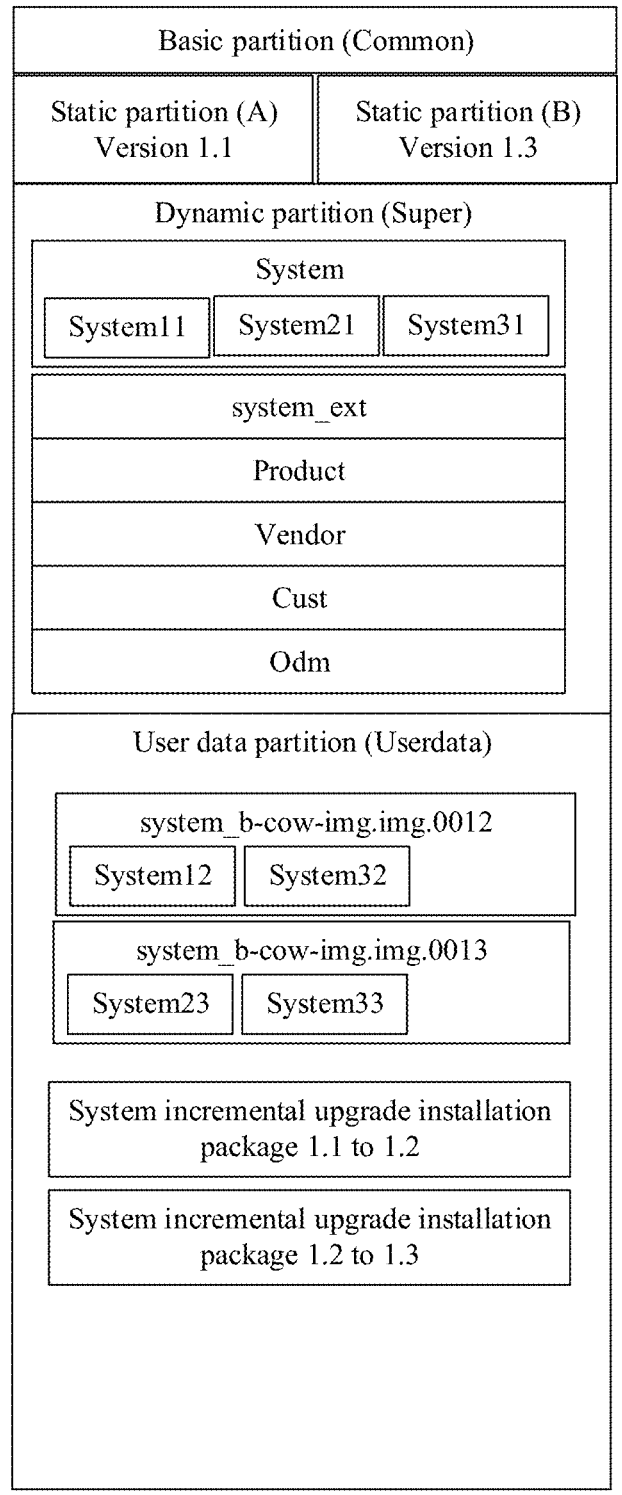
FIG. 7c is a schematic diagram of a data storage structure according to an embodiment of this application.

After S730, data in the operating system data storage structure is shown in FIG. 7c.

S731: Change a device startup sequence from starting from the static partition (A) to starting from the static partition (B).

For example, a startup sequence identifier in a master boot record (Master Boot Record, MBR) is rewritten, to rewrite the startup sequence identifier from A to B. After the device is powered on, when the device learns that the startup sequence identifier is A, the device starts from the static partition (A), and loads the static partition (A) during startup; or when the device learns that the startup sequence identifier is B, the device starts from the static partition (B), and loads the static partition (B) during startup.

S732: The device restarts. The current operating system is exited, the device is powered off, and the device is powered on again.

S740: The device sequentially loads the basic partition (Common) and the static partition (B).

S741: The device loads the dynamic partition (Super) and the virtual dynamic partition in the user data partition (Userdata). Specifically, the device combines and loads the dynamic partition (Super) and the COW file in the virtual dynamic partition based on a snapshot. For a combination and loading process, refer to S541. A difference lies in that in S741, COW files are combined a plurality of times in ascending order of versions, and one COW file is combined each time.

For example, in an implementation, the COW file for upgrade from the version 1.1 to the version 1.2 is superposed on current data (version 1.1) in the dynamic partition (Super) of the device to generate a file system of dynamic partition (Super) data of the version 1.2. Then, the COW file for upgrade from the version 1.2 to the version 1.3 is superposed on the file system of the dynamic partition (Super) data of the version 1.2 to generate a file system of dynamic partition (Super) data of the version 1.3. Finally, a file that needs to be loaded is determined according to an operating system running requirement, and the corresponding file is extracted based on the file system of the dynamic partition (Super) data of the version 1.3 for loading.

For example, the operating system running requirement is loading all data in a directory user in the system sub-partition (/system/user). The device reads the merging status information in the metadata (/metadata), and the sub-partition identifier of the system sub-partition in the merging status information is "wait for merge (wait for merge) (Update1, Update2)". Therefore, the device first searches for a COW file in /Update1 in the user data partition (Userdata), and after finding the COW file system_b-cow-img.img.0012 (first update data) in Update1, generates a file map, with the version 1.2 (third dynamic partition data), of the system sub-partition based on the snapshot and the file map of the COW file in system_b-cow-img.img.0012.

Then, the device searches for a COW file in /Update2 in the user data partition (Userdata), and after finding the COW file system_b-cow-img.img.0013 (second update data) in Update2, generates a file map, with the version 1.3 (second dynamic partition data), of the system sub-partition based on the snapshot and the file map of the COW file in system_b-cow-img.img.0013.

Data loading is performed based on a storage address of all files (first dynamic partition data) in /system/user in the file map, with the version 1.3, of the system sub-partition.

Further, in S741, before the file is loaded, the device further needs to verify the to-be-loaded file. For a verification solution, refer to S541.

S750: The device successfully runs the operating system and enters a user interaction interface.

S751: The device merges the data in the virtual dynamic partition into the dynamic partition (Super). For details, refer to S551.

Specifically, the device performs power-on broadcast after successful startup, and starts an upgrade process after power-on broadcast. The upgrade process reads the merging status information in the metadata (/metadata) in the basic partition (Common). If the merging status information is "merged (merged)", the device enters a normal running mode.

If the merging status information is "wait for merge (wait for merge)", the upgrade process reads COW block information in the metadata (/supermetadata) in the dynamic partition (Super), and merges the COW file in the user data partition (Userdata) into the dynamic partition (Super).

Specifically, the upgrade process sequentially merges the COW files in the user data partition (Userdata) into the dynamic partition (Super) in a sequence from an old version number to a new version number.

The system sub-partition is used as an example. First, system_b-cow-img.img.0012 in /Update1 is merged into the system sub-partition of the dynamic partition (Super), and system12 and system32 are used to overwrite system11 and system31, as shown in the left part in FIG. 7*d*. For a merging execution process, refer to S551.

Figure 7D:
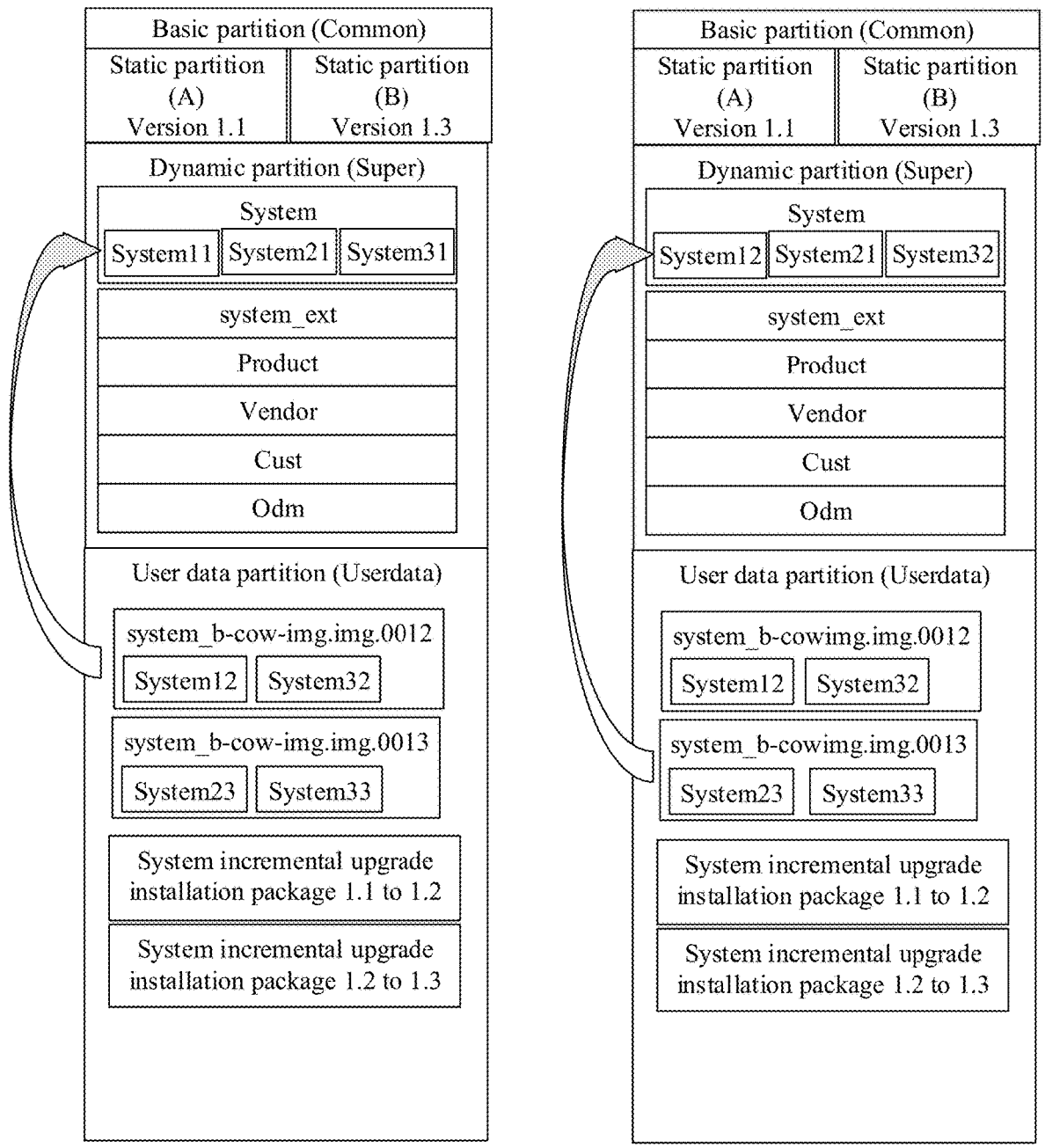
FIG. 7d is a schematic diagram of a data storage structure according to an embodiment of this application.

Then, system_b-cow-img.img.0013 in /Update2 is merged into the system sub-partition of the dynamic partition (Super), and system23 and system33 are used to overwrite system21 and system32, as shown in the right part in FIG. 7*d*. For a merging execution process, refer to S551.

Then, the upgrade process deletes the COW file in the user data partition (Userdata), deletes the system incremental upgrade installation packages in the user data partition (Userdata), and returns storage space to the user data partition (Userdata). In addition, the merging status information in the metadata (/metadata) in the basic partition (Common) is changed from "wait for merge (wait for merge)" to "merged (merged)".

Figure 7E:
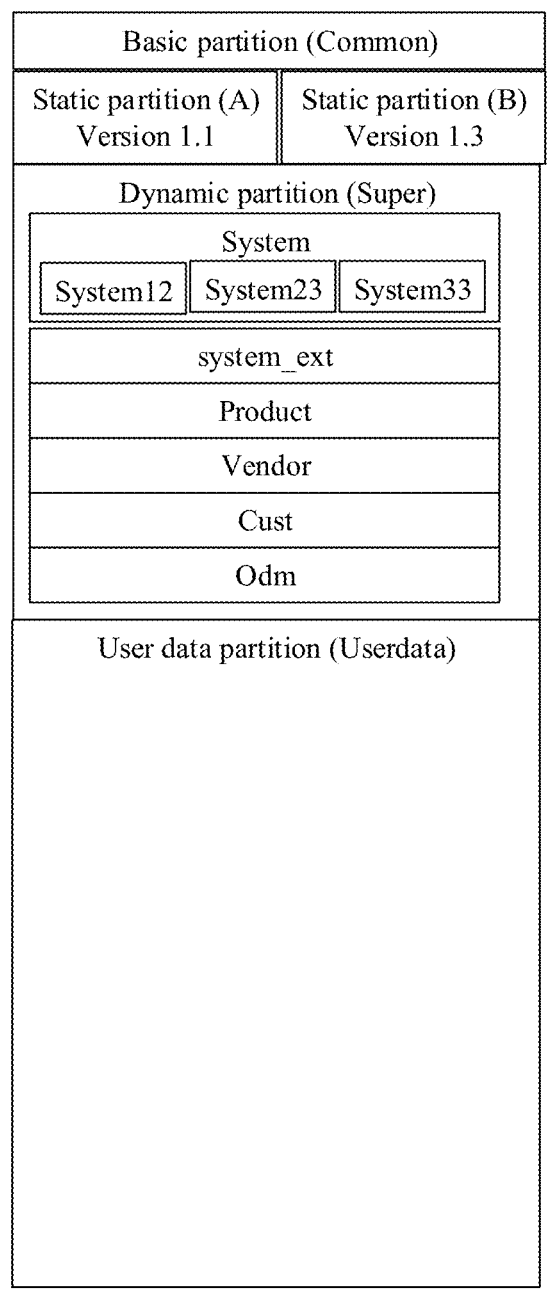
FIG. 7e is a schematic diagram of a data storage structure according to an embodiment of this application.

After S751, data in the operating system data storage structure is shown in FIG. 7*e*.

FIG. 8*a*(1) and FIG. 8*a*(2) are a flowchart of operating system upgrade for the data storage structure of the operating system in the embodiment shown in FIG. 4. When the device currently starts from the static partition (A), the device upgrades the operating system according to a procedure shown in FIG. 8*a*(1) and FIG. 8*a*(2).

S800: The device sequentially loads the basic partition (Common), the static partition (A), and the dynamic partition (Super), and starts from the static partition (A).

Figure 8B:
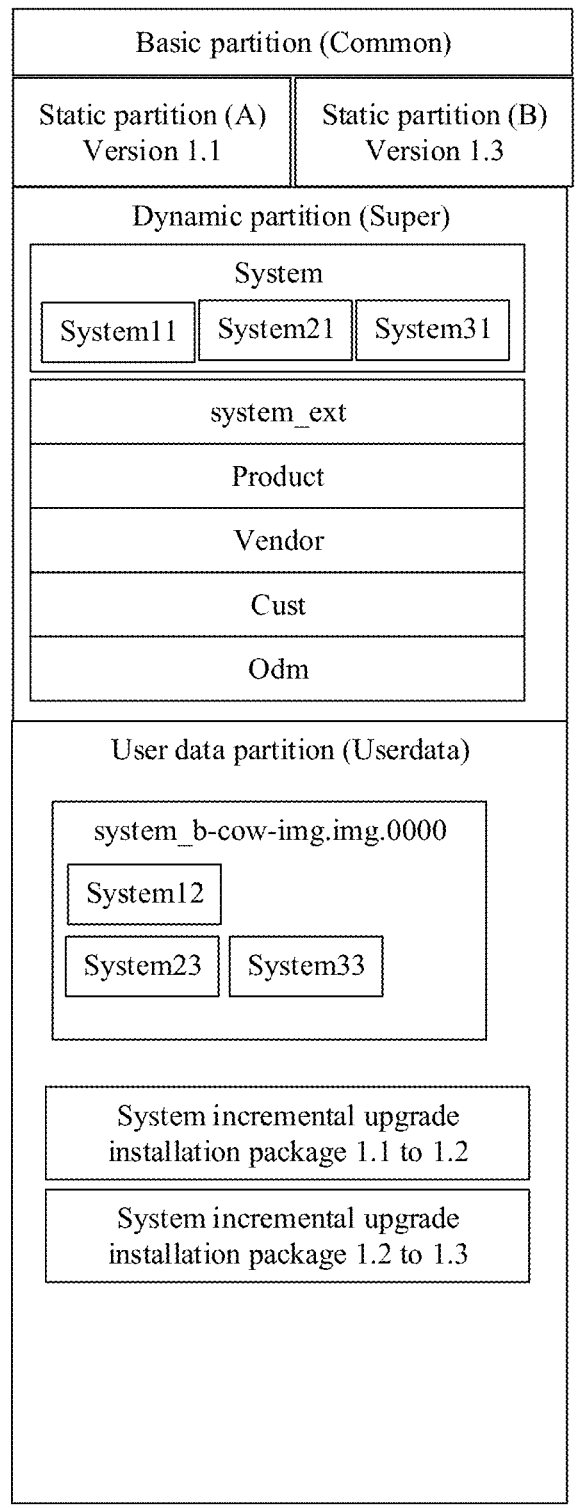
FIG. 8b is a schematic diagram of a data storage structure according to an embodiment of this application.

Using the system sub-partition shown in FIG. 6 as an example, data in a started operating system data storage structure is shown in the left part in FIG. 8*b*.

For S810, refer to S710.

For S820, refer to S720.

S830: The device creates a virtual dynamic partition in the user data partition (Userdata), and writes combined data of dynamic partition (Super) update data in all system incremental upgrade installation packages for upgrade from the operating system with the current version to the operating system with the latest version into the virtual dynamic partition.

For example, the device combines the COW file for upgrade from the version 1.1 to the version 1.2 with the COW file for upgrade from the version 1.2 to the version 1.3 to generate the COW file for upgrade from the version 1.1 to the version 1.3. The dynamic partition (Super) update data for upgrade from the version 1.1 to the version 1.3 is written into the virtual dynamic partition. Specifically, in a COW file combination process, update data of the latest version is retained for update data corresponding to same original data in different COW files.

The system sub-partition is used as an example. File directories Update1 and Update2 are created in the user data partition (Userdata). The COW file system-cow-img.img.0012 in the system incremental upgrade installation package for upgrade from the version 1.1 to the version 1.2 is changed to system_b-cow-img.img.0012 (0012 represents the version 1.2), and is stored in /Update1. The COW file system-cow-img.img.0013 in the system incremental upgrade installation package for upgrade from the version 1.2 to the version 1.3 is changed to system_b-cow-img.img.0013 (0013 represents the version 1.2), and is stored in /Update2. For naming of the COW file and a file structure of the COW file, refer to the description in S530.

It is assumed that a COW file map of system_b-cow-img.img.0012 is:
/system/app/A2.XXX: 045003~045005;
/system/user/C1.XXX: 045006~045008.

A COW file map of system_b-cow-img.img.0013 is:
/system/app/A2.XXX: 045033~045035;
/system/user/C2.XXX: 045036~045040.

system_b-cow-img.img.0012 and system_b-cow-img.img.0013 are combined, and /system/app/A2.XXX: 045033~045035 in system_b-cow-img.img.0013 of the latest version is retained in /system/app/A2.XXX: 045003~045005 and /system/app/A2.XXX: 045033~045035. After the combination, a COW file system_b-cow-img.img.0000 is generated (0000 indicates that there are not COW files of a plurality of versions), system_b-cow-img.img.0000 is stored in the directory Update in the user data partition (Userdata), and /Update1 and /Update2 are deleted. For example, after COW file combination, details are shown in FIG. 8*b*.

Specifically, in a combination process, a storage location of update data in the COW file may be maintained unchanged, that is, a storage location of each update file in system_b-cow-img.img.0000 is consistent with that in system_b-cow-img.img.0012 and system_b-cow-img.img.0013. A difference lies in that a COW file map of system_b-cow-img.img.0000 is updated, and an update file of an early version is deleted.

For example, the COW file map of system_b-cow-img.img.0000 is:
/system/app/A2.XXX: 045033~045035
(pointing to A2.XXX in original system_b-cow-img.img.0013);
/system/user/C LXXX: 045006~045008
(pointing to C1.XXX in original system_b-cow-img.img.0012);
/system/user/C2.XXX: 045036~045040
(pointing to C2.XXX in original system_b-cow-img.img.0013).

Data on the address 045003~045005 is deleted.

In the combination process, the storage location of the update data in the COW file may be further reconstructed.

For example, the COW file map of system_b-cow-img.img.0000 is:
/system/app/A2.XXX: 045073~045075;
/system/user/C LXXX: 045076~045078;
/system/user/C2.XXX: 045079~045043.

Data on the addresses 045003~045005, 045006~045008, 045033~045035, and 045036~045040 are deleted.

After the COW file combination, for execution of S830 to S851, refer to S530 to S551.

Further, in the upgrade procedures shown in FIG. 7*a*(1) and FIG. 7*a*(2) and FIG. 8*a*(1) and FIG. 8*a*(2), a static partition uses a full upgrade manner. In another embodiment of this application, an incremental upgrade manner is also used for a static partition. For example, as shown in FIG. 9, it is assumed that in the operating system with the version 1.1, a version of each sub-partition (bootloader, boot, vendor_boot, dtbo, vbmeta) of a static partition is 0.1. When the operating system is upgraded from the version 1.1 to the version 1.2, data in bootloader, boot, and vendor_boot does not change, and data in dtbo and vbmeta is upgraded to a version 0.2. In this case, static partition update data for upgrade from the version 1.1 to the version 1.2 includes data of the version 0.2 in dtbo and vbmeta. When the operating system is upgraded from the version 1.2 to the version 1.3, data in bootloader, boot, and vbmeta does not change, data in vendor_boot is upgraded from the version 0.1 to the version 0.2, and data in dtbo is upgraded from the version 0.2 to a version 0.3. In this case, static partition update data for upgrade from the version 1.2 to the version 1.3 includes data of the version 0.2 in vendor_boot and data of the version 0.3 in dtbo.

Further, in the virtual A/B upgrade solution, after static partition data is upgraded, data in the static partition (A) is different from data in the static partition (B). When the static partition (B) is currently loaded, if static partition data full upgrade is performed, static partition full data of the latest version may be directly overwritten into the static partition (A). If incremental upgrade is performed, because the data in the static partition (A) is different from the data in the static partition (B), after incremental data for the data in the static partition (B) is overwritten into the static partition (B), data confusion may be caused.

Figure 10A:
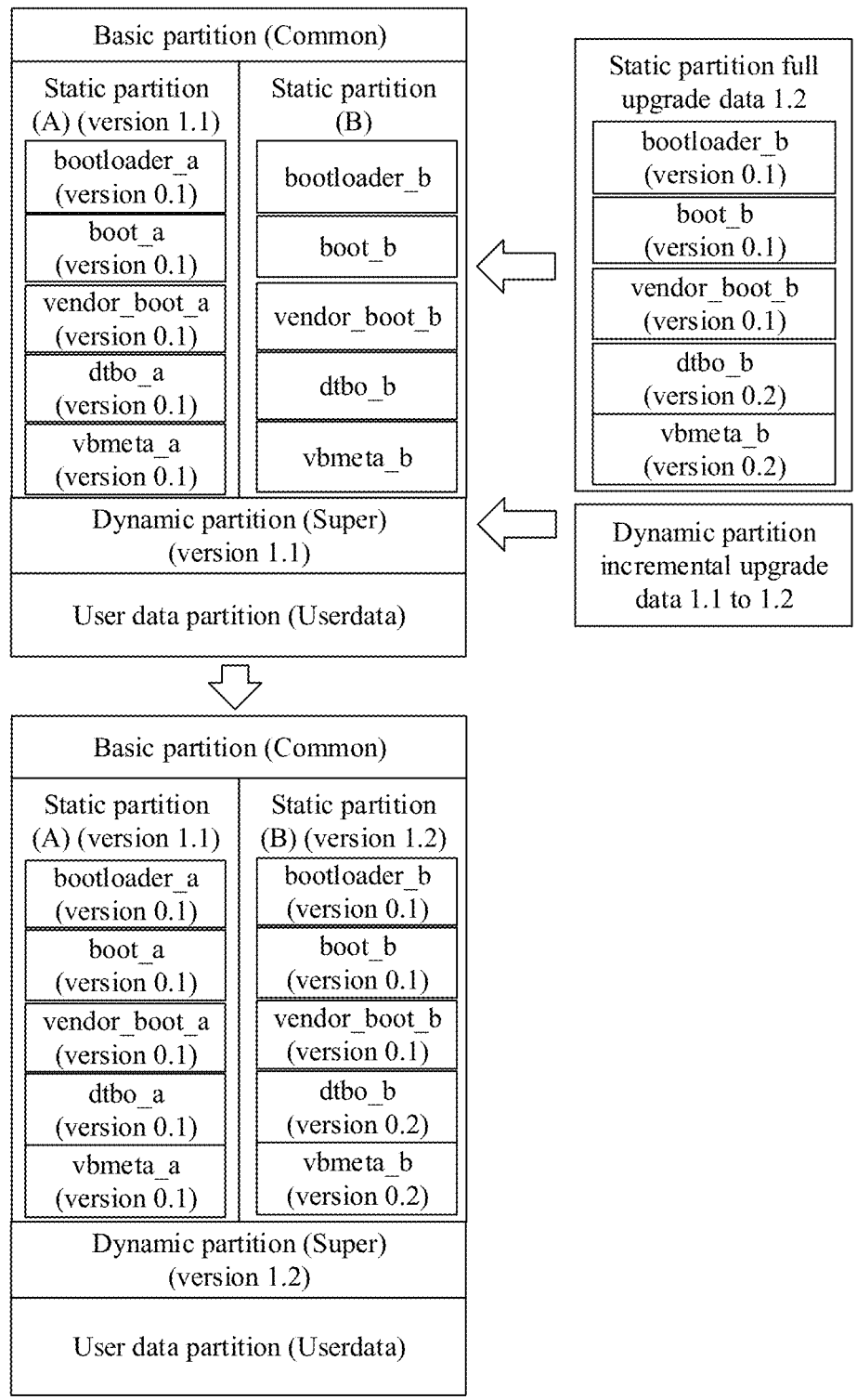
FIG. 10a is a schematic diagram of a data storage change according to an embodiment of this application.

As shown in FIG. 10a, the device loads the static partition (A) and the dynamic partition (Super) to run the operating system with the version 1.1. Then, the operating system of the device needs to be upgraded to the version 1.2. The device writes static partition data of the version 1.2 into the static partition (B) based on static partition full upgrade, to upgrade the operating system from the version 1.1 to the version 1.2.

Figure 10B:
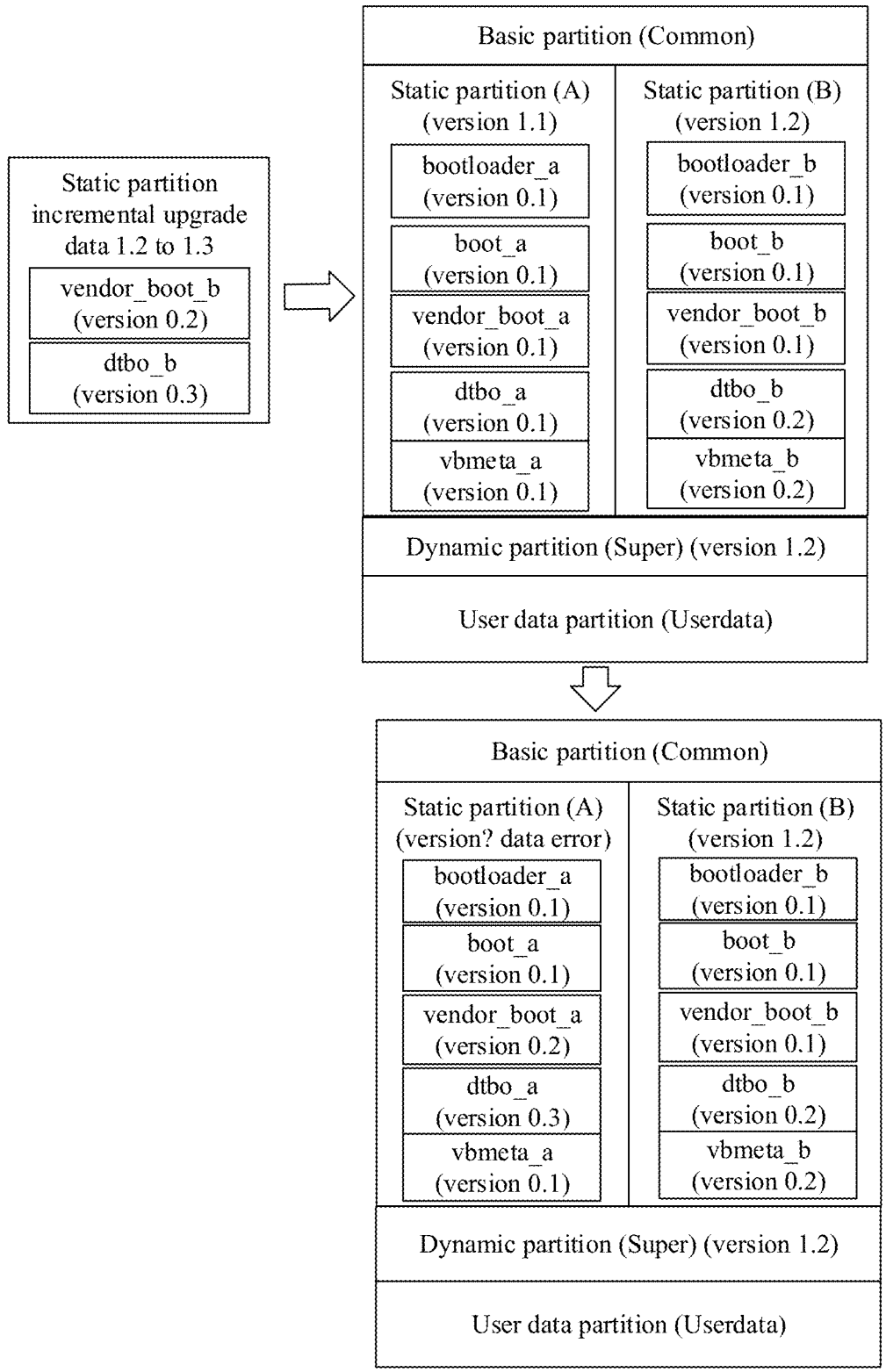
FIG. 10b is a schematic diagram of a data storage change according to an embodiment of this application.

As shown in FIG. 10b, the device loads the static partition (B) and the dynamic partition (Super) to run the operating system with the version 1.2. Then, the operating system of the device needs to be upgraded to the version 1.3. The device obtains, based on the current operating system version (version 1.2), a system incremental upgrade installation package for upgrade from the version 1.2 to the version 1.3. The system incremental upgrade installation package for upgrade from the version 1.2 to the version 1.3 includes static partition update data for upgrade from the version 1.2 to the version 1.3. Then, when the device upgrades the static partition, an operation object of data writing is the static partition (A). The data in the static partition (A) does not belong to the version 1.2. Therefore, after the static partition (A) is upgraded from the version 1.2 to the version 1.3 through static partition incremental upgrade, obtained static partition data (bootloader_a data of the version 0.1, boot_a data of the version 0.1, vendor_boot_a data of the version 0.2, dtbo_a data of the version 0.3, and vbmeta_a data of the version 0.1) is not static partition data of the version 1.3 (bootloader_a data of the version 0.1, boot_a data of the version vendor_boot_a data of the version 0.2, dtbo_a data of the version 0.3, and vbmeta_a data of the version 0.2).

For the foregoing problem, in an embodiment of this application, before data in a static partition is upgraded, a static partition data synchronization operation is further performed, so that data in two static partitions is consistent.

Figure 11A:
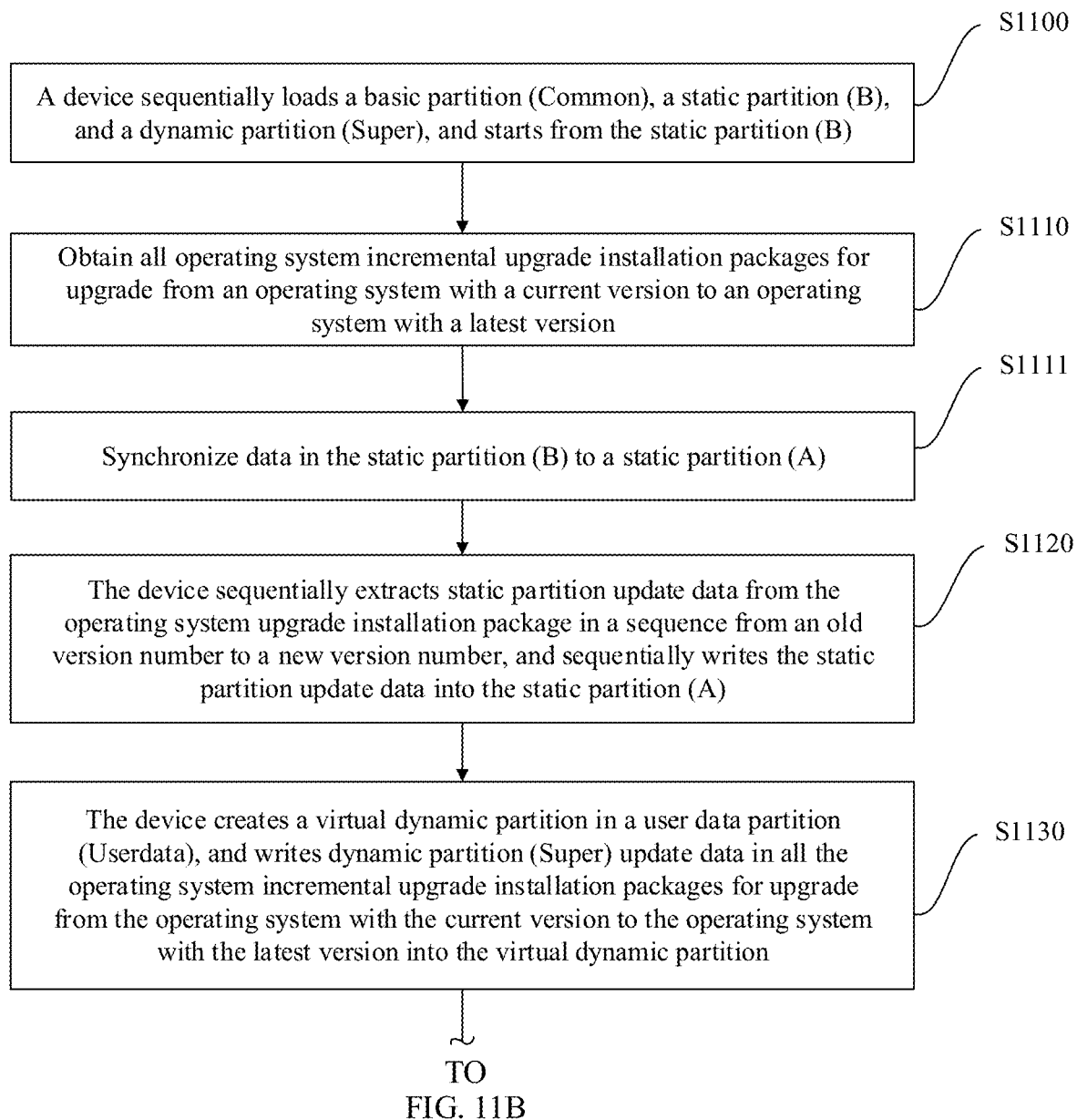
FIG. 11A and FIG. 11B are a flowchart of operating system upgrade according to an embodiment of this application.
Figure 11B:
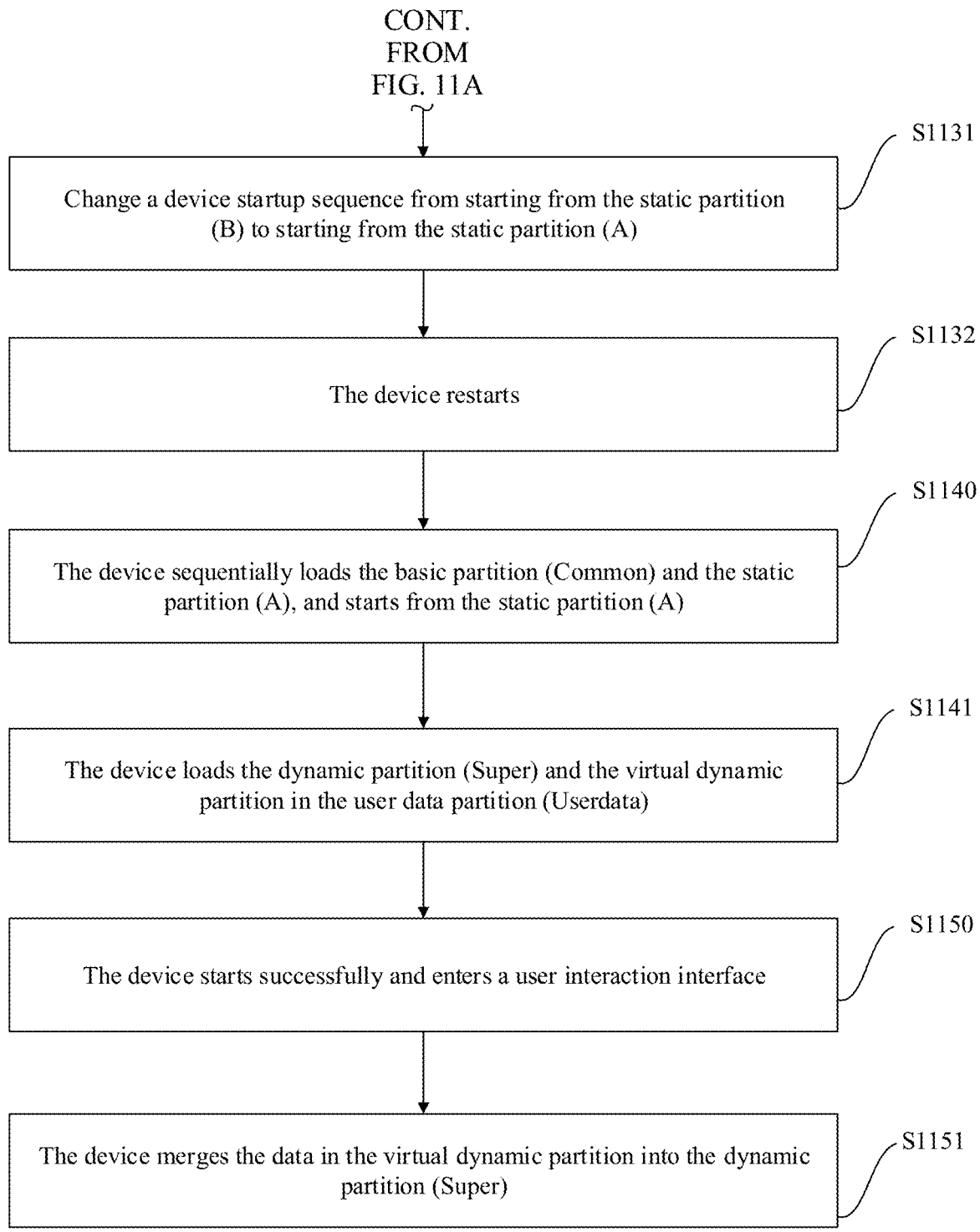

FIG. 11A and FIG. 11B are a flowchart of operating system upgrade for the operating system data storage structure in the embodiment shown in FIG. 4. It is assumed that the initial operating system version of the device is 1.0, and the device initially starts from the static partition (A). Based on the procedure shown in FIG. 5A and FIG. 5B, the operating system version of the device is upgraded from 1.0 to 1.1, and the device starts from the static partition (B). Then, the device upgrades the operating system according to a procedure shown in FIG. 11A and FIG. 11B.

S1100: The device sequentially loads the basic partition (Common), the static partition (B), and the dynamic partition (Super), and starts from the static partition (B).

The embodiment shown in FIG. 9 is used as an example. Data in the static partition and the dynamic partition (Super) in the started operating system data storage structure is shown in the left part in FIG. 12a(1) to FIG. 12a(3).

S1110: The device obtains all system incremental upgrade installation packages for upgrade from an operating system with a current version to an operating system with a latest version.

For example, in a feasible implementation, the device periodically initiates a package search request to a package search server, where the package search request includes a version number (for example, version 1.1) of an operating system currently run on the device; the package search server retrieves, based on the operating system version number in the package search request, whether an operating system installation package with an updated version number (for example, version 1.3) has been released currently; when there is an operating system with an updated version, the package search server feeds back all system incremental upgrade installation packages between the version number of the operating system currently run by the device and the latest version number (for example, a system incremental upgrade installation package for upgrade from the version 1.1 to the version 1.2 and a system incremental upgrade installation package for upgrade from the version 1.2 to the version 1.3) to the device; and the device downloads the system incremental upgrade installation package based on a download address of the operating system upgrade installation package, and stores the system incremental upgrade installation package in the user data partition (Userdata).

Specifically, the system incremental upgrade installation package for upgrade from the version 1.1 to the version 1.2 includes static partition update data for upgrade from the version 1.1 to the version 1.2 (for example, dtbo data and vbmeta data of the version 0.2 shown in FIG. 9) and dynamic partition (Super) update data for upgrade from the version 1.1 to the version 1.2. The system incremental upgrade installation package for upgrade from the version 1.2 to the version 1.3 includes static partition update data for upgrade from the version 1.2 to the version 1.3 (for example, vendor_boot data of the version 0.2 and dtbo data of the version 0.3 that are shown in FIG. 9) and dynamic partition (Super) update data for upgrade from the version 1.2 to the version 1.3.

After S1110, data in the operating system data storage structure is shown in the middle part in FIG. 12a(1) to FIG. 12a(3).

S1111: The device synchronizes data in the static partition (B) to the static partition (A).

After S1111, data in the operating system data storage structure is shown in the right part in FIG. 12a(1) to FIG. 12a(3).

S1120: The device sequentially extracts static partition update data from the operating system upgrade installation package in a sequence from an old version number to a new version number, and sequentially writes the static partition update data into the static partition (A).

Specifically, the device first extracts, from the system incremental upgrade installation package for upgrade from the version 1.1 to the version 1.2, the static partition update data for upgrade from the version 1.1 to the version 1.2.

Figure 12B:
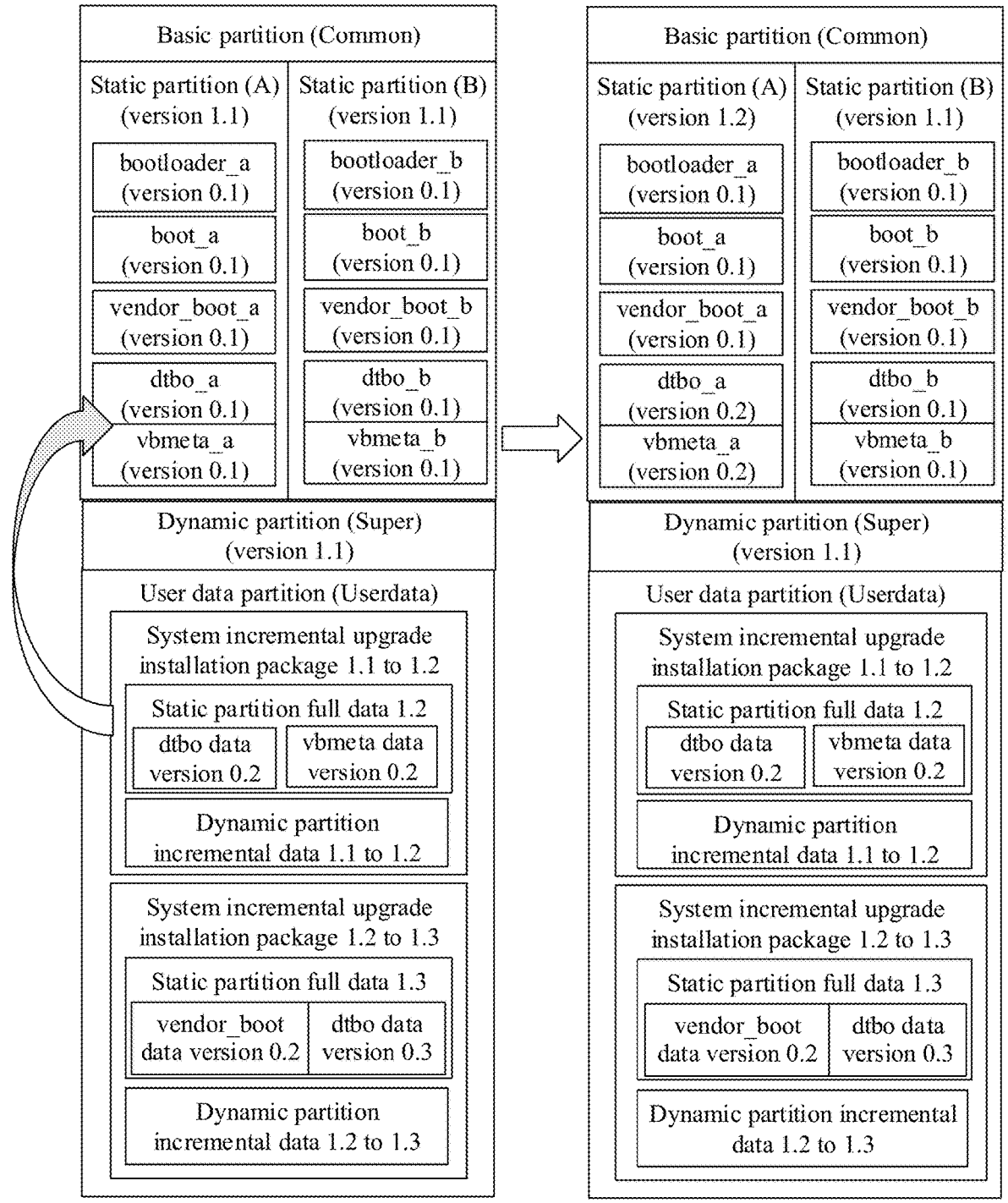
FIG. 12b is a schematic diagram of a data storage change according to an embodiment of this application.

The static partition update data for upgrade from the version 1.1 to the version 1.2 is written into the static partition (A). For example, the dtbo data and the vbmeta data of the version 0.2 are overwritten into the sub-partition dtbo_a and the sub-partition vbmeta_a of the static partition (A), as shown in FIG. 12b.

Figure 12C:
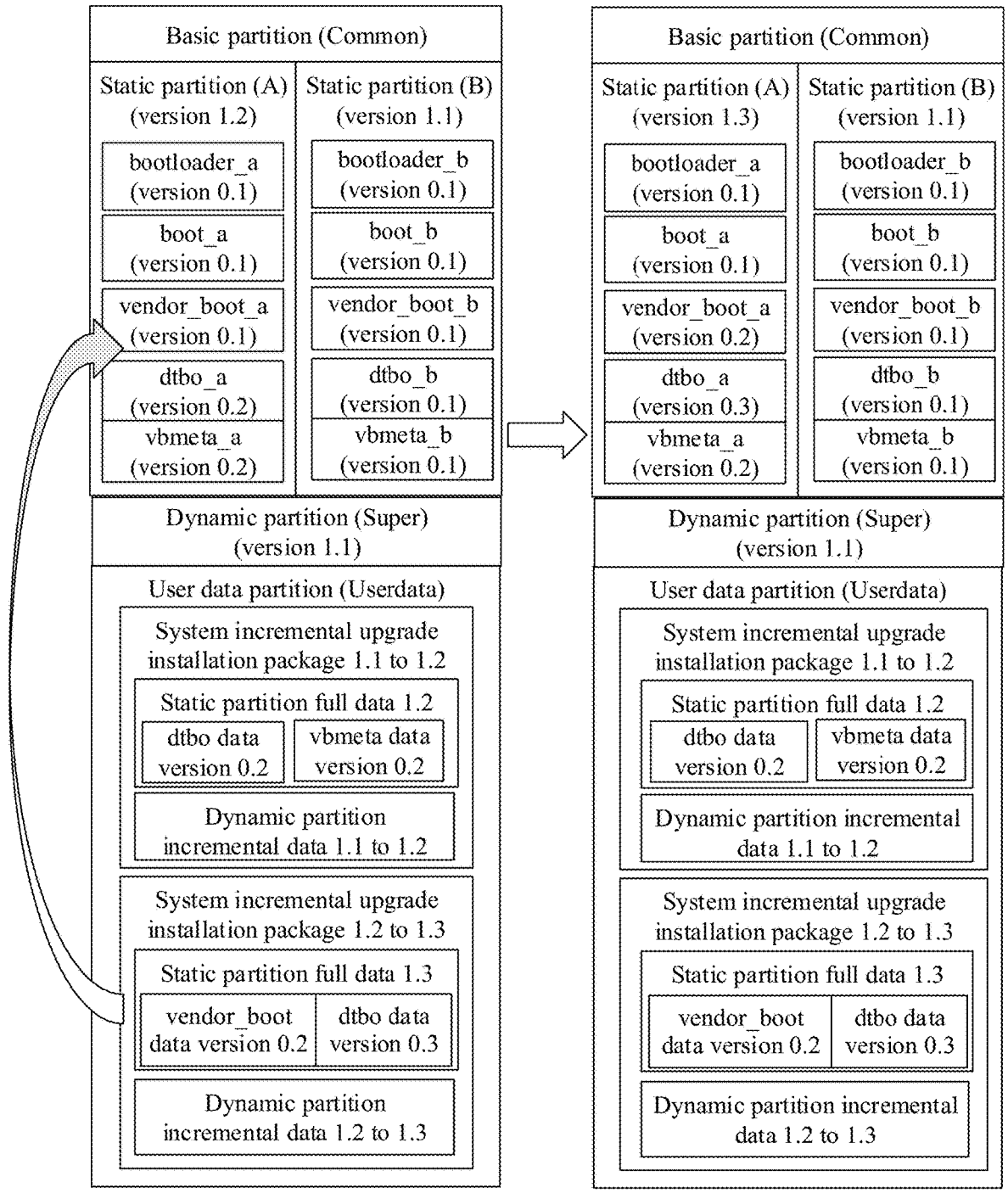
FIG. 12c is a schematic diagram of a data storage change according to an embodiment of this application.

Then, the device extracts, from the system incremental upgrade installation package for upgrade from the version 1.2 to the version 1.3, the static partition update data for upgrade from the version 1.2 to the version 1.3, and writes the static partition update data for upgrade from the version 1.2 to the version 1.3 into the static partition (A). For example, the vendor_boot data of the version 0.2 is overwritten into the sub-partition vendor_boot_a of the static partition (A), and the dtbo data of the version 0.3 is overwritten into the sub-partition dtbo_a of the static partition (A), as shown in FIG. 12c.

For S1130, refer to S730.

S1131: Change a device startup sequence from starting from the static partition (B) to starting from the static partition (A). Specifically, a startup identifier in the common partition is rewritten, to rewrite the startup identifier from B to A.

S1132: The device restarts. The current operating system is exited, the device is powered off, and the device is powered on again.

S1140: The device sequentially loads the basic partition (Common) and the static partition (A).

For S1141 to S1151, refer to S741 to S751.

Further, a specific implementation of S1111 is not specifically limited in this application, and a person skilled in the art may implement S1111 in a plurality of feasible implementations. The following uses a specific embodiment as an example to describe a specific implementation procedure of S1111.

In S520, the device writes the data in the static partition in the operating system upgrade installation package into the static partition (B). Therefore, if the same operating system upgrade installation package is used, the data in the static partition in the operating system upgrade installation package is written into the static partition (A), so that the data in the static partition (A) is consistent with the data in the static partition (B).

Therefore, in an application scenario, S1111 includes: Obtain the operating system upgrade installation package that is stored in S510 and that is read from the user data partition (Userdata), and write the data in the static partition in the operating system upgrade installation package into the static partition (A).

The static partition (A) is completely consistent with the static partition (B) in terms of partition structure and partition size. Therefore, the data in the static partition (A) may be directly mirrored to the static partition (B), or the data in the static partition (B) may be directly mirrored to the static partition (A).

Figure 13:
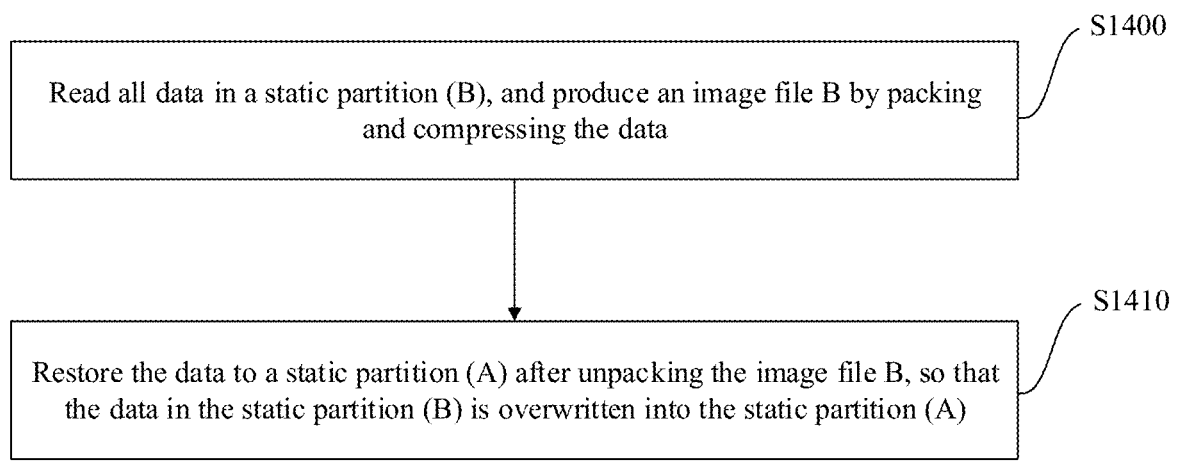
FIG. 13 is a flowchart of static partition synchronization according to an embodiment of this application.

FIG. 13 is a flowchart of an implementation of S1111. The terminal device performs the following procedure shown in FIG. 13 to implement S1111.

S1400: Read all data in the static partition (B), and produce an image file B by packing and compressing the data.

S1410: Restore the data to the static partition (A) after unpacking the image file B, so that the data in the static partition (B) is overwritten into the static partition (A).

The static partition (A) and the static partition (B) are consistent in terms of partition structure, and include a same sub-partition. Therefore, the data in the static partition (B) can be synchronized to the static partition (A) by overwriting a file in each sub-partition in the static partition (B) into a corresponding sub-partition in the static partition (A).

Figure 14A:
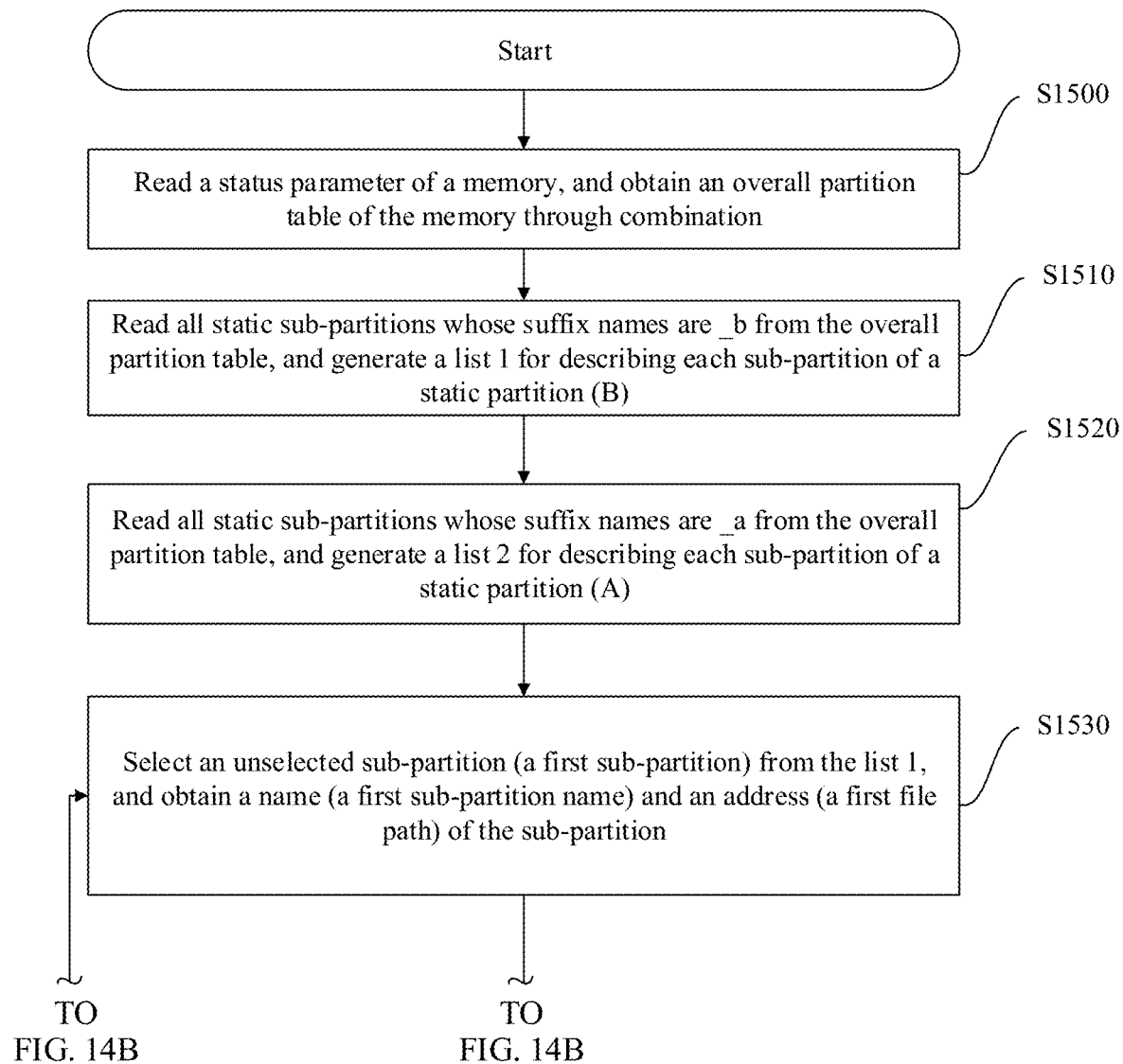
FIG. 14A and FIG. 14B are a flowchart of static partition synchronization according to an embodiment of this application.
Figure 14B:
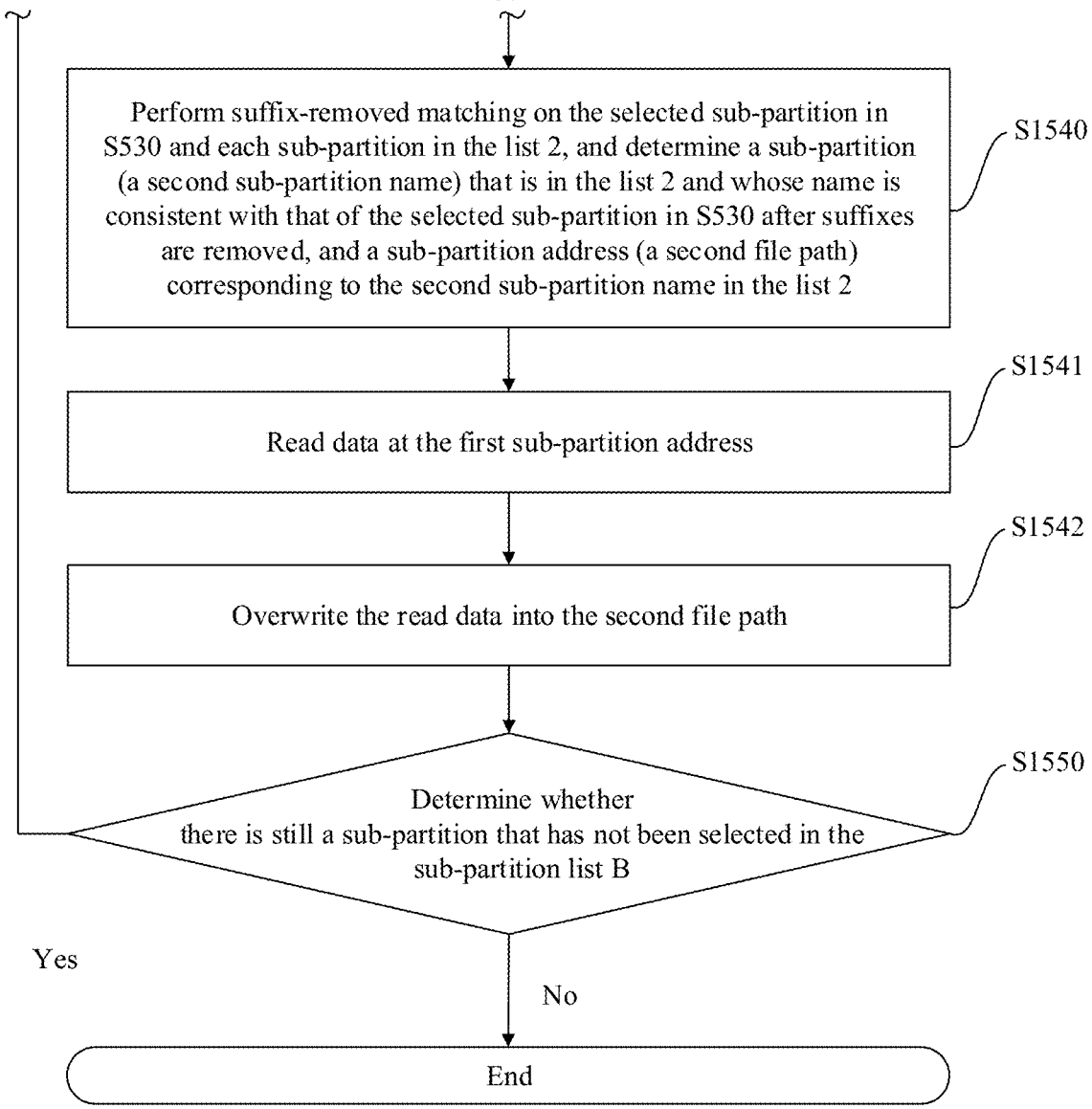

FIG. 14A and FIG. 14B are a flowchart of an implementation of S1111. The terminal device performs the following procedure shown in FIG. 14A and FIG. 14B to implement S1111.

S1500: Read a parameter that is in a memory of the device and that is related to a partition table (the parameter is pre-stored in the device before delivery of the device), and obtain an overall partition table of the memory through combination.

For example, an address mapping description of each partition in /dev/block/by-name/is read, and address mapping of all partitions is integrated into an overall partition table.

S1510: Read all static sub-partitions whose suffix names are _b from the overall partition table, and generate a list 1 for describing each sub-partition of the static partition (B), where the list 1 includes a name and an address of each sub-partition of the static partition (B). An example is as follows:

TABLE 1

| Number | Sub-partition name | Sub-partition address (file path) | Selected state |
| --- | --- | --- | --- |
| 1 | bootloader_b | /dev/block/by-name/bootloader_b | 0 |
| 2 | boot_b | /dev/block/by-name/boot_b | 0 |
| 3 | vendor_boot_b | /dev/block/by-name/vendor_boot_b | 0 |
| 4 | dtbo_b | /dev/block/by-name/dtbo_b | 0 |
| 5 | vbmeta_b | /dev/block/by-name/vbmeta_b | 0 |

S1520: Read all static sub-partitions whose suffix names are _a from the overall partition table, and generate a list 2 for describing each sub-partition of the static partition (A), where the list 2 includes a name and an address of each sub-partition of the static partition (A). An example is as follows:

TABLE 2

| Number | Sub-partition name | Sub-partition address (file path) |
| --- | --- | --- |
| 1 | bootloader_a | /dev/block/by-name/bootloader_a |
| 2 | boot_a | /dev/block/by-name/boot_a |
| 3 | vendor_boot_a | /dev/block/by-name/vendor_boot_a |
| 4 | dtbo_a | /dev/block/by-name/dtbo_a |
| 5 | vbmeta_a | /dev/block/by-name/vbmeta_a |

It should be noted herein that, in Table 1 and Table 2, the address of the sub-partition is represented in a file path manner. In an actual application scenario, a person skilled in the art may describe the address of the sub-partition in a plurality of different manners. For example, a linear address is used for description.

S1530: Select an unselected sub-partition (a first sub-partition) from the list 1, and obtain a name (a first sub-partition name) and an address (a first file path) of the sub-partition.

Specifically, before S1530, none of sub-partitions in the list 1 is selected. In S1530, sub-partitions may be sequentially selected based on an arrangement sequence (number sequence) of the sub-partitions in the list 1, or may be randomly selected from all unselected sub-partitions.

Further, after a sub-partition is selected, the sub-partition is marked to subsequently determine whether the sub-partition has been selected. For example, as shown in Table 1, a selected state column is added to Table 1, and an initial value of the selected state is 0. If the sub-partition is selected, the selected state is changed to 1.

S1540: Perform suffix-removed matching on the selected sub-partition in S1530 and each sub-partition in the list 2, and determine a sub-partition (a second sub-partition name) that is in the list 2 and whose name is consistent with that of the selected sub-partition in S1530 after suffixes are removed, and a sub-partition address (a second file path) corresponding to the second sub-partition name in the list 2.

S1541: Read data in the first file path.

S1542: Overwrite the read data into the second file path.

S1550: Determine whether there is still a sub-partition that has not been selected in the list 1.

If there is a sub-partition that has not been selected in the list 1, step S1530 is performed to reselect a first sub-partition.

If there is no sub-partition that has not been selected in the list 1, static partition synchronization ends.

Table 1 and Table 2 are used as examples. In an application scenario, the device performs the following procedure:

The $1^{st}$ sub-partition whose selected state is 0 in Table 1 (the sub-partition bootloader_b with a number 1) is selected, and the selected state of the number 1 is changed to 1.

Suffix-removed matching is performed in all sub-partition names in Table 2 by using bootloader_b. Because bootloader_a is consistent with bootloader_b after _a and _b are removed, bootloader_a is obtained through matching according to bootloader_b.

A file path /dev/block/by-name/bootloader_b corresponding to bootloader_b is read from Table 1.

A file path /dev/block/by-name/bootloader_a corresponding to bootloader_a is read from Table 2.

Data in /dev/block/by-name/bootloader_b is read, and the read data is overwritten into /dev/block/by-name/bootloader_a.

There is still a sub-partition whose selected state is 0 in Table 1. The $1^{st}$ sub-partition whose selected state is 0 in Table 1 (the sub-partition boot_b with a number 2) is selected, and the selected state of the number 2 is changed to 1.

Suffix-removed matching is performed in all sub-partition names in Table 2 by using boot_b. Because boot_a is consistent with boot_b after _a and _b are removed, boot_a is obtained through matching according to boot_b.

A file path /dev/block/by-name/boot_b corresponding to boot_b is read from Table 1.

A file path /dev/block/by-name/boot_a corresponding to boot_a is read from Table 2.

Data in /dev/block/by-name/boot_b is read, and the read data is overwritten into /dev/block/by-name/boot_a.

There is still a sub-partition whose selected state is 0 in Table 1. The $1^{st}$ sub-partition whose selected state is 0 in Table 1 (the sub-partition vendor_boot_b with a number 3) is selected, and the selected state of the number 3 is changed to 1.

Suffix-removed matching is performed in all sub-partition names in Table 2 by using vendor_boot_b. Because vendor_boot_a is consistent with vendor_boot_b after _a and _b are removed, vendor_boot_a is obtained through matching according to vendor_boot_b.

A file path /dev/block/by-name/vendor_boot_b corresponding to vendor_boot_b is read from Table 1.

A file path /dev/block/by-name/vendor_boot_a corresponding to vendor_boot_a is read from Table 2.

Data in /dev/block/by-name/vendor_boot_b is read, and the read data is overwritten into /dev/block/by-name/vendor_boot_a.

There is still a sub-partition whose selected state is 0 in Table 1. The $1^{st}$ sub-partition whose selected state is 0 in Table 1 (the sub-partition dtbo_b with a number 4) is selected, and the selected state of the number 4 is changed to 1.

Suffix-removed matching is performed in all sub-partition names in Table 2 by using dtbo_b. Because dtbo_a is consistent with dtbo_b after _a and _b are removed, dtbo_a is obtained through matching according to dtbo_b.

A file path /dev/block/by-name/dtbo_b corresponding to dtbo_b is read from Table 1.

A file path /dev/block/by-name/dtbo_a corresponding to vendor_boot_a is read from Table 2.

Data in /dev/block/by-name/dtbo_b is read, and the read data is overwritten into /dev/block/by-name/dtbo_a.

There is still a sub-partition whose selected state is 0 in Table 1. The $1^{st}$ sub-partition whose selected state is 0 in Table 1 (the sub-partition vbmeta_b with a number 5) is selected, and the selected state of the number 5 is changed to 1.

Suffix-removed matching is performed in all sub-partition names in Table 2 by using vbmeta_b. Because vbmeta_a is consistent with vbmeta_b after _a and _b are removed, vbmeta_a is obtained through matching according to vbmeta_b.

A file path /dev/block/by-name/vbmeta_b corresponding to vbmeta_b is read from Table 1.

A file path /dev/block/by-name/vbmeta_a corresponding to vendor_boot_a is read from Table 2.

Data in /dev/block/by-name/vbmeta_b is read, and the read data is overwritten into /dev/block/by-name/vbmeta_a.

There is no sub-partition whose selected state is 0 in Table 1, and static partition synchronization is completed.

Further, in the foregoing solution, Table 1 and Table 2 are transition data, and Table 1 and Table 2 are deleted after static partition synchronization is completed.

In an operating system upgrade process, in S520, when a read/write operation is performed on the data in the static partition (B) based on the operating system upgrade installation package, not all sub-partitions in the static partition (B) may be rewritten. To be specific, if the data in the static partition (A) and the data in the static partition (B) are completely consistent before operating system upgrade, after the operating system is upgraded according to the procedure shown in FIG. 5A and FIG. 5B, data in some sub-partitions in the static partition (A) and the static partition (B) may still be consistent. Therefore, in a process of synchronizing the data in the static partition (B) to the static partition (A), if sub-partitions with inconsistent data in the static partition (B) and the static partition (A) are first identified, and only the sub-partitions with inconsistent data are synchronized, a data read/write amount can be greatly reduced while implementing data consistency.

Figure 15A:
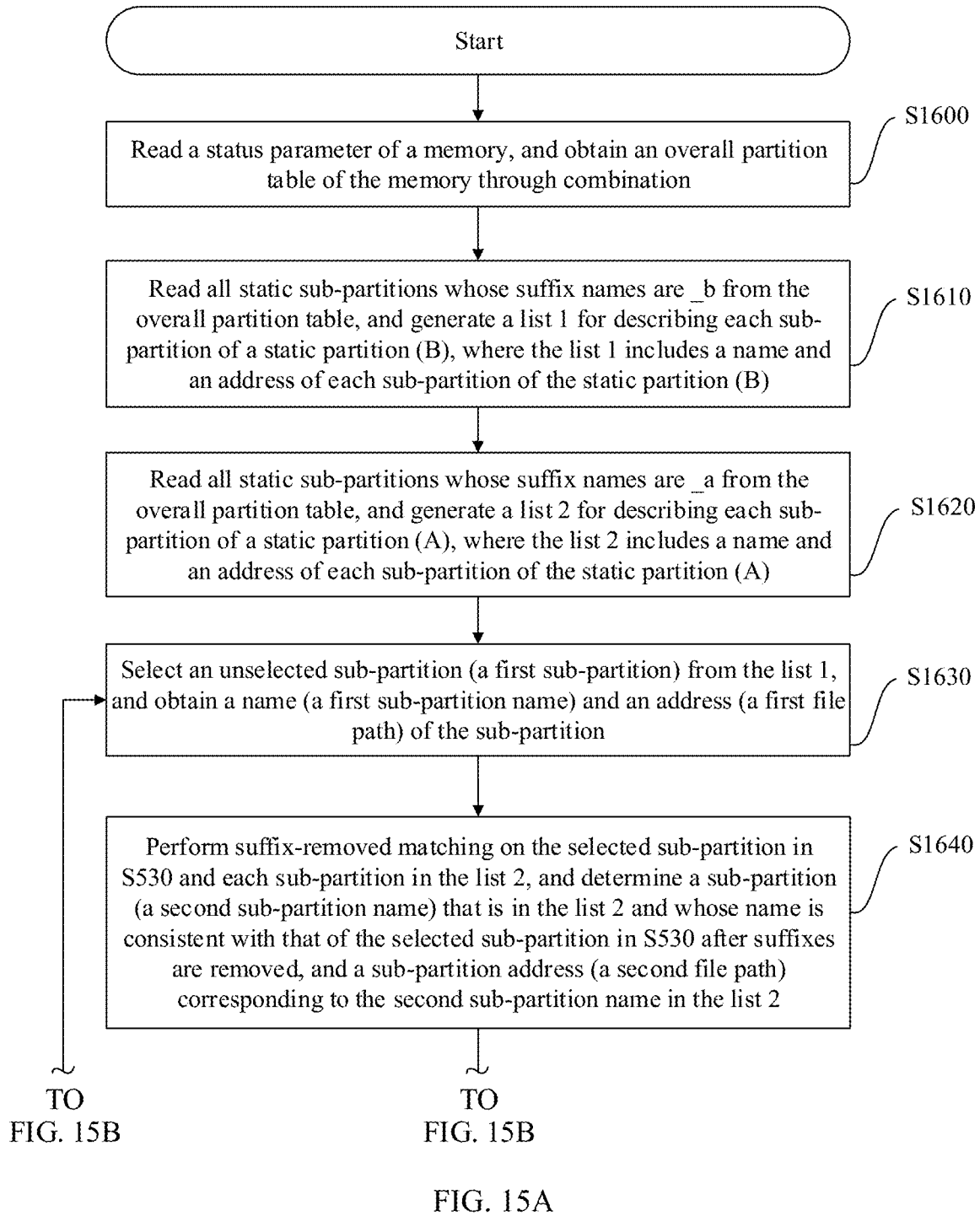
FIG. 15A and FIG. 15B are a flowchart of static partition synchronization according to an embodiment of this application.
Figure 15B:
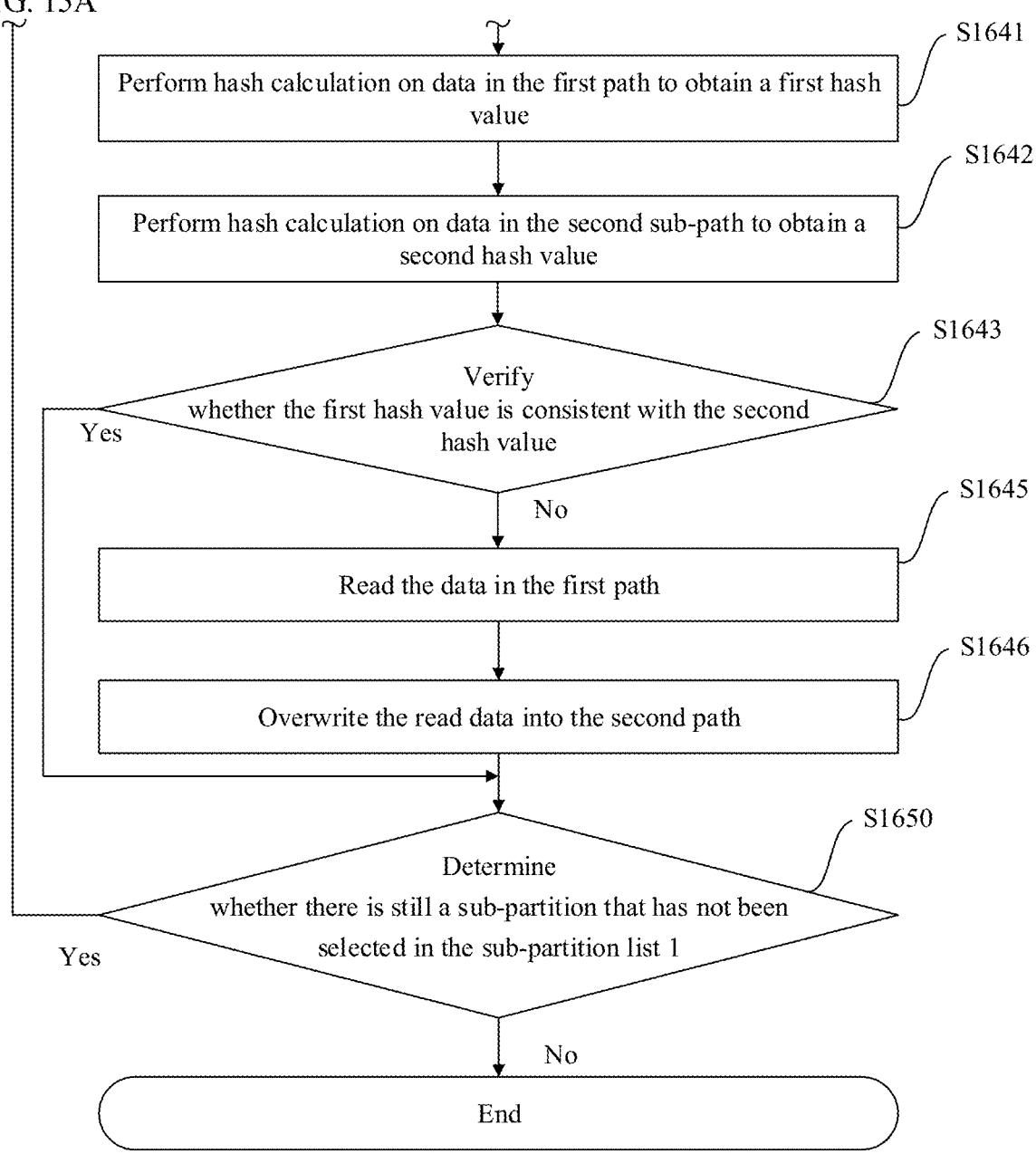

FIG. 15A and FIG. 15B are a flowchart of an implementation of S1111. The terminal device performs the following procedure shown in FIG. 15A and FIG. 15B to implement S1111.

For S1610 to S1640, refer to S1510 to S1540.

S1641: Perform hash calculation on data in a first path to obtain a first hash value.

S1642: Perform hash calculation on data in a second sub-path to obtain a second hash value.

S1643: Verify whether the first hash value is consistent with the second hash value.

If the first hash value is consistent with the second hash value, S1650 is performed.

If the first hash value is inconsistent with the second hash value, S1645 is performed: Read the data in the first path.

S1646: Overwrite the read data into the second path.

For S1650, refer to S1550.

If there is a sub-partition that has not been selected in the list 1, step S1630 is performed to reselect a first sub-partition.

If there is no sub-partition that has not been selected in the list 1, static partition synchronization ends.

Further, in the solution of this application, after an execution node that performs data synchronization between the static partition (A) and the static partition (B) writes upgrade data into either of the static partition (A) and the static partition (B), an execution time node of S1111 is not limited to being after S1310.

Specifically, after S520, the upgrade data is written into the static partition (B). However, in this case, because the static partition (A) is loaded to run the operating system, the data in the static partition (B) cannot be synchronized to the static partition (A). After S531, in an execution process of S540, the device loads the static partition (B) to run the operating system, and running of the operating system does not require loading of the static partition (A). In this case, the data in the static partition (B) can be synchronized to the static partition (A). Therefore, in this embodiment of this application, S1111 may be performed at any moment after S531. This application sets no specific limitation on an execution time sequence of S1111. A person skilled in the art may set, according to an actual requirement, a static partition synchronization moment or a trigger condition for triggering static partition synchronization. The following describes another execution time sequence of S1111 by using a specific embodiment as an example.

Figure 16A:
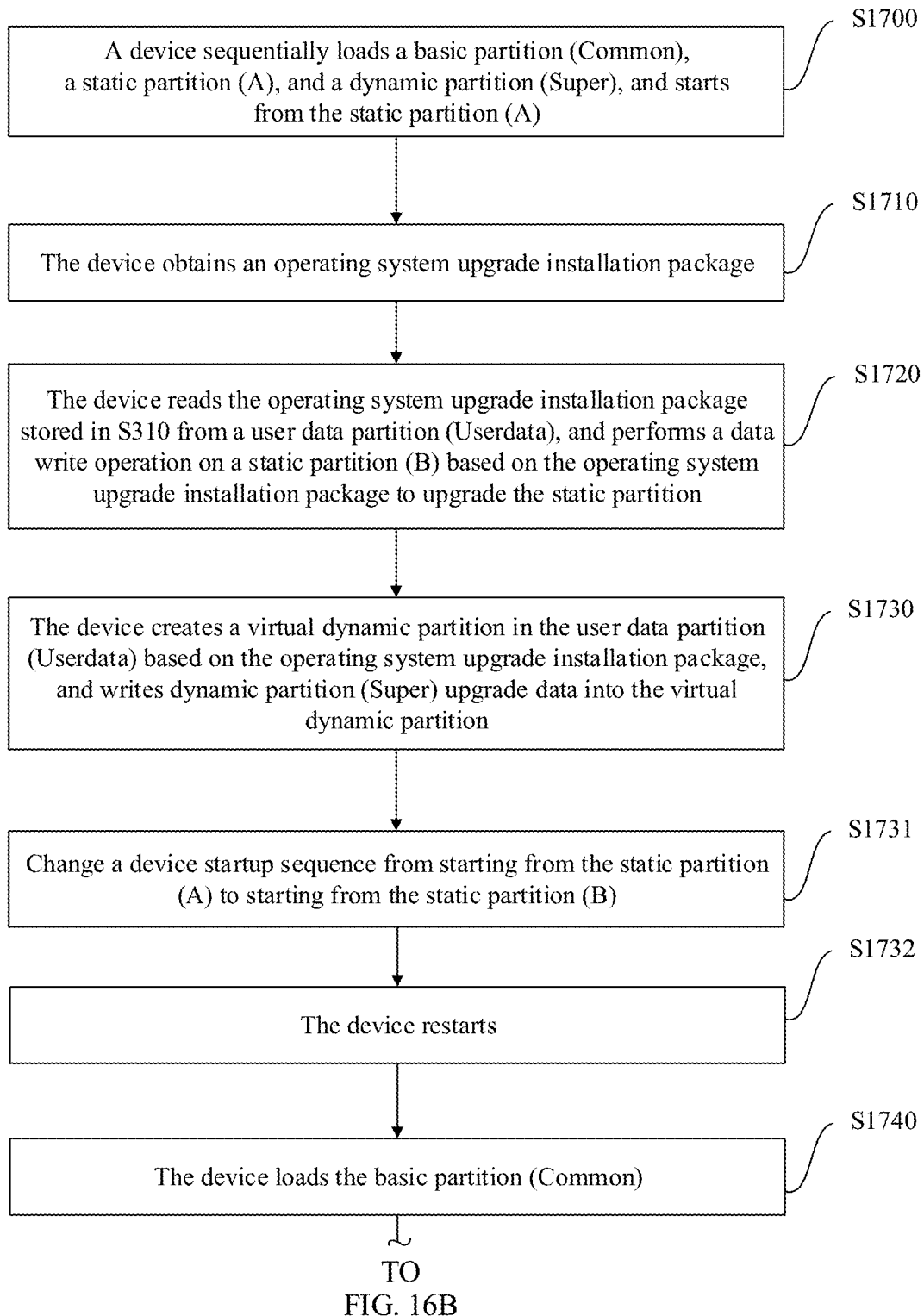
FIG. 16A and FIG. 16B are a flowchart of operating system upgrade according to an embodiment of this application.
Figure 16B:
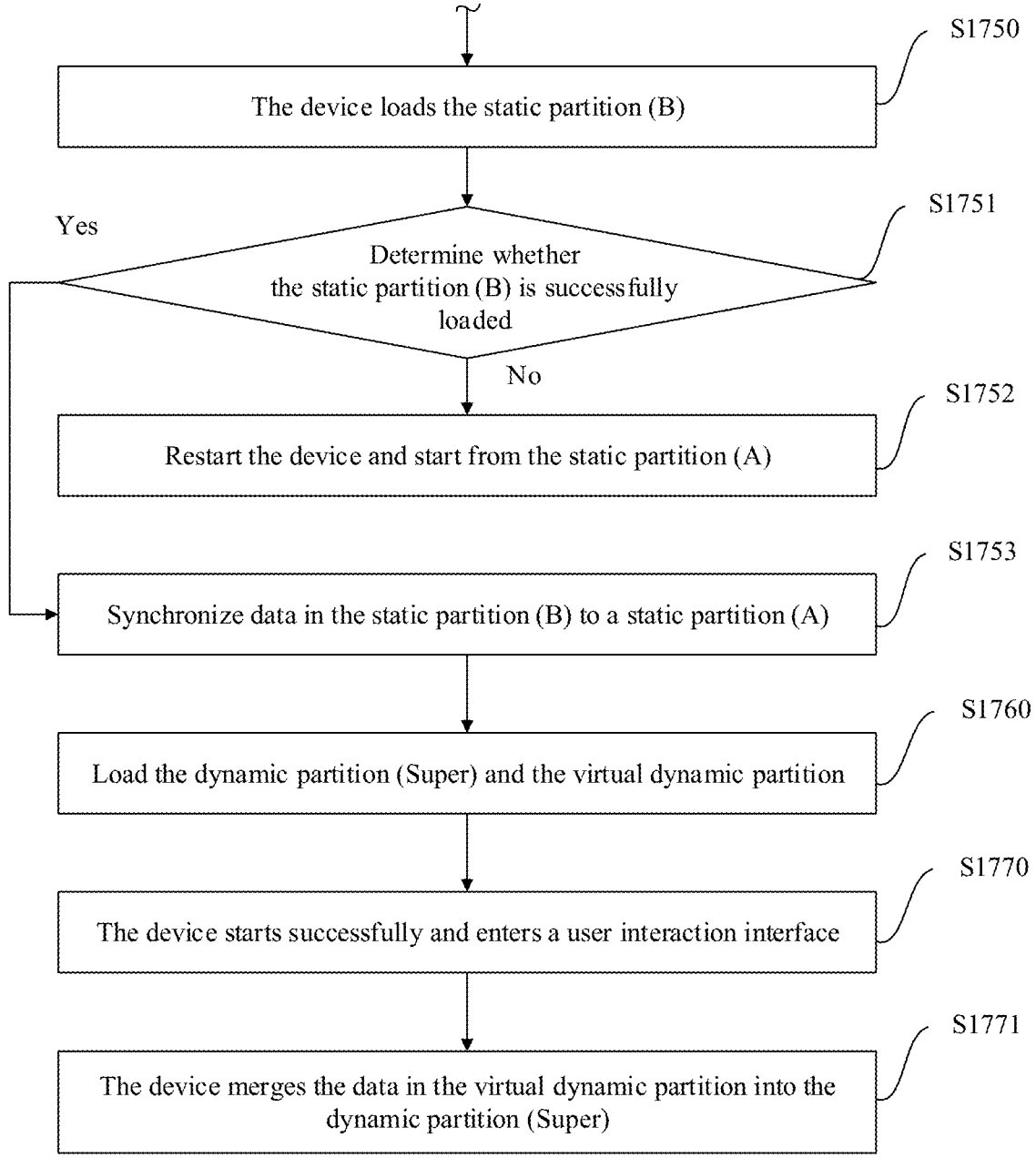

FIG. 16A and FIG. 16B are a flowchart of operating system upgrade according to an embodiment of this application. When the device currently starts from the static partition (A), the device upgrades the operating system and synchronizes the static partition according to a procedure shown in FIG. 16A and FIG. 16B.

For S1700 to S1732, refer to S500 to S532.

S1740: The device loads the basic partition (Common).

S1750: The device loads the static partition (B).

S1751: Determine whether the static partition (B) is successfully loaded.

If the static partition (B) fails to be loaded, S1752 is performed: Restart the device and start from the static partition (A).

If the static partition (B) is successfully loaded, S1753 is performed: Synchronize the data in the static partition (B) to the static partition (A). For execution of 1753, refer to S1111.

S1760: Load the dynamic partition (Super) and the virtual dynamic partition. For details, refer to S541.

S1770: The device starts successfully and enters a user interaction interface. For details, refer to S550.

S1771: The device merges the data in the virtual dynamic partition into the dynamic partition (Super). For details, refer to S551.

In the virtual A/B upgrade solution, after the device restarts and starts from the upgraded static partition, the device verifies a file that needs to be loaded for current system running in the dynamic partition and the virtual dynamic partition, and loads the file that needs to be loaded for current system running in the dynamic partition and the virtual dynamic partition only after the verification succeeds. If the verification fails, the device restarts and rolls back the system. In this case, the system upgrade fails.

Therefore, to avoid performing static partition synchronization when the upgrade fails, in an embodiment of this application, static partition synchronization is performed only after the file that needs to be loaded in the dynamic partition and the virtual dynamic partition is successfully verified or the file that needs to be loaded in the dynamic partition and the virtual dynamic partition is successfully loaded.

Figure 17A:
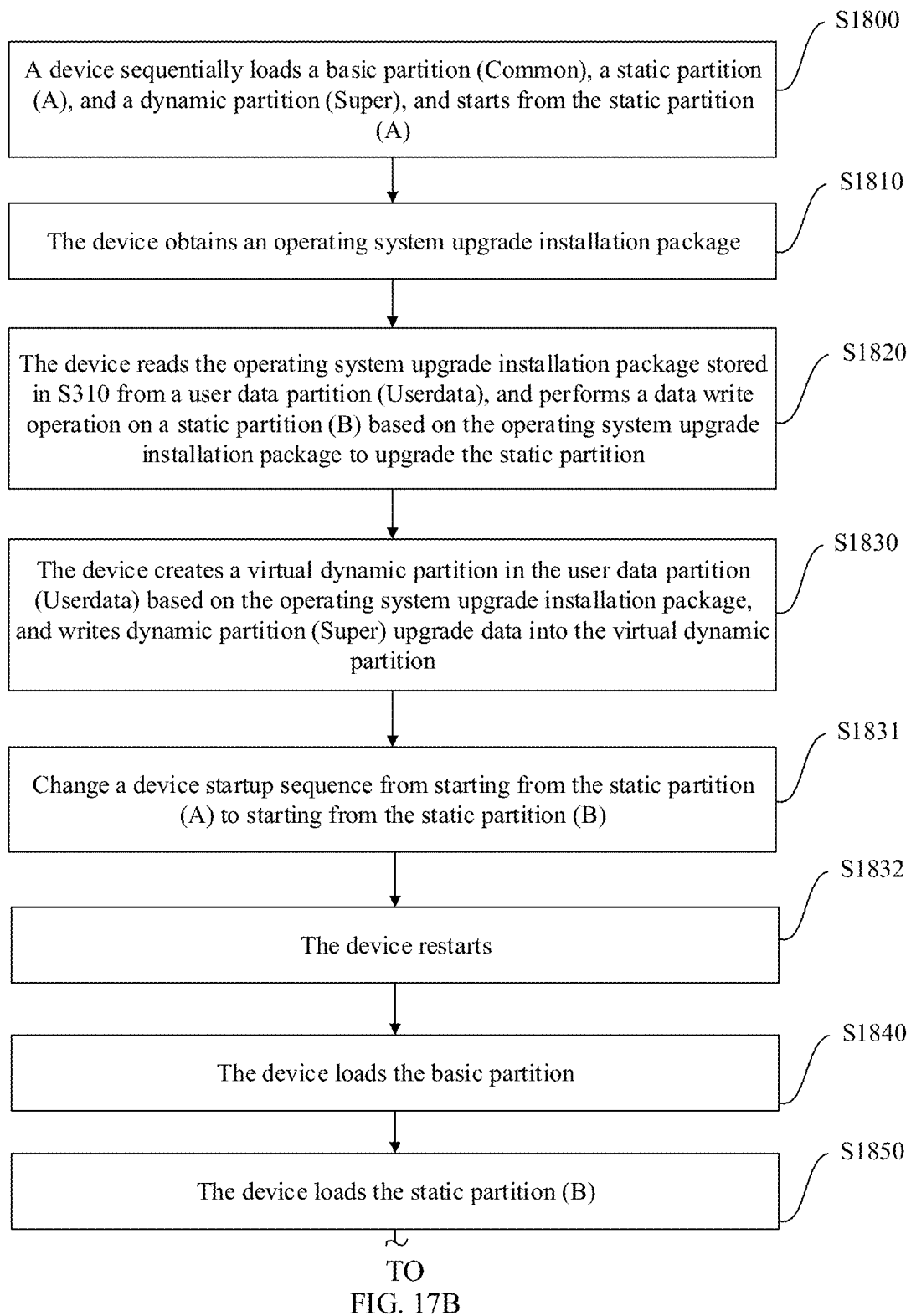
FIG. 17A and FIG. 17B are a flowchart of operating system upgrade according to an embodiment of this application.
Figure 17B:
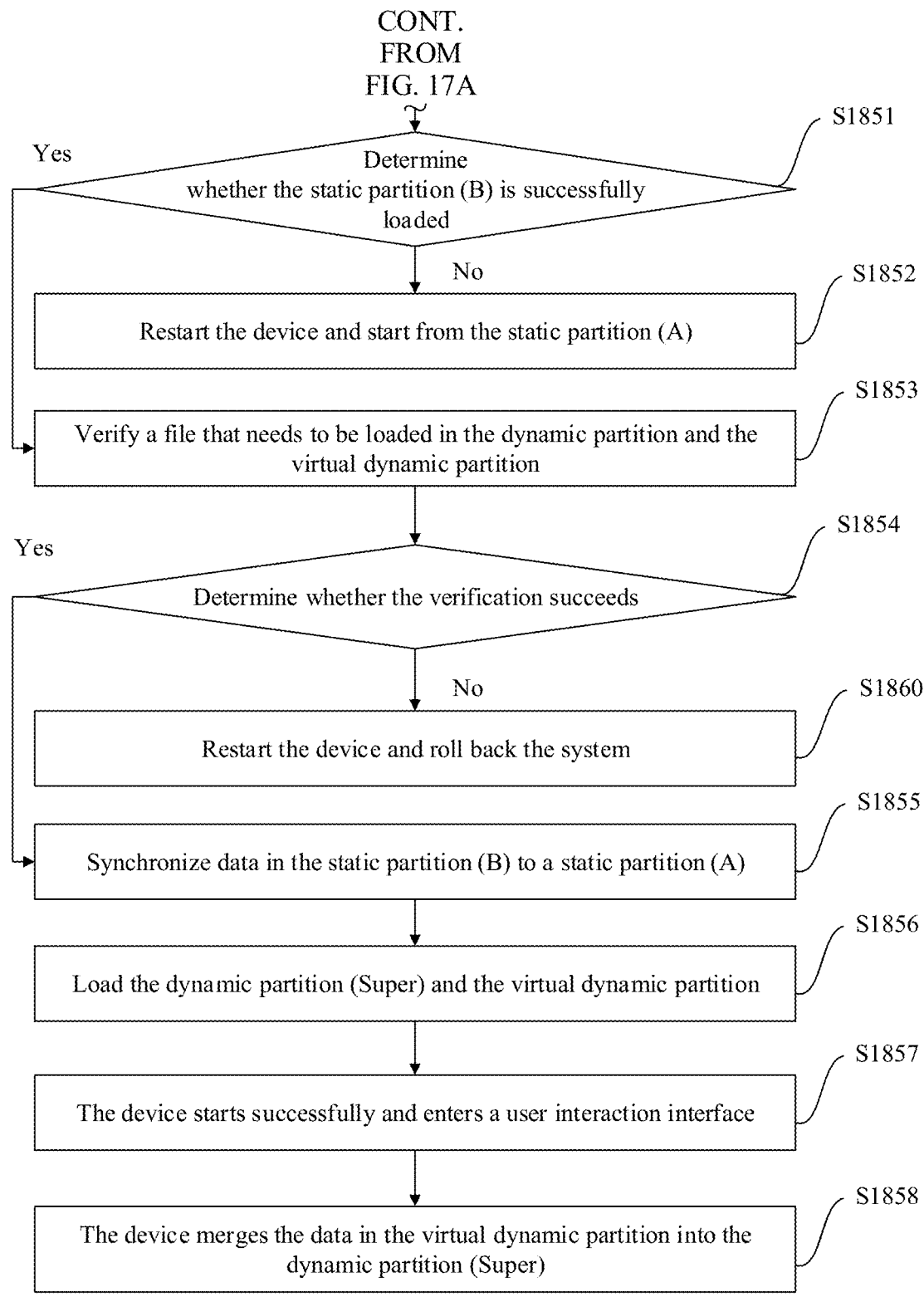

FIG. 17A and FIG. 17B are a flowchart of operating system upgrade according to an embodiment of this application. When the device currently starts from the static partition (A), the device upgrades the operating system and synchronizes the static partition according to a procedure shown in FIG. 17A and FIG. 17B.

For S1800 to S1852, refer to S1700 to S1752.

If the static partition (B) is successfully loaded, S1853 is performed: Verify the file that needs to be loaded in the dynamic partition and the virtual dynamic partition. For example, dmverity is used.

S1854: Determine whether the verification succeeds.

If the verification fails, S1860 is performed: Restart the device and roll back the system, for example, start from the static partition (A).

If the verification succeeds, S1855 is performed.

S1855: Synchronize the data in the static partition (B) to the static partition (A). For execution of S1855, refer to S1111.

For S1856 to S1858, refer to S1760 to S1771.

It may be understood that some or all steps or operations in the foregoing embodiments are merely examples. In embodiments of this application, another operation or various operation variants may further be performed. In addition, the steps may be performed in a sequence different from that presented in the foregoing embodiments, and it is possible that not all operations in the foregoing embodiments are necessarily performed.

Further, usually, whether improvement to a technology is hardware improvement (for example, improvement to a circuit structure such as a diode, a transistor, or a switch) or software improvement (improvement to a method procedure) can be clearly identified. However, with development of technologies, improvement to many existing method procedures can be considered as direct improvement to hardware circuit structures. Almost all designers obtain a corresponding hardware circuit structure by programming an improved method procedure into a hardware circuit. Therefore, improvement to a method procedure can be implemented by using a hardware entity module. For example, a programmable logic device (Programmable Logic Device, PLD) (for example, a field programmable gate array (Field Programmable Gate Array, FPGA)) is such an integrated circuit, and a logical function of the programmable logic device is determined by programming a component by an access party. A designer autonomously performs programming to "integrate" a digital apparatus onto a PLD, without requesting a chip manufacturer to design and manufacture a dedicated integrated circuit chip. In addition, currently, instead of manually producing an integrated circuit chip, such programming is usually implemented by using "logic compiler (logic compiler)" software, which is similar to a software compiler used during program development and writing. Original code to be compiled needs to be written in a specific programming language, which is referred to as a hardware description language (Hardware Description Language, HDL). There is not only one HDL, but there are many HDLs such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language). Currently, VHDL (Very-High-Speed Integrated Circuit Hardware Description Language) and Verilog are most commonly used. It should also be clear to a person skilled in the art that a hardware circuit for implementing a logical method procedure can be easily obtained by performing slight logic programming on the method procedure by using the foregoing several hardware description languages and programming the method procedure into an integrated circuit.

Therefore, the method procedure provided in embodiments of this application may be implemented in a hardware manner. For example, a controller is used, and the controller controls a touchscreen to implement the method procedure provided in embodiments of this application.

The controller may be implemented in any suitable manner. For example, the controller may be in a form of a microprocessor or a processor and a computer-readable medium storing computer-readable program code (for example, software or firmware) that can be executed by the (micro) processor, a logic gate, a switch, an application-specific integrated circuit (Application-Specific Integrated Circuit, ASIC), a programmable logic controller, and an embedded microcontroller. Examples of the controller include but are not limited to the following microcontrollers: ARC 625D, Atmel AT91SAM, Microchip PIC18F26K20, and Silicone Labs C8051F320. A memory controller may further be implemented as a part of control logic of a memory. A person skilled in the art also knows that, in addition to implementing the controller by using only computer-readable program code, logic programming may be performed on a method step, so that the controller implements a same function in a form of a logic gate, a switch, an application-specific integrated circuit, a programmable logic controller, an embedded microcontroller, and the like. Therefore, the controller may be considered as a hardware component, and an apparatus that is included in the controller and that is configured to implement various functions may also be considered as a structure in the hardware component. Alternatively, an apparatus for implementing various functions may be considered as a software module that can implement a method or a structure in the hardware component.

Corresponding to the foregoing embodiment, this application further provides an electronic device. The electronic device includes a memory configured to store computer program instructions and a processor configured to execute the program instructions. When the computer program instructions are executed by the processor, the electronic device is triggered to perform the method steps described in embodiments of this application.

This application further provides a computer program product. The computer program product includes a computer program. When the computer program product runs on a computer, the computer is enabled to perform some or all steps provided in embodiments of this application.

A person skilled in the art may clearly understand that the technology in embodiments of the present invention may be implemented by using software and a necessary universal hardware platform. Based on such an understanding, the technical solutions in embodiments of the present invention essentially or the part contributing to the conventional technology may be implemented in a form of a software product. The computer software product may be stored in a storage medium, such as a ROM/RAM, a magnetic disk, or an optical disc, and includes several instructions for instructing a computer device (which may be a personal computer, a server, or a network device) to perform the method described in embodiments of the present invention or some parts of the embodiments.

For a same or similar part between the embodiments in this specification, mutual reference may be made to the embodiments. In particular, for the apparatus embodiment and the terminal embodiment, because the apparatus embodiment and the terminal embodiment are basically similar to the method embodiment, descriptions are relatively simple. For related parts, refer to the descriptions in the method embodiment.

What is claimed is:

1. An operating system upgrade method, applied to an electronic device, wherein the electronic device comprises a processor and a memory, the memory comprises a basic partition, a first static partition, a second static partition, a dynamic partition, and a user data partition, and the method comprises:
   loading data in the basic partition, the first static partition, and the dynamic partition to run a first operating system;
   obtaining a first system upgrade installation package and a second system upgrade installation package, wherein the first system upgrade installation package comprises first update data for updating data in the dynamic partition, the first system upgrade installation package is used to upgrade the first operating system to a second operating system, the second system upgrade installation package comprises second update data for updating the data in the dynamic partition, and the second system upgrade installation package is used to upgrade the second operating system to a third operating system;
   creating a virtual dynamic partition in the user data partition, and storing the first update data and the second update data in the virtual dynamic partition;
   restarting the electronic device,
   loading data in the basic partition,
   loading data in the second static partition,
   loading first dynamic partition data to run the third operating system, wherein the first dynamic partition data is all or a part of second dynamic partition data, the second dynamic partition data corresponds to a result of superposition of third dynamic partition data and the second update data, and the third dynamic partition data corresponds to a result of superposition of the data in the dynamic partition and the first update data;
   merging the first update data into the dynamic partition in response to successfully running the third operating system, and
   merging the second update data into the dynamic partition.

2. The method according to claim 1, wherein
   the creating a virtual dynamic partition in the user data partition, and storing the first update data and the second update data in the virtual dynamic partition comprises: storing the first update data and the second update data in the user data partition in a form of COW files; and
   the loading first dynamic partition data to run the third operating system comprises: loading the data in the dynamic partition, a COW file of the first update data, and a COW file of the second update data based on a snapshot technology.

3. The method according to claim 1, wherein the first system upgrade installation package further comprises first static partition full data, and the second system upgrade installation package further comprises second static partition full data; and before the restarting the electronic device, and determining that a current startup sequence is starting from the second static partition, the method further comprises: overwriting the second static partition full data into the second static partition.

4. The method according to claim 1, wherein before the loading data in the second static partition, the method further comprises: synchronizing data in the first static partition to the second static partition.

5. The method according to claim 4, wherein the first system upgrade installation package further comprises first static partition update data, and the second system upgrade installation package further comprises second static partition update data;

before the restarting the electronic device, and determining that a current startup sequence is starting from the second static partition, the method further comprises: upgrading the data in the second static partition from static partition data of the first operating system to static partition data of the second operating system based on the first static partition update data; and upgrading the data in the second static partition from the static partition data of the second operating system to static partition data of the third operating system based on the second static partition update data; and before the data in the second static partition is upgraded from the static partition data of the first operating system to the static partition data of the second operating system based on the first static partition update data, the data in the first static partition is synchronized to the second static partition.

6. The method according to claim 4, wherein the synchronizing data in the first static partition to the second static partition comprises:

reading data in each sub-partition of the first static partition; and overwriting the data in each sub-partition of the first static partition into a corresponding sub-partition of the second static partition.

7. The method according to claim 4, wherein the synchronizing data in the first static partition to the second static partition comprises:

calculating a hash value of data in a third sub-partition, wherein the third sub-partition is a sub-partition of the first static partition;

calculating a hash value of data in a fourth sub-partition, wherein the fourth sub-partition is a sub-partition of the second static partition, and the fourth sub-partition corresponds to the third sub-partition; and overwriting the data in the third sub-partition into the fourth sub-partition when the hash value of the data in the third sub-partition is inconsistent with the hash value of the data in the fourth sub-partition.

8. The method according to claim 4, wherein before the obtaining a first system upgrade installation package and a second system upgrade installation package, the method further comprises:

loading data in the basic partition, the second static partition, and the dynamic partition to run a fourth operating system;

obtaining a third system upgrade installation package, wherein the third system upgrade installation package comprises static partition upgrade data, and the third system upgrade installation package is used to upgrade the fourth operating system to the first operating system;

upgrading the data in the first static partition based on the static partition upgrade data in the third system upgrade installation package;

modifying the startup sequence of the electronic device from starting from the second static partition to starting from the first static partition;

restarting the electronic device, and determining that a current startup sequence is starting from the first static partition;

loading the data in the basic partition;

loading the data in the first static partition; and loading fourth dynamic partition data to run the first operating system, wherein after the electronic device is restarted and it is determined that the current startup sequence is starting from the first static partition, the data in the first static partition is synchronized to the second static partition.

9. An operating system upgrade method, applied to an electronic device, wherein the electronic device comprises a processor and a memory, the memory comprises a basic partition, a first static partition, a second static partition, a dynamic partition, and a user data partition, and the method comprises:

loading data in the basic partition, the first static partition, and the dynamic partition to run a first operating system;

obtaining a first system upgrade installation package and a second system upgrade installation package, wherein the first system upgrade installation package comprises first update data for updating data in the dynamic partition, the first system upgrade installation package is used to upgrade the first operating system to a second operating system, the second system upgrade installation package comprises second update data for updating the data in the dynamic partition, and the second system upgrade installation package is used to upgrade the second operating system to a third operating system;

creating a virtual dynamic partition in the user data partition, and storing third update data in the virtual dynamic partition, wherein the third update data is combined data of the first update data and the second update data, and for data in the first update data and data in the second update data that point to a same file, the data in the second update data is retained in the third update data;

restarting the electronic device;

loading data in the basic partition;

loading data in the second static partition;

loading first dynamic partition data to run the third operating system, wherein the first dynamic partition data is all or a part of second dynamic partition data, and the second dynamic partition data corresponds to a result of superposition of the data in the dynamic partition and the third update data; and in response to successfully running the third operating system, merging the third update data into the dynamic partition.

10. An electronic device, wherein the electronic device comprises a processor and a memory, the memory comprises a basic partition, a first static partition, a second static partition, a dynamic partition, and a user data partition, and the processor is configured to execute software code stored in the memory, to enable the electronic device to perform the following operations:

loading data in the basic partition, the first static partition, and the dynamic partition to run a first operating system;

obtaining a first system upgrade installation package and a second system upgrade installation package, wherein the first system upgrade installation package comprises first update data for updating data in the dynamic partition, the first system upgrade installation package is used to upgrade the first operating system to a second operating system, the second system upgrade installation package comprises second update data for updating the data in the dynamic partition, and the second system upgrade installation package is used to upgrade the second operating system to a third operating system;

creating a virtual dynamic partition in the user data partition, and storing the first update data and the second update data in the virtual dynamic partition;

restarting the electronic device, loading data in the basic partition, loading data in the second static partition, loading first dynamic partition data to run the third operating system, wherein the first dynamic partition data is all or a part of second dynamic partition data, the second dynamic partition data corresponds to a result of superposition of third dynamic partition data and the second update data, and the third dynamic partition data corresponds to a result of superposition of the data in the dynamic partition and the first update data;

merging the first update data into the dynamic partition in response to successfully running the third operating system, and merging the second update data into the dynamic partition.

11. The electronic device according to claim 10, wherein the creating a virtual dynamic partition in the user data partition, and storing the first update data and the second update data in the virtual dynamic partition comprises:

storing the first update data and the second update data in the user data partition in a form of COW files; and the loading first dynamic partition data to run the third operating system comprises: loading the data in the dynamic partition, a COW file of the first update data, and a COW file of the second update data based on a snapshot technology.

12. The electronic device according to claim 10, wherein the first system upgrade installation package further comprises first static partition full data, and the second system upgrade installation package further comprises second static partition full data; and before the restarting the electronic device, and determining that a current startup sequence is starting from the second static partition, the method further comprises: overwriting the second static partition full data into the second static partition.

13. The electronic device according to claim 10, wherein before the loading data in the second static partition, the method further comprises: synchronizing data in the first static partition to the second static partition.

14. The electronic device according to claim 13, wherein the first system upgrade installation package further comprises first static partition update data, and the second system upgrade installation package further comprises second static partition update data;

before the restarting the electronic device, and determining that a current startup sequence is starting from the second static partition, the method further comprises:

upgrading the data in the second static partition from static partition data of the first operating system to static partition data of the second operating system based on the first static partition update data; and upgrading the data in the second static partition from the static partition data of the second operating system to static partition data of the third operating system based on the second static partition update data; and before the data in the second static partition is upgraded from the static partition data of the first operating system to the static partition data of the second operating system based on the first static partition update data, the data in the first static partition is synchronized to the second static partition.

15. The electronic device according to claim 13, wherein the synchronizing data in the first static partition to the second static partition comprises:

reading data in each sub-partition of the first static partition; and overwriting the data in each sub-partition of the first static partition into a corresponding sub-partition of the second static partition.

16. The electronic device according to claim 13, wherein the synchronizing data in the first static partition to the second static partition comprises:

calculating a hash value of data in a third sub-partition, wherein the third sub-partition is a sub-partition of the first static partition;

calculating a hash value of data in a fourth sub-partition, wherein the fourth sub-partition is a sub-partition of the second static partition, and the fourth sub-partition corresponds to the third sub-partition; and overwriting the data in the third sub-partition into the fourth sub-partition when the hash value of the data in the third sub-partition is inconsistent with the hash value of the data in the fourth sub-partition.

17. The electronic device according to claim 13, wherein before the obtaining a first system upgrade installation package and a second system upgrade installation package, the method further comprises:

loading data in the basic partition, the second static partition, and the dynamic partition to run a fourth operating system;

obtaining a third system upgrade installation package, wherein the third system upgrade installation package comprises static partition upgrade data, and the third system upgrade installation package is used to upgrade the fourth operating system to the first operating system;

upgrading the data in the first static partition based on the static partition upgrade data in the third system upgrade installation package;

modifying the startup sequence of the electronic device from starting from the second static partition to starting from the first static partition;

restarting the electronic device, and determining that a current startup sequence is starting from the first static partition;

loading the data in the basic partition;

loading the data in the first static partition; and loading fourth dynamic partition data to run the first operating system, wherein after the electronic device is restarted and it is determined that the current startup sequence is starting from the first static partition, the data in the first static partition is synchronized to the second static partition.

\* \* \* \* \*